United States Patent
Grandin et al.

(10) Patent No.: US 12,288,080 B2
(45) Date of Patent: Apr. 29, 2025

(54) METHOD, SYSTEM, AND DEVICE FOR SOFTWARE AND HARDWARE COMPONENT CONFIGURATION AND CONTENT GENERATION

(71) Applicants: STMicroelectronics France, Montrouge (FR); STMICROELECTRONICS (ROUSSET) SAS, Rousset (FR); STMicroelectronics (Grand Ouest) SAS, Le Mans (FR)

(72) Inventors: Emmanuel Grandin, Villeneuve-en-Retz (FR); Nabil Safi, Cite Ghazela (TN); Maxime Dortel, Grasse (FR); Laurent Meunier, Coulaines (FR); Frederic Ruelle, Marigné-Laillé (FR)

(73) Assignees: STMicroelectronics France, Montrouge (FR); STMICROELECTRONICS (ROUSSET) SAS, Rousset (FR); STMicroelectronics (Grand Quest) SAS, Le Mans (FR)

( * ) Notice: Subject to any disclaimer, the term of this patent is extended or adjusted under 35 U.S.C. 154(b) by 190 days.

(21) Appl. No.: 17/898,288

(22) Filed: Aug. 29, 2022

(65) Prior Publication Data
US 2023/0075227 A1 Mar. 9, 2023

Related U.S. Application Data

(60) Provisional application No. 63/310,039, filed on Feb. 14, 2022, provisional application No. 63/310,041, (Continued)

(51) Int. Cl.
G06F 9/445 (2018.01)
G06F 3/0482 (2013.01)
(Continued)

(52) U.S. Cl.
CPC ........ G06F 9/44505 (2013.01); G06F 3/0482 (2013.01); G06F 9/4403 (2013.01); G06F 9/4411 (2013.01); G06F 9/451 (2018.02)

(58) Field of Classification Search
CPC .... G06F 9/44505; G06F 9/451; G06F 3/0482; G06F 9/4403; G06F 9/4411
See application file for complete search history.

(56) References Cited

U.S. PATENT DOCUMENTS 5,812,394 A * 9/1998 Lewis ................ G05B 19/0426
700/86
7,433,932 B2 10/2008 Eifler et al.
(Continued)

OTHER PUBLICATIONS

Francesco Renzini et al., "A Fully Programmable eFPGA-Augmented SoC for Smart Power Applications", Aug. 7, 2019, IEEE Transactions on Circuits and Systems, vol. 67, No. 2 pp. 489-501 (Year: 2019).

(Continued)

*Primary Examiner* — Phillip H Nguyen
(74) *Attorney, Agent, or Firm* — Seed IP Law Group LLP

(57) ABSTRACT

System, method, and circuitry for generating content for a programmable computing device based on user-selected configuration information. A settings registry is generated based on the user's selections. The settings registry and the user selected configuration information is utilized to generate the content, such as code, data, parameters, settings, etc. When the content is provided to the programmable computing device, the content initializes, configures, or controls one or more software and hardware aspects of the programmable computing device, such as boot sequence configurations, (Continued)

internal peripheral configurations, states of the programmable computing device, transitions between states of the programmable computing device, etc., and various combinations thereof.

33 Claims, 26 Drawing Sheets

Related U.S. Application Data filed on Feb. 14, 2022, provisional application No. 63/239,342, filed on Aug. 31, 2021.

(51) Int. Cl.
*G06F 9/4401* (2018.01)
*G06F 9/451* (2018.01)

(56) References Cited

U.S. PATENT DOCUMENTS

| | | | |
|---|---|---|---|
| 8,135,884 B1 | 3/2012 | Sullam et al. | |
| 8,592,722 B2 | 11/2013 | Ulrich et al. | |
| 8,661,401 B1 | 2/2014 | Ogami et al. | |
| 8,701,080 B2* | 4/2014 | Tripathi | G06F 8/34 717/113 |
| 9,250,299 B1 | 2/2016 | Yarlagadda et al. | |
| 9,650,141 B2 | 5/2017 | Fagan et al. | |
| 10,643,020 B1 | 5/2020 | Kukal et al. | |
| 10,739,949 B2 | 8/2020 | Lattore Costa | |
| 11,316,733 B1* | 4/2022 | Johnson | H04L 41/0813 |
| 2006/0164453 A1 | 7/2006 | Silverbrook et al. | |
| 2007/0130548 A1 | 6/2007 | Zhaksilikov et al. | |
| 2007/0165765 A1 | 7/2007 | Ogami et al. | |
| 2008/0244520 A1 | 10/2008 | Hashimoto et al. | |
| 2009/0094539 A1 | 4/2009 | Wang et al. | |
| 2014/0323182 A1 | 10/2014 | Kim et al. | |
| 2016/0267046 A1 | 9/2016 | Kris et al. | |
| 2018/0225230 A1 | 8/2018 | Litichever et al. | |
| 2019/0079575 A1 | 3/2019 | Hanson et al. | |
| 2020/0125060 A1* | 4/2020 | Fujimura | G05B 19/056 |
| 2020/0387352 A1 | 12/2020 | Chawla et al. | |
| 2020/0387357 A1* | 12/2020 | Mathon | G06F 9/4411 |
| 2020/0396225 A1* | 12/2020 | Bhatia | H04L 63/102 |
| 2021/0209003 A1 | 7/2021 | Kowkutla et al. | |
| 2022/0261139 A1* | 8/2022 | Phoutchanthavongsa | G06F 9/451 |
| 2023/0078144 A1 | 3/2023 | Ruelle et al. | |
| 2023/0080696 A1 | 3/2023 | Ruelle et al. | |
| 2023/0259474 A1 | 8/2023 | Le Corre | |
| 2023/0342476 A1 | 10/2023 | Ziecik et al. | |

OTHER PUBLICATIONS

T. Giuma et al., "Programmable Hardware and the New Analog Capacity", Apr. 1, 2007, International Conference on Systems, pp. 1-6 (Year: 2007).

Amaury Bruniaux et al., "Towards a Fully Programmable Internet of Things", Oct. 10, 2022, 18th International Conference on Wireless and Mobile Computing—Networking and Communications, pp. 204-210 (Year: 2022).

M. Martina et al., "A new approach to compress the configuration information of programmable devices", Jan. 1, 2006, Proceedings of Design Automation & Test in Europe Conference, vol. 2, pp. 1-4 (Year: 2006).

\* cited by examiner

```
{
    "blocks" : {
        "configs":{
            "label" : "Configuration",
            "fields" : {
                "label": {
                    "label" : "Name",
                    "type": "string",
                    "minLength": 3,
                    "maxLength": 8,
                    "help_text": "name of the configuration",
                    "default": "none"
                },
                "frequency":{
                    "label":"Frequency",
                    "type": "number",
                    "minimum": 0,
                    "maximum": { "expr": "getGlobal().bus_clock" },
                    "unit": "Hz",
                    "description": "Specifies frequency used to compute the period value to be loaded into the active Auto-Reload Register at the next update event.",
                    "help_text": "In the header file : ARR = (TIM1 counter clock / TIM1 output clock)-1"
                },
                "DCH1":{
                    "label":"DutyCycleCH1",
                    "type": "number",
                    "minimum": 0,
                    "maximum": 100,
                    "unit": "%",
                    "description": "Specifies the duty cycle for channel 1 of the timer.",
                    "help_text": "The tool converts it into a pulse value, pulse value = period * duty cycle / 100"
                },
                "DCH2":{
                    "label" : "DutyCycleCH2",
                    "type": "number",
                    "minimum": 0,
                    "maximum": 100,
                    "unit": "%",
                    "description": "Specifies the duty cycle for channel 2 of the timer.",
                    "help_text": "The tool converts it into a pulse value, pulse value = period * duty cycle / 100"
                }
            }
        }
    }
}
```

*FIG. 5*

```
{
    "id" : "::Device:Application:HAL Examples",
    "resources": {
        "pwm_led_dimmer": {
            "resource_query": {
                "type": "driver(hal,tim)"
            },
            "description": "Timer instance",
            "help_text": "choose Timer instance",
            "source": "Parameters from Figure 5.json"
        }
    },
    "overlay": {
        "pwm_led_dimmer": {
            "id" : "::Device:EXAMPLE_PROCESSOR HAL Code Gen:TIM Init",
            "resource_query": {
                "criteria": [
                    "advanced = true",
                    "prescaler > 10",
                    "COUNT_CHANNEL_WITH('pwm')=4"
                ],
                "default": "TIM4"
            },
            "blocks": {
                "configs": {
                    "fields": {
                        "[Period]": "(self.resources.pwm_led_dimmer.resource.%counter_clock% / self.resources.pwm_led_dimmer.blocks.configs.%current_config%.fields.frequency)-1",
                        "ConfigOC": {
                            "CH1": {
                                "[Pulse]": "(self.resources.pwm_led_dimmer.blocks.configs.%current_config%.fields.DCH1 * %this%.Period) / 100"
                            },
                            "CH2": {
                                "[Pulse]": "(self.resources.pwm_led_dimmer.blocks.configs.%current_config%.fields.DCH2 * %this%.Period) / 100"
                            }
                        }
                    }
                }
            }
        }
    }
}
```

FIG. 6

```
"instances":["GPIOA", "GPIOB", "GPIOC", "GPIOC_", "ADC", "I2C1", "I2C2", "I2S1", "LPTIM1",
"LPTIM2", "LPUART1", "SPI1", "SPI2", "TIM1", "TIM14", "TIM16", "TIM17", "TIM2", "TIM3", "USART1", "USART2"], "gpios":[
{"port": "A", "index": 0}, {"port": "A", "index": 1}, {"port": "B", "index": 0}, {"port": "B", "index": 1}, {"port": "A", "index": 8},
{"port": "A", "index": 11}, {"port": "A", "index": 12}, {"port": "A", "index": 13}, {"port": "A", "index": 14}, {"port": "A", "index": 15}, {"port": "B", "index": 5},
{"port": "B", "index": 6}, {"port": "B", "index": 7}, {"port": "B", "index": 8}, {"port": "B", "index": 9}, {"port": "C", "index": 14}], "pins":["1", "4", "5", "6", "7", "8"], "signals":[
{"name": "GPIOA_0_INPUT", "instance": "GPIOA", "pin": [{"port": "A", "index": 0}], "function": {"type": "gpio_input"}},
{"name": "GPIOA_0_OUTPUT", "instance": "GPIOA", "pin": [{"port": "A", "index": 0}], "function": {"type": "gpio_output"}},
{"name": "GPIOA_1_INPUT", "instance": "GPIOA", "pin": [{"port": "A", "index": 1}], "function": {"type": "gpio_input"}},
{"name": "SPI1_SCK", "instance": "SPI1", "pin": [{"port": "A", "index": 1}], "function": {"type": "alternate", "id": "AF00"}},
{"name": "SPI1_MOSI", "instance": "SPI1", "pin": [{"port": "A", "index": 2}], "function": {"type": "alternate", "id": "AF00"}},
{"name": "SPI1_MSS", "instance": "SPI1", "pin": [{"port": "B", "index": 0}], "function": {"type": "alternate", "id": "AF00"}}, {"name": "ADC_IN2", "instance": "ADC", "pin": [{"port": "B", "index": 0}], "function": {"type": "analog"}}], "bonds":[
{"pin": [{"port": "A", "index":0 }, "bonding": "4"}],
{"pin": [{"port": "A", "index":1 }, "bonding": "4"}],
{"pin": [{"port": "B", "index":8 }, "bonding": "1"}],
{"pin": [{"port": "B", "index":9 }, "bonding": "1"}],
{"pin": [{"port": "C", "index":14}, "bonding": "1"}],
],
```

FIG. 17

```
"instances":["GPIOA", "GPIOB", "GPIOC", "ADC", "I2C1", "I2C2", "I2S1", "LPTIM1",
"LPTIM2", "LPUART1", "SPI1", "TIM1", "TIM14", "TIM16", "TIM17", "TIM2", "TIM3", "USART1", "USART2"],
"gpios":[
  {"port": "A", "index": 0}, {"port": "A", "index": 1}, {"port": "B", "index": 0}, {"port": "B", "index": 1}, {"port": "A", "index": 8},
  {"port": "A", "index": 1}, {"port": "A", "index": 2}, {"port": "A", "index": 13}, {"port": "A", "index": 14}, {"port": "A", "index": 15}, {"port": "B", "index": 5},
  {"port": "B", "index": 6}, {"port": "B", "index": 7}, {"port": "B", "index": 8}, {"port": "B", "index": 9}, {"port": "C", "index": 14}],
"pins":["1", "4", "5", "6",
"signals":[
  {"name": "GPIOA_0_INPUT", "instance": "GPIOA", "pin": [{"port": "A", "index": 0}], "function": [{"type": "gpio_input"}]},
  {"name": "GPIOA_0_OUTPUT", "instance": "GPIOA", "pin": [{"port": "A", "index": 0}], "function": [{"type": "gpio_output"}]},
  {"name": "GPIOA_1_INPUT", "instance": "GPIOA", "pin": [{"port": "A", "index": 1}], "function": [{"type": "gpio_input"}]},
  {"name": "SPI1_SCK", "instance": "SPI1", "pin": [{"port": "A", "index": 1}], "function": [{"type": "alternate", "id": "AF00"}]},
  {"name": "SPI1_MOSI", "instance": "SPI1", "pin": [{"port": "A", "index": 2}], "function": [{"type": "alternate", "id": "AF00"}]},
  {"name": "SPI1_NSS", "instance": "SPI1", "pin": [{"port": "B", "index": 0}], "function": [{"type": "alternate", "id": "AF00"}]},
  {"name": "ADC_IN2", "instance": "ADC", "pin": [{"port": "B", "index": 0}], "function": [{"type": "analog"}]},
],
"bonds":[
  {"pin": [{"port": "A", "index": 0}], "bonding": "4"},
  {"pin": [{"port": "A", "index": 1}], "bonding": "4"},
  {"pin": [{"port": "B", "index": 8}], "bonding": "1"},
  {"pin": [{"port": "B", "index": 9}], "bonding": "1"},
  {"pin": [{"port": "C", "index": 14}], "bonding": "1"}
],
```

*FIG. 18*

METHOD, SYSTEM, AND DEVICE FOR SOFTWARE AND HARDWARE COMPONENT CONFIGURATION AND CONTENT GENERATION

BACKGROUND

Technical Field

The present disclosure generally relates to electronic circuits, such as of the type often used in embedded applications. More particularly, but not exclusively, the present disclosure relates to generating content for use in programming such electronic circuits, such as general purpose and application specific microcontrollers and microprocessors, including content related to configuration of components of the electronic circuits.

Description of the Related Art

Many programmable microcontroller and microprocessor architectures utilize specific code to initialize or configure operation of the microcontroller and microprocessor in a manner desired by the user. This code can establish a clock setup, a desired boot sequence, assign external peripherals, configure internal peripherals, embed software that is to execute on the microcontroller or microprocessor, and prepare other software or hardware configuration settings. To generate such code, a user would have to be trained on the specific code or hardware nuances of the microcontroller or microprocessor, which can vary from one architecture to another. Some architectures include a graphical tool that enables the user to visualize the configuration settings.

BRIEF SUMMARY

Existing content generation tools are often rigid and do not provide the user with a great deal of flexibility in generating the content. Existing content tools also are often associated with a specific device, and a different content generation tool may be required for each device. It is with respect to these and other considerations that the embodiments described herein have been made.

Embodiments described herein utilize a graphical user interface to enable a user to select and configure a programmable computing device such that content (e.g., code, settings, parameters, option bits or bytes, EEPROM data, etc.) is generated for the programmable computing device. Embodiments described herein facilitate configurable content being generated for a programmable computing device based on a user's selections without the user having to specifically write the content. In some embodiments, a command line interface may be employed, in addition or instead of the graphical user interface, facilitating the use of scripting and automation as part of the configuration process.

In an embodiment, a method includes: presenting, via a graphical user interface to a user, a list of components for a project associated with a programmable computing device; receiving, via the graphical user interface, a first selection of at least one user-selected component for the project from the list of components; in response to the at least one user-selected component being configurable: presenting, via the graphical user interface, a first list of user-selectable templates for the at least one user-selected component; receiving, via the graphical user interface, a second selection of at least one user-selected template from the first list of user-selectable templates; presenting, via the graphical user interface, a second list of user-selectable parameters for the at least one user-selected component; receiving, via the graphical user interface, a third selection of at least one user-selected parameter from the second list of user-selectable parameters; generating settings for the at least one user-selected component based on the second selection of the at least one user-selected template and the third selection of the at least one user-selected parameter; and generating or updating a settings registry based on the settings for each of the at least one user-selected component; and generating content for the programmable computing device based on the at least one user-selected component and the settings registry.

In an embodiment, a non-transitory computer-readable medium's contents configure a processing device to perform a method. The method comprises: displaying, via a graphical user interface to a user, a list of components for a project associated with a programmable computing device; receiving, via the graphical user interface, a first selection of at least one user-selected component for the project from the list of components; in response to the at least one user-selected component being configurable: displaying, via the graphical user interface, a first list of user-selectable templates for the at least one user-selected component; receiving, via the graphical user interface, a second selection of at least one user-selected template from the first list of user-selectable templates; displaying, via the graphical user interface, a second list of user-selectable parameters for the at least one user-selected component; receiving, via the graphical user interface, a third selection of at least one user-selected parameter from the second list of user-selectable parameters; generating settings for the at least one user-selected component based on the second selection of the at least one user-selected template and the third selection of the at least one user-selected parameter; and generating or updating a settings registry based on the settings for each of the at least one user-selected component; and generating content for the programmable computing device based on the at least one user-selected component and the settings registry.

In an embodiment, a computing device comprises: a display device; a memory, which, in operation, stores computer instructions; and at least one processor, which, in operation, executes the computer instructions to: present, via the display device and to a user, a list of components for a project associated with a programmable computing device; receive a first selection of at least one user-selected component for the project from the list of components; in response to the at least one user-selected component being configurable: present, via the display device, a first list of user-selectable templates for the at least one user-selected component; receive a second selection of at least one user-selected template from the first list of user-selectable templates; present, via the display device, a second list of user-selectable parameters for the at least one user-selected component; receive a third selection of at least one user-selected parameter from the second list of user-selectable parameters; generate settings for the at least one user-selected component based on the second selection of the at least one user-selected template and the third selection of the at least one user-selected parameter; and generate or update a settings registry based on the settings for each of the at least one user-selected component; and generate content for the programmable computing device based on the at least one user-selected component and the settings registry.

In an embodiment, a system comprises a programmable computing device and a non-transitory computer-readable medium. The non-transitory computer-readable medium has contents, which, in operation, cause a processor to: display, via a graphical user interface to a user, a list of components for a project associated with the programmable computing device; receive, via the graphical user interface, a first selection of at least one user-selected component for the project from the list of components; in response to the at least one user-selected component being configurable: display, via the graphical user interface, a first list of user-selectable templates for the at least one user-selected component; receive, via the graphical user interface, a second selection of at least one user-selected template from the first list of user-selectable templates; display, via the graphical user interface, a second list of user-selectable parameters for the at least one user-selected component; receive, via the graphical user interface, a third selection of at least one user-selected parameter from the second list of user-selectable parameters; generate settings for the at least one user-selected component based on the second selection of the at least one user-selected template and the third selection of the at least one user-selected parameter; and generate or update a settings registry based on the settings for each of the at least one user-selected component; generate content for the programmable computing device based on the at least one user-selected component and the settings registry; and provide the content to the programmable computing device.

In an embodiment, a method comprises: presenting, via a graphical user interface to a user, a set of boot configuration options for a project associated with a programmable computing device, the presenting the set of boot configuration options including; presenting configuration pin settings associated with the programmable computing device; presenting option byte values associated with the programmable computing device; and presenting the set of boot configuration options; receiving, via the graphical user interface, a selection of a boot configuration option for the project selected from the presented set of boot configuration options; generating or updating a settings registry based on the selected boot configuration option; and generating content for the programmable computing device based on the selected boot configuration option and the settings registry.

In an embodiment, a non-transitory computer-readable medium's contents configure a processing device to perform a method. The method comprises: presenting, via a graphical user interface to a user, a set of boot configuration options for a project associated with a programmable computing device, the presenting the set of boot configuration options including; presenting configuration pin settings associated with the programmable computing device; presenting option byte values associated with the programmable computing device; and presenting the set of boot configuration options; receiving, via the graphical user interface, a selection of a boot configuration option for the project selected from the presented set of boot configuration options; generating or updating a settings registry based on the selected boot configuration option; and generating content for the programmable computing device based on the selected boot configuration option and the settings registry.

In an embodiment, a computing device comprises: a display device; a memory, which, in operation, stores computer instructions; and at least one processor. The at least one processor, in operation, executes the computer instructions to: present, via a graphical user interface to a user, a set of boot configuration options for a project associated with a programmable computing device, the presenting the set of boot configuration options including; presenting configuration pin settings associated with the programmable computing device; presenting option byte values associated with the programmable computing device; and presenting the set of boot configuration options; receive, via the graphical user interface, a selection of a boot configuration option for the project selected from the presented set of boot configuration options; generate or update a settings registry based on the selected boot configuration option; and generate content for the programmable computing device based on the selected boot configuration option and the settings registry.

In an embodiment, a system comprises a programmable computing device and a non-transitory computer-readable medium. The non-transitory computer-readable medium has contents, which, in operation, cause a processor to: present, via a graphical user interface to a user, a set of boot configuration options for a project associated with the programmable computing device, the presenting the set of boot configuration options including; presenting configuration pin settings associated with the programmable computing device; presenting option byte values associated with the programmable computing device; and presenting the set of boot configuration options; receive, via the graphical user interface, a selection of a boot configuration option for the project selected from the presented set of boot configuration options; generate or update a settings registry based on the selected boot configuration option; and generate content for the programmable computing device based on the selected boot configuration option and the settings registry.

In an embodiment, a method comprises: presenting, via a graphical user interface to a user, a set of configuration options for a project associated with a programmable computing device, the presenting the set of configuration options including; presenting a set of internal peripherals of the programmable computing device; presenting a set of pads of an interface of the programmable computing device; and presenting a set of pins of the programmable computing device; receiving, via the graphical user interface, configuration selection information associating an internal peripheral of the set of internal peripherals with a pin of the set of pins; maintaining a settings registry based on the received configuration selection information; and generating content for the programmable computing device based on the received configuration selection information and the settings registry.

In an embodiment, a non-transitory computer-readable medium's contents configure a processing device to perform a method. The method comprises: presenting, via a graphical user interface to a user, a set of configuration options for a project associated with a programmable computing device, the presenting the set of configuration options including; presenting a set of internal peripherals of the programmable computing device; presenting a set of pads of an interface of the programmable computing device; and presenting a set of pins of the programmable computing device; receiving, via the graphical user interface, configuration selection information associating an internal peripheral of the set of internal peripherals with a pin of the set of pins; maintaining a settings registry based on the received configuration selection information; and generating content for the programmable computing device based on the received configuration selection information and the settings registry.

In an embodiment, a computing device comprises a display device, a memory, which, in operation, stores computer instructions, and at least one processor. The at least one processor, in operation, executes the computer instructions to: present, via a graphical user interface to a user, a set of configuration options for a project associated with a programmable computing device, the presenting the set of configuration options including; presenting a set of internal peripherals of the programmable computing device; presenting a set of pads of an interface of the programmable computing device; and presenting a set of pins of the programmable computing device; receive, via the graphical user interface, configuration selection information associating an internal peripheral of the set of internal peripherals with a pin of the set of pins; maintain a settings registry based on the received configuration selection information; and generate content for the programmable computing device based on the received configuration selection information and the settings registry.

In an embodiment, a system comprises a programmable computing device and a non-transitory computer-readable medium. The non-transitory computer-readable medium has contents, which, in operation, cause a processor to: present, via a graphical user interface to a user, a set of configuration options for a project associated with a programmable computing device, the presenting the set of configuration options including; presenting a set of internal peripherals of the programmable computing device; presenting a set of pads of an interface of the programmable computing device; presenting a set of pins of the programmable computing device; receive, via the graphical user interface, configuration selection information associating an internal peripheral of the set of internal peripherals with a pin of the set of pins; maintain a settings registry based on the received configuration selection information; and generate content for the programmable computing device based on the received configuration selection information and the settings registry.

In an embodiment, a method comprises: presenting, by a host computing device via a graphical user interface to a user, a list of states for a project associated with a programmable computing device; receiving, by the host computing device via the graphical user interface, a first selection of a first user-selected state for the project from the list of states; receiving, by the host computing device via the graphical user interface, a second selection of a second user-selected state for the project; generating, by the host computing device, a transition between the first user-selected state to the second user-selected state; generating or updating, by the host computing device, a settings registry based on the first user-selected state, the second user-selected state, and the generated transitions between the first user-selected state and the second user-selected state; and generating, by the host computing device, content for the programmable computing device based on the settings registry.

In an embodiment, a system comprises: a programmable computing device having a first memory, which, in operation, stores first computer instructions; and at least one first processor. The at least one first processor, in operation, executes the first computer instructions to: receive content configuring a first user-selected state, a second user-selected state, and transitions between the first user-selected state and the second user-selected state; receive a request to proceed from the first user-selected state to the second user-selected state; and transition the programmable computing device from the first user-selected state to the second user-selected state based on the transitions. The system includes a host computing device comprising: a display device; a second memory, which, in operation, stores second computer instructions; and at least one second processor. The at least one second processor, in operation, executes the second computer instructions to: present, via the display device, a list of states for a project associated with the programmable computing device; receive a first selection of the first user-selected state for the project from the list of states; receive a second selection of the second user-selected state for the project; generate the transitions from the first user-selected state to the second user-selected state; generate a settings registry based on the first user-selected state, the second user-selected state, and the transitions between the first user-selected state and the second user-selected state; and generate the content for the programmable computing device based on the settings registry.

In an embodiment, a non-transitory computer-readable medium's contents configure a processing device to perform a method. The method comprises: presenting, via a graphical user interface to a user, a list of states for a project associated with a programmable computing device; receiving, via the graphical user interface, a first selection of a first user-selected state for the project from the list of states; receiving, via the graphical user interface, a second selection of a second user-selected state for the project; generating a transition from the first user-selected state to the second user-selected state; maintain a settings registry based on the first user-selected state, the second user-selected state, and the generated transitions between the first user-selected state and the second user-selected state; and generating content for the programmable computing device based on the settings registry.

In an embodiment, a non-transitory computer-readable medium's contents configure a microcontroller of a programmable computing device to perform a method. The method comprises: receiving content configuring a first user-selected state, a second user-selected state, and transitions between the first user-selected state and the second user-selected state; receiving a request to proceed from the first user-selected state to the second user-selected state; and transitioning the programmable computing device from the first user-selected state to the second user-selected state based on the received content by: selecting each execution element associated with the second user-selected state; determining a configuration difference for each execution element between the first user-selected state and the second user-selected state; applying at least one transition constraint for at least one configuration difference for at least one execution element; and applying the configuration differences for each execution element from the first user-selected state to the second user-selected state.

In an embodiment, a computing device comprises a memory, which, in operation, stores computer instructions, and at least one processor. The at least one processor, in operation, executes the computer instructions to: present, via a display device, a list of states for a project associated with a programmable computing device; receive a first selection of a first user-selected state for the project from the list of states; receive a second selection of a second user-selected state for the project; generate transitions from the first user-selected state to the second user-selected state; generate a settings registry based on the first user-selected state, the second user-selected state, and the transitions between the first user-selected state and the second user-selected state; and generate content for the programmable computing device based on the settings registry.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views, unless the context indicates otherwise. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIG. 5 is an illustrative example of a component parameters file in accordance with embodiments described herein.

FIG. 6 is an illustrative example of a component parameters file that obtains values from the parameters file of FIG. 5 in accordance with embodiments described herein.

FIGS. 16 to 18 are illustrative examples of a component parameters files in accordance with embodiments described herein.

DETAILED DESCRIPTION

In the following description, along with the accompanying drawings, certain details are set forth in order to provide a thorough understanding of various embodiments of devices, systems, methods, and articles. One of skill in the art, however, will understand that other embodiments may be practiced without these details. In other instances, well-known structures and methods associated with, for example, circuits, such as transistors, multipliers, adders, dividers, comparators, integrated circuits, logic gates, finite state machines, accelerometers, gyroscopes, magnetic field sensors, memories, bus systems, etc., have not been shown or described in detail in some figures to avoid unnecessarily obscuring descriptions of the embodiments. Moreover, well-known structures or components that are associated with the environment of the present disclosure, including but not limited to the communication systems and networks, have not been shown or described in order to avoid unnecessarily obscuring descriptions of the embodiments.

Unless the context indicates otherwise, throughout the specification and claims that follow, the word "comprise" and variations thereof, such as "comprising," and "comprises," are to be construed in an open, inclusive sense, that is, as "including, but not limited to."

Throughout the specification, claims, and drawings, the following terms take the meaning explicitly associated herein, unless the context indicates otherwise. The term "herein" refers to the specification, claims, and drawings associated with the current application. The phrases "in one embodiment," "in another embodiment," "in various embodiments," "in some embodiments," "in other embodiments," and other variations thereof, refer to one or more features, structures, functions, limitations, or characteristics of the present disclosure, and are not limited to the same or different embodiments unless the context indicates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive, and allows for being based on additional features, functions, aspects, or limitations not described, unless the context indicates otherwise. In addition, throughout the specification, the meaning of "a," "an," and "the" include singular and plural references. Furthermore, the particular features, structures, or characteristics may be combined in any suitable manner in one or more embodiments to obtain further embodiments.

Figure 1:
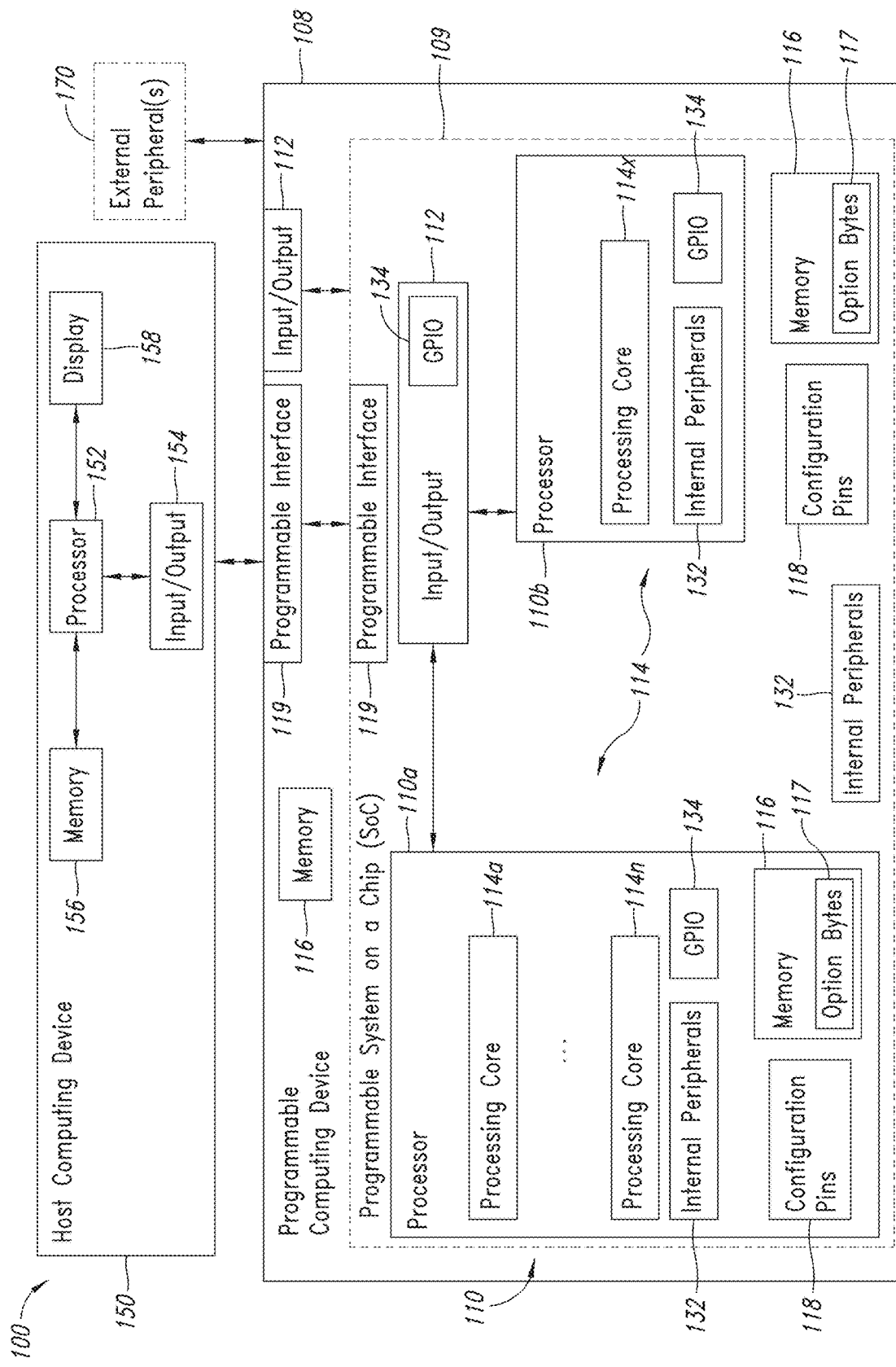
FIG. 1 is a block diagram showing an example computing environment for implementing embodiments described herein.

FIG. 1 is a block diagram showing an example computing environment 100 for implementing embodiments described herein. Environment 100 includes a programmable computing device 108 and a host computing device 150.

The programmable computing device 108 has one or more processors 110, input/output peripherals 112 and a programmable interface 119. As illustrated, the programmable computing device comprises one or more systems on a chip (SoC) 109, each of which may include one or more processors 110, one or more input/output peripherals 112, and a programmable interface 119, which may couple to the input/output peripherals 112 and the programmable interface 119 of the programmable computing device 108.

The processors 110 may have one or more processing cores 114, one or more memories 116, and associated configuration pins, jumpers or switches 118. The associated configuration pins, jumpers or switches 118 may typically be at the level of the SoC 109 instead of at the processor level. In FIG. 1, processor 110a includes processing cores 114a to 114n, and processor 110b includes processing core 114x. The computing device 108 may include other internal peripherals 132, such as graphics processing units, wireless network modules, analog-to-digital converters, microelectromechanical systems, sensors, etc., and other general purpose input/output (GPIO) interfaces 134. The internal peripherals 132 and GPIOs 134 may be at various levels, such as a processor 110 level, a SoC 109 level, a programmable computing device level 108, a processing core 114 level (e.g., configurable components of the processing core 114, not shown in FIG. 1 for ease of illustration), or combinations thereof.

The programmable computing device 108 may be a microprocessor, microcontroller, system board or other computer device that is or contains one or more integrated circuits having a programmable interface 119. In some embodiments, the programmable computing device 108 may comprise a plurality of SoCs (see SoC 109) each having a programmable interface 119, and the programmable computing device 108 may comprise a common programmable interface 119, which, in operation, may couple to the programmable interfaces 119 of each of the plurality of SoCs.

In some embodiments, the processors 110 may include a state machine, a microprocessor, a programmable logic circuit, discrete circuitry, logic gates, registers, etc., and various combinations thereof. In operation, the processors 110 may control booting of the programmable computing device 108, overall operation of the programmable computing device 108, execution of applications programs by the programmable computing device 108, communications between internal peripherals 132 and external devices, such as the illustrated external peripherals 170, etc.

The programmable computing device 108 also includes one or more memories 116 such as one or more volatile or non-volatile memories, such as flash memories, or a combination thereof, which may store, for example, all or part of instructions and data related to applications and operations performed by the programmable computing device 108. For example, one or more of the memories 116 may store computer instructions that when executed by the processor 110, boot the programmable computing device 108 or cause the programmable computing device 108 to perform a desired function. The memories 116 may also store information that is used to configure the hardware of the programmable computing device 108. For example, the option bytes 117 shown in FIG. 1, may store information that is used to configure the hardware of the programmable computing device 108. The memories 116 may be included at various levels, such as the programmable computing device 108 or board level, or board level, at the SoC 109 level, at a processor level 110, at a processing core 114 level, etc., and various combinations thereof.

As mentioned above, the programmable computing device 108 also includes one or more internal peripherals 132, such as a universal asynchronous receiver-transmitter (UART), a timer, an analog-to-digital (A/D) converter, a digital to analog (D/A) converter, an inter integrated circuit (IC2) interface, a serial peripheral (SPI) interface, etc. As illustrated, processor 110a includes one or more internal peripherals 132 separate from processing cores 114a-114n, processor 110b includes one or more internal peripherals 132 separate from processing core 114x, and SoC 109 includes one or more internal peripherals 132 separate from processors 110a, 110b. Internal peripherals 132 may also be included at the programmable computing device 108 or board level, and processing cores may have configurable components as well.

The input/output peripherals 112 may include one or more general purpose input/output (GPIO) interfaces 134, dedicated input or output interfaces (e.g., serial input/output ports), wireless interfaces, etc. In some embodiments, the input/output peripherals 112 may be configured to receive input data from other computing devices or may be configured to provide output data to other computing devices, such as the external peripherals 170. For example, a GPIO 134 may be configured to receive data from an external computing device and provide the data to an internal peripheral 132, to receive data from an internal peripheral 132 and provide the data to an external computing device, or combinations thereof. As illustrated, processing core 114a includes one or more GPIO interfaces 134, processor 110a includes one or more GPIO interfaces 134 separate from processing cores 114a-114n, processor 110b includes one or more GPIO interfaces 134 separate from processing core 114x, and programmable device 108 includes one or more GPIO interfaces 134 separate from processors 110a, 110b. GPIO interfaces 134 may be included at various levels, such as the programmable device 108 level, the SoC 119 level, etc., and various combinations thereof.

The programmable computing device 108 may also include one or more bus systems (not illustrated) at various levels, which may be configured such that the SoCs 109, processors 110, input/output peripherals 112 (e.g., at the boundary between a board and an SoC), processing cores 114, memories 116, configuration pins 118 (e.g., at the boundary between a board and an SoC), internal peripherals 132, GPIOs 134, or other circuits or circuitry (not illustrated) may be communicatively coupled to one another to send or receive, or send and receive, data to or from other components. The bus system may include one or more of data, address, power, or control busses, or some combination thereof, electrically coupled to the various components of the programmable computing device 108.

The host computing device 150 includes a processor 152, an input/output interface 154, a memory 156 and a display 158. The host computing device 150 is configured to employ embodiments described herein to generate a graphical user interface to present to a user, to enable the user to select and configure components, and to generate content from those components for programming and configuring the software or hardware, or both, of the programmable computing device 108. Processor 152 may include one or more processing cores that are configured to execute computer instructions to employ embodiments described herein. While the host computing device 150 may be implemented as a standalone system, embodiments are not so limited. For example, distributed embodiments may be employed (e.g., an application executing on a local host computing device may communicate with a remote server, which may provide all or part of the functionality of the host computing device 150).

Memory 156 may include one or more various types of non-volatile and/or volatile storage technologies. Examples of memory 156 may include, but are not limited to, flash memory, hard disk drives, optical drives, solid-state drives, various types of random-access memory (RAM), various types of read-only memory (ROM), other computer-readable storage media (also referred to as processor-readable storage media), or the like, or any combination thereof. Memory 156 may be utilized to store information, including computer-readable instructions that are utilized by processor 152 to perform actions, including embodiments described herein. Memory 152 may also store other information, which is discussed in more detail below in conjunction with FIG. 2.

Input/output interface 154 may include one or more other data input or output interfaces. For example, the input/output interface 154 may include or provide data to a display device 158, which can be used to present the graphical user interface to the user. The input/output interface 154 can accept input from the user to select and configure or customize components, as described herein. Moreover, the input/output interface 154 is configured to provide content generated as described herein to the programmable computing device 108.

Embodiments of the system 100 of FIG. 1 may include fewer components than illustrated, may include more components than illustrated, and may combine or separate components in various manners. For example, the programmable interface 119 of the programmable computing device 108 may be part of the input/output peripherals 112, multiple programmable interfaces may be employed (e.g., for different SoCs 109, processors 110, or processing cores 114), the processing cores 114a to 114n of processor 110a may have separate memories 116 and configuration pins 118, shared memories 116 and configuration pins 118, input peripherals 132, input/output peripherals 112, and GPIO interfaces 134 may be combined or split in various embodiments, or various combinations thereof. In another example, the display 158 may be part of the input/output interface 154 in some embodiments (e.g., a touchscreen may be employed display options and to receive user input).

Figure 2:
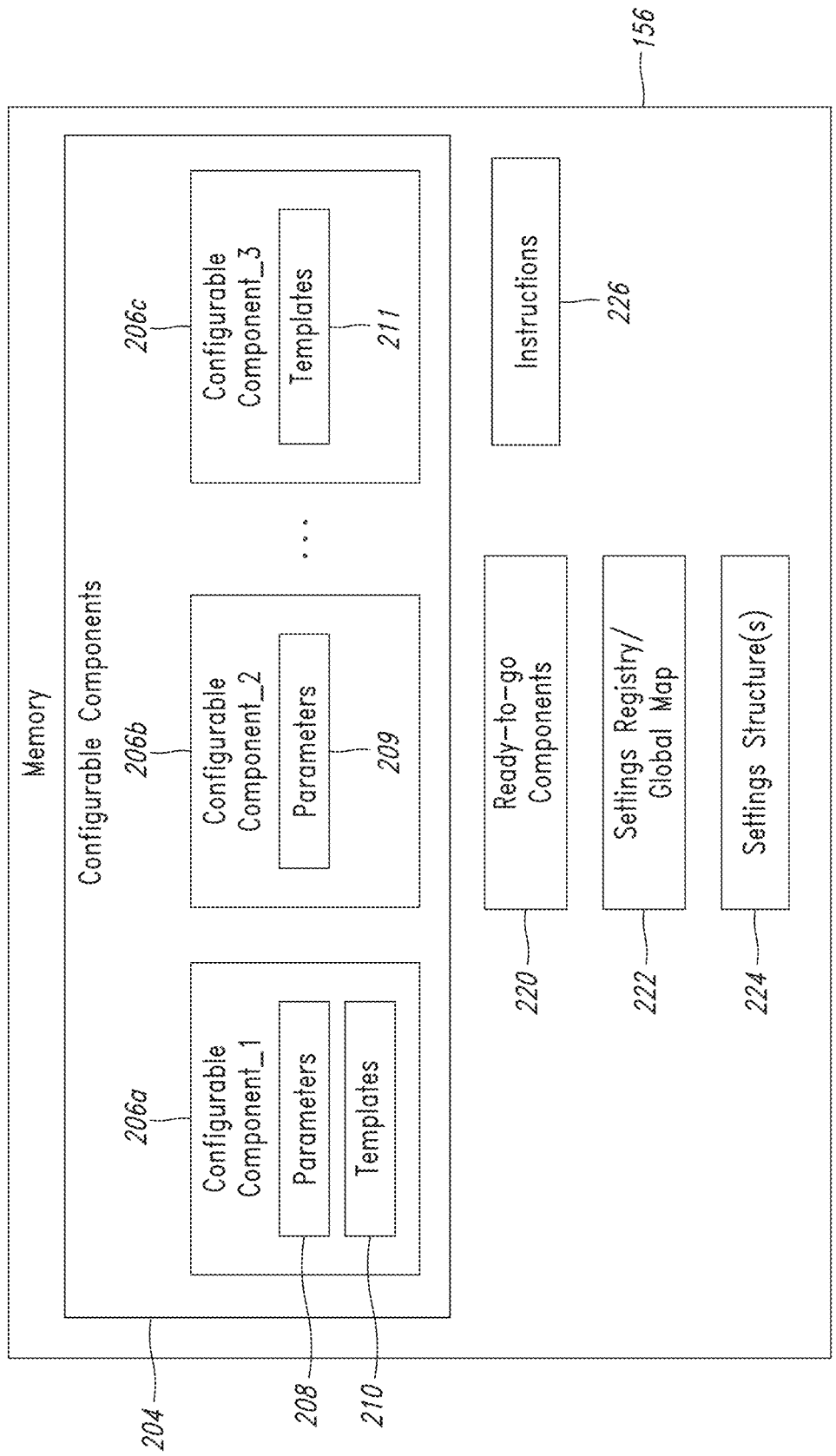
FIG. 2 is a block diagram showing an example conceptual structure for storing aspects utilized in generating content in accordance with embodiments described herein.

FIG. 2 is a block diagram showing an example conceptual structure of a memory 156 for storing aspects utilized in generating content in accordance with embodiments described herein. The memory 156 may be the memory 156 of the host computing device 150 from FIG. 1.

The memory 156 may store configurable components 204, ready-to-go components 220, a global map or settings registry 222, and settings structures for each configurable component 224. In some embodiments, the global map or settings registry 222 and the settings files may be combined. Memory 156 may also store computer instructions 226 that are executable by a processor (e.g., processor 152 in FIG. 1) to perform embodiments described herein. The data stored in the memory 156 may utilize standard syntax, e.g., JSON schema, which can enable the use of standard libraries using or taking benefit from that syntax, e.g., JSON forms.

Configurable components 204 include at least one configurable component 206a-206c. The configurable components 206a-206c include or describe some configuration, control, implementation, or functionality associated with software or hardware aspects of a programmable computing device, such as programmable computing device 108 in FIG. 1. These configurable components 206a-206c have one or more parameters (e.g., constraints or variables) that can be selected, or set by the user.

Configurable components 206a-206c may include parameters files, template files, or both. For example, configurable component 206a includes parameters 208 and templates 210, configurable component 206b includes parameters 209 but no templates, and configurable component 206c includes templates 211 but no parameters.

Parameters 208 and 209 may include one or more files that store parameters of the configurable component that can be selected or set by the user. The parameters 208 and 209 may store the possible values the user can select for one or more parameters. These values can be direct values, advanced expressions, queries to the global map or settings registry, or queries to other parameters (e.g., other parameters 208, 209) or to databases (not illustrated). The parameters 208 and 209 may be used to configure or implement one or more software or hardware aspects associated with the programmable computing device. In various embodiments, one or more generic or customized grammar structures may be utilized to write or generate the parameters 208 and 209. This grammar is a set of rules indicating how to express the configurability of a component or template.

In various embodiments, one or more parameters of the parameters 208 and 209 may be at least partially defined or limited by another parameter, component, or template. Accordingly, one or more parameters can be dependent on one or more other parameters, components, or templates, which can create various dependencies among parameters.

Templates 210 and 211 may include one or more files that store previously generated templates. The templates 210 and 211 are configuration tools for the programmable computing device. The templates 210 and 211 may be files that contain instrumented content that is used to generate content to initialize, configure, or control a software or hardware aspect of the programmable computing device 108. In some embodiments, the templates 210 and 211 contain C code instrumented with handlebars templating language. At a content generation stage, the instrumented parts may be replaced by information coming from the global map or settings registry 222, which is described in more detail below.

In some embodiments, one or more of the templates 210 and 211 may rely directly or indirectly on parameters selected by the user, for example, through the global map or settings registry. For example, configurable component 206a may include a single template 210, which uses global registry values corresponding to four user-selectable parameters, which are defined in the parameters 208. In some embodiments, the templates may be selected or linked to one another by the user, or a user might choose whether a particular template is used during the content generating process, including choosing between mutually exclusive templates. In at least one embodiment, one or more templates 210 and 211 may rely or obtain values from other templates, other components, or other software or hardware projects that are to be implemented on the programmable computing device.

The ready-to-go components 220 are previously designed components that configure or pilot one or more software or hardware aspects of the programmable computing device. In at least one embodiment, the ready-to-go components 220 may also be referred to as non-configurable components. In various embodiments, the ready-to-go components 220 do not include any user-selectable features. Rather, the ready-to-go components 220 are fully operational and can configure or implement one or more software or hardware aspects of the programmable computing device without further input or selections by the user. As discussed in more detail below, the user may be presented with a graphical user interface in which the user can select to add or remove ready-to-go components from the project.

The settings for a configurable component 224 are optional and store the results of the configuration choices for each of the user-selected configurable components, parameters, and templates. For example, the specific settings for a configurable component 224 may identify one or more templates from the templates 210 that were selected by the user. The settings for a configurable component 224 may also contain the values associated to the parameters 208 that were selected by the user. In some embodiments, the settings for a configurable component 224 may also store optional user settings for software or hardware aspects of the programmable computing device. In some embodiments, the settings for a configurable component 224 may be employed for debugging purposes.

In some embodiments, a single settings structure 224 is generated for each selected configurable component 204. In other embodiments, multiple settings structures 224 are generated for a single selected configurable component 204. In yet other embodiments, a single settings structure 224 may be generated for multiple selected configuration components 204. Moreover, multiple settings structures 224 can be generated for multiple selected configuration components 204. In some embodiments, these settings structures 224 may be stored as JSON files.

The global map or settings registry 222 is an in-memory object centralizing all the user selections and settings that are generated via the user's selection of configurable components 204, parameters, and templates. The global map or settings registry in-memory object also may be stored and synchronized with a file to facilitate its persistence. By extension, the global map or settings registry 222 also may refer to a software component providing a dictionary, getters/setters, or services to compute or re-compute content for a programmable computing device based on expressions or dependencies. Overall, the global map or settings registry 222 is a dictionary or database memorizing software components settings and hardware platform settings of the programmable computing device. In some embodiments, separate global maps or settings registries may be generated for various software and hardware aspects of the programmable computing device.

As described herein, the global map or settings registry 222 is a software component implementing a set of services to retrieve, store, compute, re-compute, or resolve values selected by the user. In various embodiments, the global map or settings registry 222 may comprise a JSON object with a set of accessors (API) to the components, templates, and parameter values selected by the user. In some embodiments, the global map or settings registry 222 may be a concatenation of all the settings for each configurable component 224. In other embodiments, the global map or settings registry 222 may be updated directly from the user's selections without using or accessing the settings for each configurable component 224. In some embodiments, the global map or settings registry 222 includes or is associated with services in addition to the JSON objects.

As discussed in more detail below, the host computing device, such as host computing device 150 in FIG. 1, utilizes the global map or settings registry 222, along with the selected configurable components 204 and any selected ready-to-go components 220, to generate content that is provided to and used by the programmable computing device to implement, control, or configure one or more software aspects of the programmable computing device, one or more hardware aspects of the programmable computing device, or both.

The operation of one or more embodiments will now be described with respect to FIGS. 3 and 4, and for convenience will be described with respect to the embodiments of FIGS. 1 and 2 described above. In at least one of various embodiments, processes 300 and 400 described in conjunction with FIGS. 3 and 4, respectively, may be implemented by or executed on one or more computing devices, such as host computing device 150 in FIG. 1 executing instructions, such as instructions 226 (see FIG. 2) stored in the memory 156.

Figure 3:
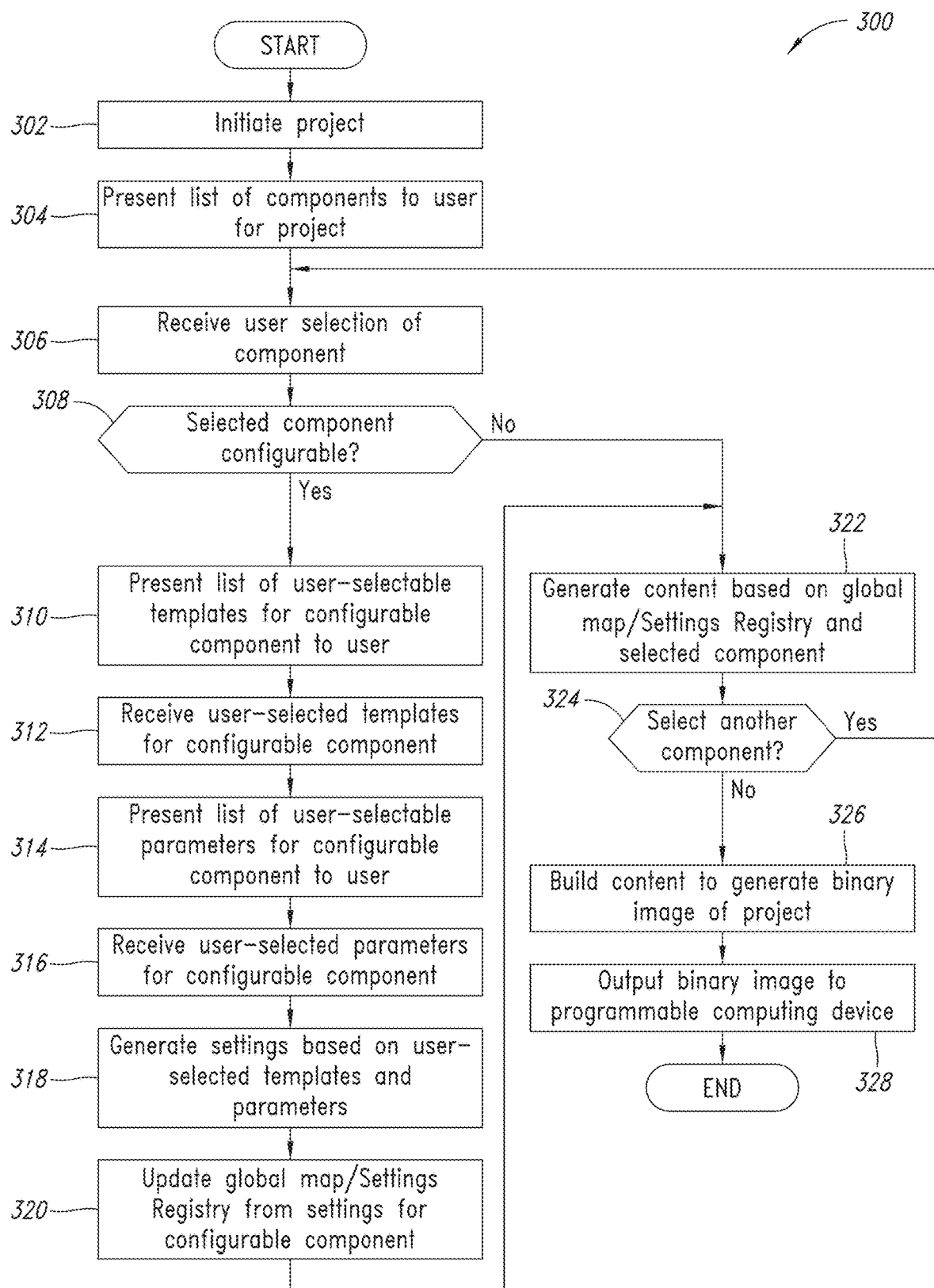
FIG. 3 shows a logical flow diagram of a process for generating content in accordance with embodiments described herein.

FIG. 3 shows a logical flow diagram of a process 300 for generating content in accordance with embodiments described herein. Process 300 begins, after a start block, at block 302, where a project is initiated for generating content to implement on or configure a programmable computing device, such as programmable computing device 108 in FIG. 1. In some embodiments, the project initiation includes presenting a graphical user interface to a user. The graphical user interface requests or includes an input interface for the user to select a particular programmable computing device. A global map or settings registry for the project is also initiated. The global map or settings registry may include a defined structure, which may be predefined, or initial settings for the particular programmable computing device.

In some embodiments, a single project for software and hardware is initiated for the programmable computing device. As such, a single global map or settings registry may be generated. In some embodiments, a first project may be initiated for software of the programmable computing device and a second project may be initiated for hardware of the programmable computing device. Separate global maps or settings registries may then be generated for the separate projects, and those registries may have dependencies on each other. In at least one such embodiment, process 300 may be executed sequentially or in parallel for the separate software and hardware projects. In some embodiments, process 300 may be executed for concurrent processing of both the software and hardware projects.

Process 300 proceeds to block 304, where a list of a plurality of components for the project are presented to the user in the graphical user interface. In at least one embodiment, the list of components may be generated for the user based on the particular programmable computing device selected for the project. These components may be those components that are designed for or compatible with the programmable computing device. In some embodiments, the list of components may be selected for presentation based on the execution context specificities of the programmable computing device. In some architectures, an execution context for a particular processing core or a particular mode of operation (e.g. TrustZone mode) may be selected by the user. The list of components presented to the user can be dependent on these user selections. The list of components may include configurable components, such as configurable components 204 in FIG. 2; or non-configurable components, such as ready-to-go components 220 in FIG. 2; or some combination thereof.

Process 300 continues at block 306, where a user selection of a component is received. In at least one embodiment, a user may select a component from the list via the graphical user interface. Although process 300 discusses a user's selection of a single component at a time, embodiments are not so limited. In some embodiments, a plurality of components may be selected by a user.

Process 300 proceeds next to decision block 308, where a determination is made whether the selected component is a configurable component or a non-configurable component. In some embodiments, the components may have a tag or other identifier indicating whether the component is configurable by the user or not. In other embodiments, a database or other data structure of configurable and non-configurable components may be maintained and compared against the selected component. If the selected component is configurable, then process 300 flows from block 308 to block 310; otherwise, process 300 flows from block 308 to block 322.

As mentioned above, a plurality of components may be selected by a user; if so, process 300 flows from block 308 to block 310 for any selected configurable components and from block 308 to block 322 for any selected non-configurable components. In various embodiments, the user may be enabled to configure each selected component individually or in parallel via the graphical user interface.

At block 310, a list of one or more user-selectable templates for the user-selected configurable component is presented to the user via the graphical user interface. In some embodiments, the list of user-selectable templates may include one or more characteristics of the template that may be set or selected by the user, such as if the template links to another template, component, or project.

The list of user-selectable templates can be customized or defined to utilize user-desired user interface elements. Accordingly, the user interface can be customized for the different user-selectable templates such that the user can select, define, or set one or more characteristics of the templates. In some embodiments, this customization can allow the templates to use data from databases instead of listing all possible values. In some embodiments, this customization can specify the user-selectable aspects of the templates. In some embodiments, a user may select between mutually-exclusive templates, with only one of the templates being selected to use in the content generation process for the user-selected configurable component.

In various embodiments, block 310 may be optional and may not be performed. For example, in some embodiments, a template may be applied by default without a user's selection. In some embodiments, a template may not be employed in the configuration of a configurable component.

Process 300 proceeds from block 310 to block 312, where user-selected templates are received for the configurable component. In some embodiments, the user-selected template may include other information provided by the user defining how the template is to be used.

In some embodiments, one or more configurable component may include user-selectable parameters, but not include user-selectable templates. In such an embodiment, blocks 310 and 312 may not be performed for those selected configurable components that do not include user-selectable templates.

Process 300 continues from block 312 to block 314, where a list of one or more user-selectable parameters for the user-selected configurable component is presented to the user via the graphical user interface. In some embodiments, the list of user-selectable parameters may include a list of the parameters and the possible values for those parameters. In other embodiments, the list may identify the parameters and include an interface to receive a user-defined value. In other embodiments, the list may identify the parameters and include an interface to receive a user-defined value limited to some boundaries. In some embodiments, the list of user-selectable parameters may include a list of the parameters and the possible values for some of those parameters, and include an interface to receive a user-defined value for other parameters, with or without boundaries.

The list of user-selectable parameters can be customized or defined to utilize user-desired user interface elements. Accordingly, the user interface can be customized for the different user-selectable parameters such that the user can select, define, or set one or more parameters. In some embodiments, this customization can allow the parameter selections to be driven by data from databases, expressions, formulas, or dependencies from other parameters, instead of listing all possible values. In other embodiments, this customization can specify the user-selectable aspects of the parameters. In some embodiments, this customization can specify the boundaries applicable to the user-defined values of the parameters. In various embodiments, the list of parameters may be a default list for its corresponding component.

In some embodiments, this list of user-selectable parameters may also include other information that can help the user understand the ramifications of selecting specific parameters. For example, the graphical user interface can include links to reference manuals, diagrams, tool tips, etc. that help explain the parameters and how different user selections can impact other components or parameters.

Process 300 proceeds from block 314 to block 316, where user-selected parameters are received for the configurable component. In at least one embodiment, a value of one or more parameters is received from the user. As mentioned above, the user may select the particular value from the list of possible values for the parameter via the graphical user interface. Alternatively, the user may input the specific value of the parameter, according to boundaries if they are specified. Non-acceptable values of user input may trigger user warnings or automatic adjustments (e.g., rounding down to a maximum value, etc.).

In some embodiments, the configurable component may include user-selectable templates, but not include user-selectable parameters. In such an embodiment, blocks 314 and 316 may not be performed for those selected configurable components that do not include user-selectable parameters.

Process 300 continues from block 316 to block 318, where one or more settings structures are generated for the selected configurable component based on the user-selected parameters, user-selected templates, or some combination thereof. In some embodiments, the settings structures may be a list or other data structure identifying the parameters selected by the user and the associated values selected by the user, the templates selected by the user and any customizable features of the selected templates, or other information indicating how the configurable component was customized by the user.

In various embodiments, the settings structures may be updated by overlaying the user-selected information for the user-selected component to override some values of that component. In some embodiments, a component can override a parameter from another component, such as when components rely on one another for computation. In other embodiments, a component can override a query from another component, such as by changing the choices the user can make associated with that component. Because some parameters can be set or defined by other templates or components, some parameter values may be propagated or overlaid based on the dependencies between parameters, templates, and components. For example, application-level values may override driver-level values. In this way, user selections and changes at the application level can change values or parameters at the driver level, which may then be reflected in the global map or system registry. As mentioned above, in some embodiments the settings structure 224 and the global map or settings registry 222 may be combined. Thus, in some embodiments block 318 may be combined with the next block 320.

Process 300 proceeds from block 318 to block 320, where the global map or settings registry 222 is updated based on the settings for each configurable component. As mentioned above, the global map or settings registry is an in-memory object centralizing all the user selections and settings that are generated via the user's selection of configurable components 204, parameters, and templates. Accordingly, the parameters, templates, values, and other information selected by the user for the user-selected configurable component are added, updated, or otherwise included in the global map or settings registry for the project based on the settings files. The global map or settings registry may be arranged such that the user-selected values are literals that can be written directly in the hardware unit registers by the driver software of the programmable computing device. In various embodiments, the global map or settings registry may also retain whatever is used to update the result of the expressions, formulas, or dependencies based on the user's selections. In this way, when a value is updated, such as changed by a user via the graphical user interface, all related values are updated accordingly in the global map or settings registry.

Although FIG. 3 shows the global map or settings registry being updated based on the settings structures being generated from the user's selections, embodiments are not so limited. In some embodiments, the global map or settings registry may be updated in real time as the user selects components, parameters, or templates. Accordingly, in some embodiments, the use of settings structures may be optional. In some embodiments, an image of the user selection may be maintained in the JSON files.

After block 320, or if, at decision block 308, the selected component is not configurable, then process 300 flows to block 322. At block 322, content for the programmable computing device is generated based on the selected component and the information stored in the global map or settings registry 222. It is noted that information stored in the global registry and related to other components may be used to generate content. For example, information related to a DMA associated with the selected component (e.g., a template associated with the DMA) may be employed to generate content associated with the selected component.

The global map or settings registry 222 may operate as a consolidated database of values that can be used to generate the content from the user-selected templates and user-selected components. This content may be, for example, plain code (e.g., C code) that is used by the programmable computing device to initialize, configure, or control a software or hardware aspect of the programmable computing device 108. Accordingly, the generated content may be initialization code, application code, configuration code, a device tree blob (a hardware description interpreted at runtime), etc. The content may also be other settings, parameters, or other information that initializes, configures, or controls a software or hardware aspect of the programmable computing device. The content may also comprise associated documentation.

In various embodiments, overlays, handlebars, or a similar templating or replacement engine may be used to resolve dependencies or expressions (e.g., handlebars expressions) in the user-selected templates or in the configurable components by accessing the values stored in the global map or settings registry. In other embodiments the latter accessed values are stored in one or more settings files containing the same information as the settings registry in-memory object. The result of this step may produce actual code that can be compiled by a compiler for use in the programmable computing device. In various embodiments, this code generation does not modify the source code of the selected components. Thus, the components can be reused in their original form for the same project or other projects without having to modify the components. In some embodiments, the system may also generate code not requiring compilation, but which can be interpreted by virtual machines (e.g., micro-python, JavaScript). In other embodiments, the system may generate data structures which are used during runtime to adapt the behavior of the programmable computing device.

As described herein, the graphical user interface allows the user to select components and values. In other embodiments, this can be performed without a graphical user-interface, through a command line interface.

In some embodiments, the graphical user interface may also present a content preview to the user based on the currently selected parameters. In this way, the content generation can be triggered each time a parameter is set. When all components are configured, the content may be finally generated for the programmable computing device because all values are available with the desired values (overlays applied, expressions/formulas/dependencies computed).

Process 300 proceeds from block 322 to decision block 324, where a determination is made whether the user is to select another component. If another component is selected, process 300 loops from block 324 to block 306 to receive the user selection of the other component; otherwise, process 300 flows from block 324 to block 326. As mentioned above, process 300 may also be performed with the user selecting multiple components, which can then be configured by the user together or individually.

At block 326, the content generated for each user-selected component is built into a binary image for the project. This binary image is the information usable by the programmable computing device to initialize, configure, or control its hardware, software, or a combination thereof. In some embodiments, all generated content is utilized to build the binary image for the project. In other embodiments, a portion, but not all of the generated content, is utilized to build the binary image for the project. For example, in the case of interpreted languages, only specific content (e.g., generated code) may be uploaded in a specific memory region of the programmable computing device without regenerating the binary interpreting it.

It is noted that various code generation services can be invoked to generate content for user-selected components, and combinations of code generation services may be employed to generate content for a single user-selected components. For example, content may be generated by a default C code generation service, by a device tree code generation service coming from a community, by a proprietary 3rd party code generation service, by a code generation service generating Python code or any other language, etc., and various combinations thereof.

As illustrated, process 300 proceeds from block 326 to block 328, where the binary image is provided to the programmable computing device. In some embodiments, process 300 may sometimes return to block 304 from block 326, using the content generated at 326 as an intermediate input to the process. In some embodiments, process 300 may be executed multiple times to generate different content for different configurations of the programmable computing device. In this way, different configurations can be provided to separate programmable computing devices (even if a same type of programmable computing device), or different configurations can be provided to a single programmable computing device to allow a user of the programmable computing device to change between the different configurations.

After block 328, process 300 terminates or otherwise returns to a calling process to perform other actions.

Figure 4:
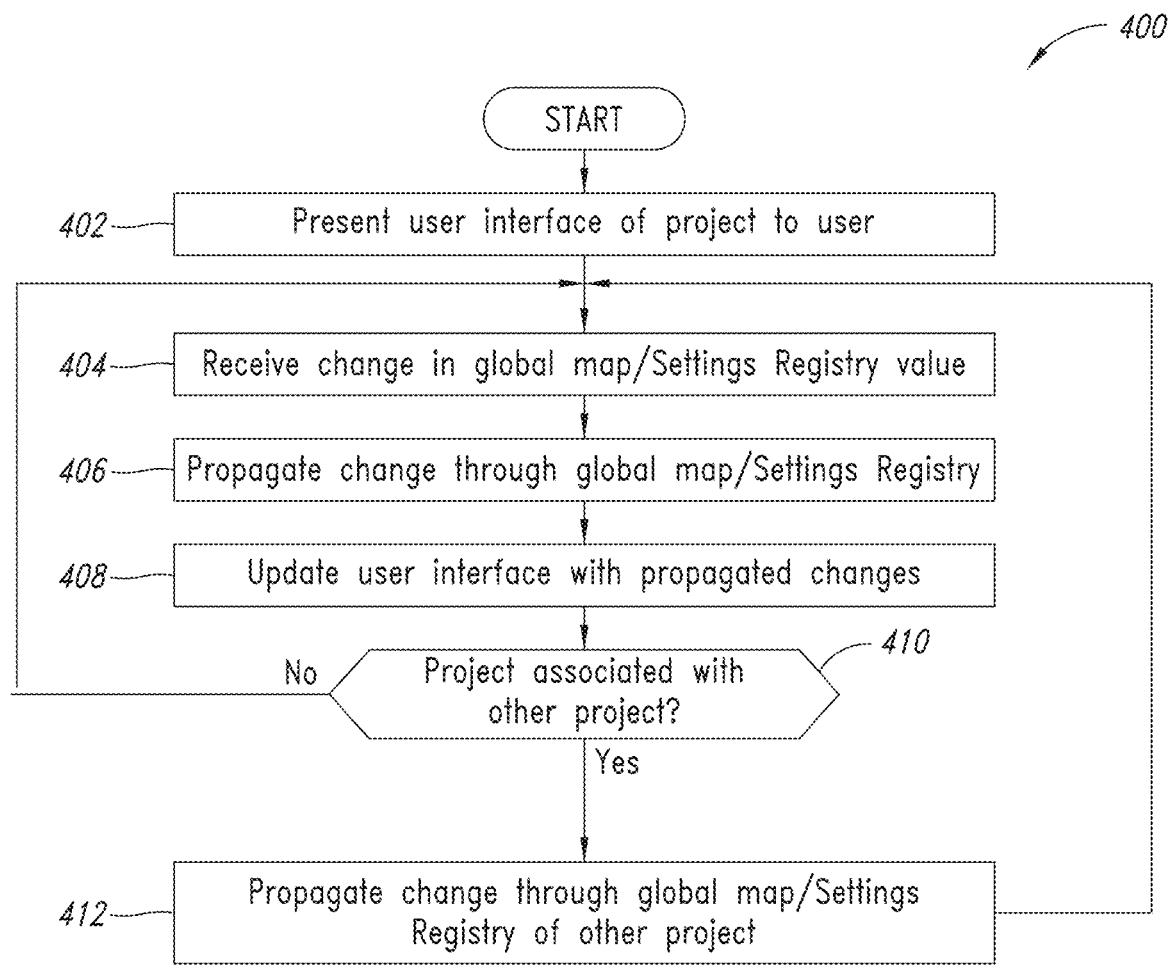
FIG. 4 shows a logical flow diagram of a process for updating a graphical user interface during the content generation process in accordance with embodiments described herein.

FIG. 4 shows a logical flow diagram of a process 400 for updating a graphical user interface during the content generation process in accordance with embodiments described herein.

Process 400 begins, after a start block, at block 402, where a user interface of a project is presented to a user. The project may be a software project, a hardware project, or various combinations thereof. In various embodiments, this user interface is the graphical user interface displayed to the user described above with reference to FIG. 3. This user interface may display components that are selectable for use with a programmable computing device, parameters selectable by a user for a particular configurable component, templates selectable by the user for a particular configurable component, and other information. Moreover, the user interface may display the values of various parameters, settings, templates, and components, whether selected by a user, linked from one template to another, dependent on other values, or defined by a template or component, which may be predefined.

Process 400 proceeds from block 402 to block 404, where a change in a global map or settings registry value is received. As described above, the global map or settings registry is updated in response to a user-selected configurable component, a user-selected parameter value, a user-selected template, etc. These user-selectable conditions may indicate a change in a global map or settings registry value.

Process 400 continues from block 404 to block 406, where the change is propagated through the global map or settings registry. Because parameters, templates, and components can rely or depend on values of other parameters, templates, components, or projects, a change in one value can result in a change in another. Thus, the received change in the global map or settings registry value is propagated through the global map or settings registry in accordance with these dependencies.

Process 400 proceeds next from block 406 to block 408, where the user interface is updated based on the propagated changes in the global map or settings registry. The user-interface also may be updated based on generated content. In some embodiments, the user interface queries the global map or settings registry, and any changes that occurred while updating the global map or settings registry are obtained and displayed in the user interface.

Process 400 continues next at decision block 410, where a determination is made whether the project is associated with another project. If so, process 400 flows to block 412, where the change is propagated through the global map or settings registry of the other project. Process 400 loops to block 404 to receive another change to a global map or settings registry value from a user.

Embodiments of the process 300 illustrated in FIG. 3 and of the process 400 illustrated in FIG. 4 may have more process blocks than illustrated, may have fewer process blocks than illustrated, and the process flow may be modified in various ways. For example, process 300 may be modified to include a block presenting configuration update information to the user based on the updated global map or settings registry at 320 (e.g., calling the process 400).

FIG. 5 is an illustrative example of a component parameters file in accordance with embodiments described herein. In this example, the component parameters identify various different characteristics of the parameters that are selectable by a user along with the possible values. For example, the parameter "DCH1" specifies the duty cycle for a channel 1 timer that is selectable by a user. In this example, the label, such as for display to the user in the graphical user interface is "DutyCycleCH1." The type of the parameter is a number. Thus, the value selected by the user is a number. The minimum value that the user can select is zero and the maximum value the user can select is 100. Finally, the parameter indicates that the unit for this parameter is a percentage.

FIG. 6 is an illustrative example of a parameters file for an application level component that obtains or reuses parameter values from the component parameters file of FIG. 5 in accordance with embodiments described herein. The values of a timer HAL driver are overlaid with values computed from application level parameters (e.g., computing a timer period from an application frequency). In this example, the template establishes an LED dimmer whose characteristics are obtained from the parameters shown in FIG. 5. For example, the "source" of the characteristics are obtained from "Parameters from FIG. 5 .json," which is an illustrative example of depending on the parameter values in FIG. 5. The template defines the channel 1 timer as "CH1." The pulse of this timer is set as "(selfresources.pwm_led_dimmer.blocks.configs.%current_config%.fields.DCH1* %this%.Period)/100." As noted, this definition relies on "DCH1," which is the channel 1 timer defined in the parameters. The "this" is the current "object" or current level in the JSON object. In this particular example, "this" is the "fields" stage and "this.% Period %" refers to the Period field of the current object level.

FIGS. 5 and 6 are for illustrative purposes and should not be considered as limiting. Other information, data structures, and overlay or handlebar technology may be used to establish the content for the programmable computing device from the components, templates, and parameters selected by the user in accordance with embodiments described herein.

Figure 7:
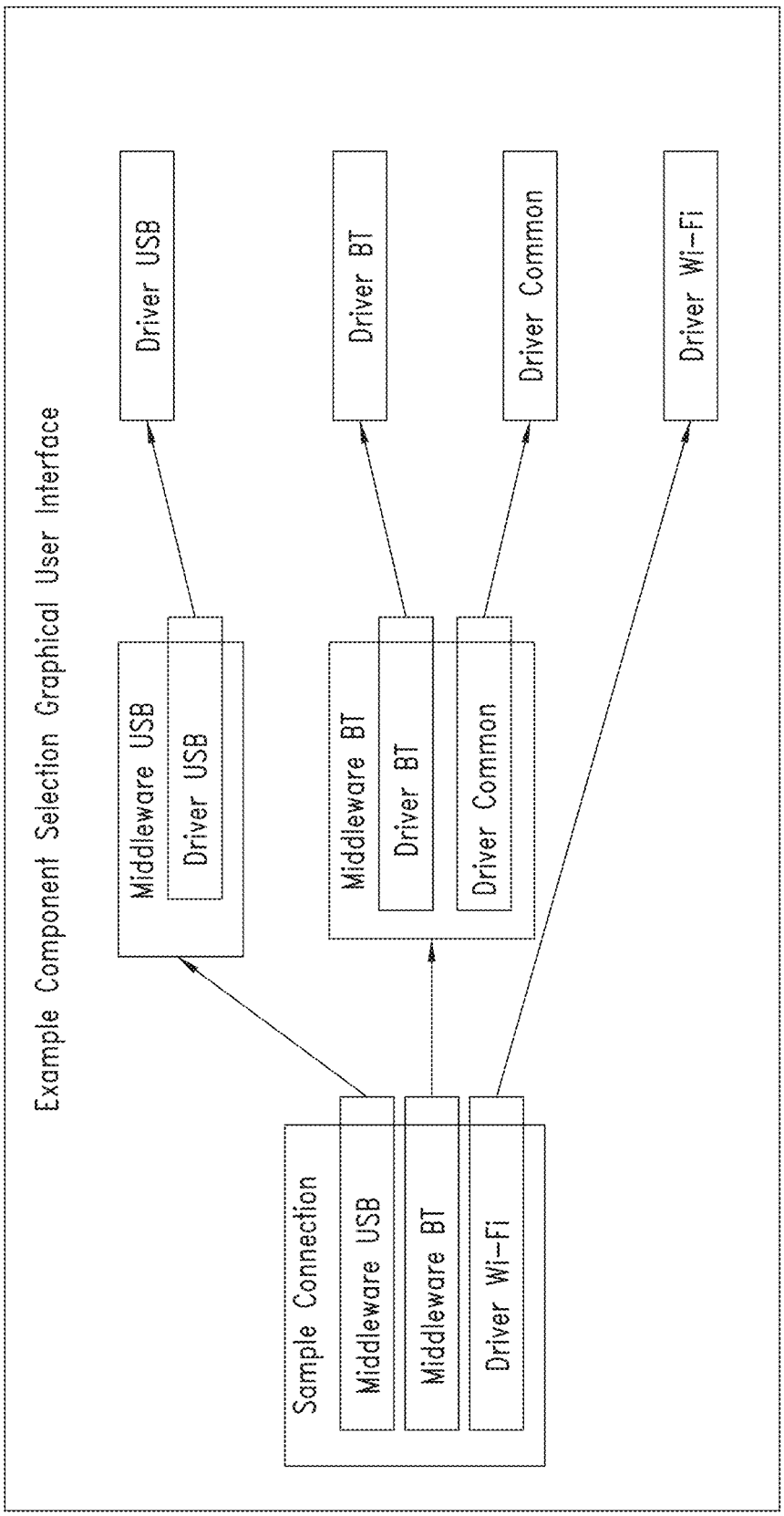
FIG. 7 is an illustrative example of a graphical user interface to enable a user to select components for a project in accordance with embodiments described herein.

FIG. 7 is an illustrative example of a graphical user interface 700 to enable a user to select components for a project in accordance with embodiments described herein. In this illustrative example, the graphical user interface 700 may display a "Sample Connection" collection of components: "Middleware USB," "Middleware BT," and "Driver Wi-Fi." In this example, Sample connection is an applicative code component having three dependencies: two middlewares components and one driver component. For this example situation, these components are required to have a complete project. In this example, the user can select which of these components to open other components for the selection. For example, the user can select the "Middleware BT," which allows the user to then select "Driver BT" or "Driver Common." This type of user interface can enable a user to progress through various different layers of components to select the appropriate components for their project. Moreover, this graphical user interface tool can help the end-user in resolving the dependencies by proposing appropriate components or by automatically selecting the component when appropriate (e.g., when only one component is filling the criteria).

Figure 8:
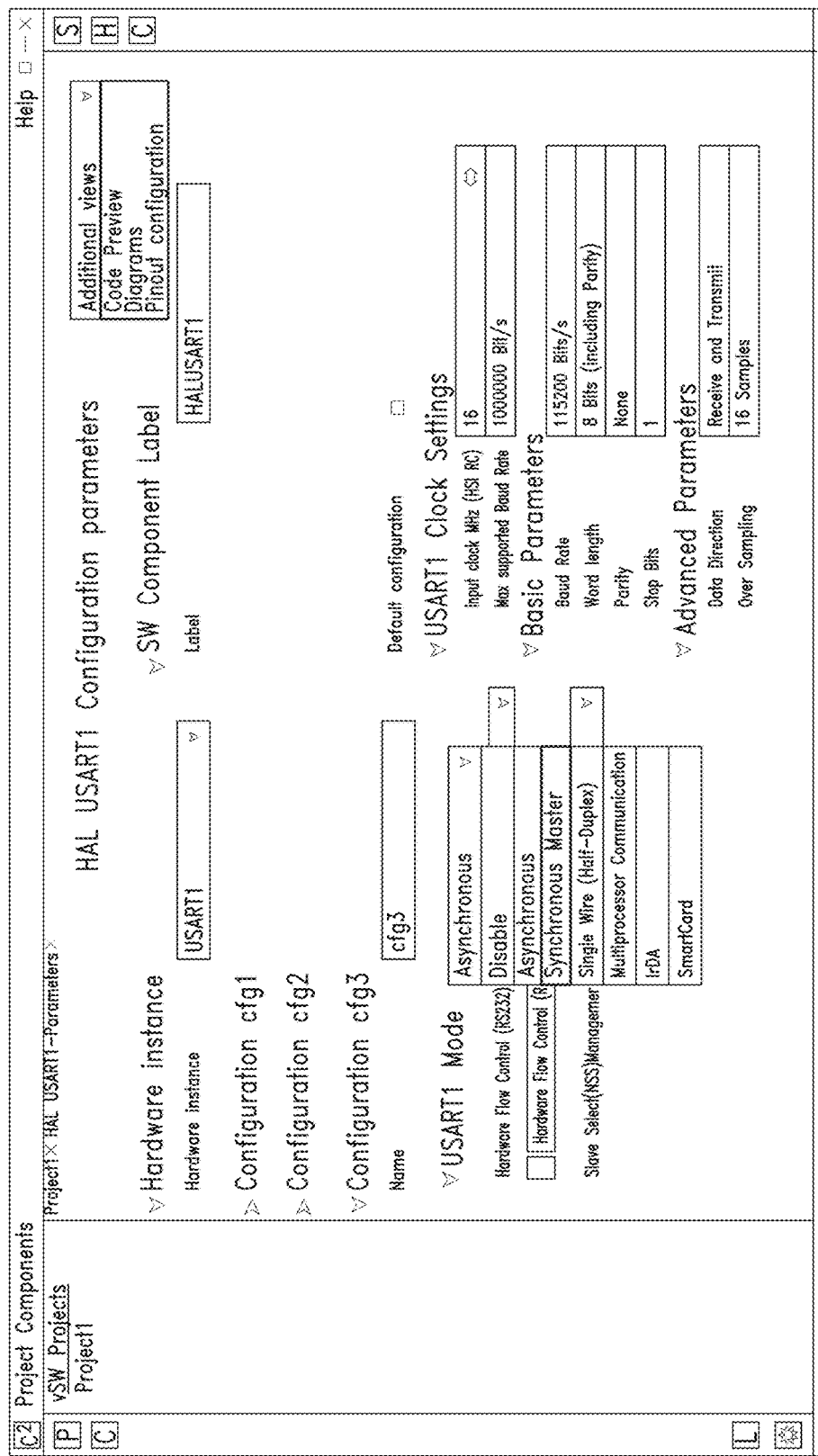
FIG. 8 is an illustrative example of a graphical user interface to enable a user to select parameters for a user-selected component in accordance with embodiments described herein.

FIG. 8 is an illustrative example of a graphical user interface 800 to enable a user to select parameters for a user-selected component in accordance with embodiments described herein. This graphical user interface 800 can display different configurations and possible values for multiple parameters, depending on which configurable components are selected by the user.

FIGS. 7 and 8 are for illustrative purposes and should not be considered as limiting. Other information or data may be displayed to a user via the graphical user interfaces in accordance with embodiments described herein.

With reference to FIGS. 1 and 2, the programmable computing device 108 may comprise a microcontroller (MCU) or microprocessor (MPU), which may include one or more SoCs. The SoCs may include one or processors, and the processors may have one or more processing cores. See processors 110a, 110b, and processing cores 114a to 114n and 114x of FIG. 1. The processing cores of a processor may comprise, for example, a CPU, a floating-point unit, etc. The processing cores need to be configured, including configuring the process of starting up the programmable computing device 108, which may be referred to as the programmable computing device's 108 boot sequence.

In configuring a boot process of a SoC, there are several factors that may need to be considered. A SoC may have several processors, and each processor may have several cores, such as described above with reference to FIG. 1. The cores may employ virtualization, such as trusted/non-trusted worlds in ARM TrustZone technology. The SoC may be organized into trusted and non-trusted worlds (e.g., in an execution context a processor core in trusted world may be able to utilize resources in the trusted world of which it is a member, while those resources would not be available to processing cores outside the trusted world). A hardware execution unit or circuit of a SoC may be a core or a virtualization container (such as a trusted world) within a core of a given hardware platform, and may execute a binary program. The binary program may have an association with an execution context of a software project. If a processor has multiple cores, some of these might work in a synchronized manner, and may be considered as forming a single hardware execution unit.

An execution domain may be viewed as a container aggregating a hardware execution unit and the platform resources (e.g., internal and external memories, peripherals, etc.) that may be used exclusively to implement a software project. A shared domain may be viewed as a container for shared hardware platform resources, available several execution domains.

An execution domain can hold one or more execution contexts, that are the containers for software project deliveries such as binary programs or interpreted code.

Such execution contexts on the same execution domain can happen sequentially or complementary.

An application project may be viewed as a container aggregating all execution contexts and their associated software projects required to run an application on a given hardware platform.

Accordingly, execution contexts are associated with hardware execution units. For example, each boot sequence execution context is linked to an execution domain holding the resources for the synchronization of the hardware execution circuits involved in the execution of the boot sequence. Each execution context also hosts a software project containing the software components to implement the boot sequence, which may be synchronized in various manners.

In a boot sequence each hardware execution unit (e.g., core or trust zone world or virtualization container) may have a defined role. A core may be a first core to boot, and may be designated as a master, and may be in charge of starting the other core(s), which may be designated as slaves. For example, with reference to FIG. 1, core 114x may be the first to boot, and may control or start the boot process for cores 114a to 114n. A master core may start other or slave cores sequentially (using calls to start the slave cores) or in parallel with a gating. A slave may have a synchronization point with a master. In some embodiments, a plurality of cores may start at the same time and wait for each other to be ready, without cores of the plurality being configured as master or slave cores.

A SoC may have a set of configuration pins (see configuration pins 118 of FIG. 1), whose state is sampled or read at boot time as part of configuring the SoC, as well as option bytes (see option bytes 117 of FIG. 1) stored in non-volatile memory (see memory 116 of FIG. 1) whose values are sampled or read at boot time as part of the process of configure the SoC. The option bytes may be stored in a secure area of the memory, such as a FLASH area which may become immutable (e.g., write-once FLASH), a memory area associated with a trust zone, fuses, etc.

Thus, for example, a boot configuration may define a startup execution context, a boot address, whether gating is employed, and any synchronization mechanism to be employed for each execution context running on the same or another hardware execution unit. For example, a simple boot configuration may concern only one core, so it may not be necessary to employ any synchronization mechanism. A boot configuration involving several cores will have several execution contexts, and each core will need to have a boot context defined. Compatibility of the configuration with boot pin settings (e.g., configuration pins 118 of FIG. 1) and option bytes will need to be considered as well. Conventionally, a user had to study the manuals for a programmable computing device very carefully in order to configure the boot sequence and involved hardware execution units of a configurable computing device, such as the configurable computing device 108 of FIG. 1.

The operation of one or more embodiments will now be described with respect to FIGS. 9 and 10, and for convenience will be described with respect to the embodiments of FIGS. 1 through 8 described above. In at least one of various embodiments, processes 900 and 1000 described in conjunction with FIGS. 9 and 10, respectively, may be implemented by or executed on one or more computing devices, such as host computing device 150 in FIG. 1 executing instructions, such as instructions 226 (see FIG. 2) stored in the memory 156.

Figure 9:
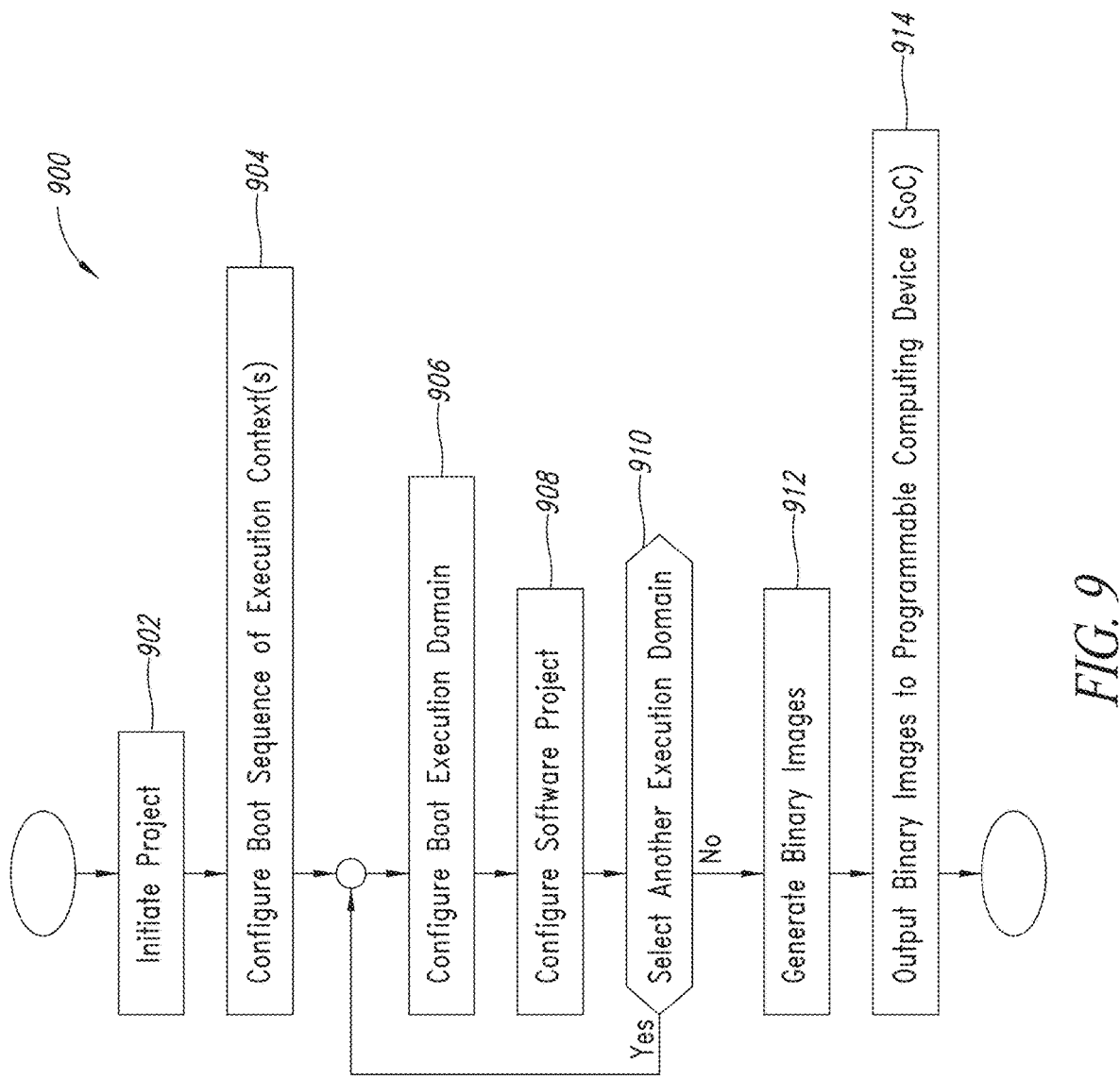
FIG. 9 shows a logical flow diagram of a process for generating content in accordance with some embodiments described herein.

FIG. 9 shows a logical flow diagram of a process 900 for generating content in accordance with some embodiments described herein. Process 900 begins, after a start block, at block 902, where a project is initiated for generating content to implement on or configure a programmable computing device, such as programmable computing device 108 in FIG. 1. In some embodiments, the project initiation includes presenting a graphical user interface to a user. The graphical user interface requests or includes an input interface for the user to select a particular programmable computing device. A global map or settings registry for the project is also initiated. The global map or settings registry may include a defined structure, which may be predefined, or initial settings for the particular programmable computing device.

As described above with reference to FIG. 3, in some embodiments, a single project for software and hardware is initiated for the programmable computing device. As such, a single global map or settings registry may be generated. In other embodiments, a first project may be initiated for software of the programmable computing device and a second project may be initiated for hardware of the programmable computing device. Separate global maps or settings registries may then be generated for the separate projects. In the context of a boot sequence configuration, which is a system level matter, the boot sequence setup is maintained at an overall project level, which may be referred to as an application project. Thus, dedicated global maps or settings registries for individual projects may also be modified to reflect changes to the boot sequence configuration.

Process 900 proceeds from block 902 to block 904, where the process 900 presents configuration options and information and obtains configuration information from a user to configure a boot sequence, such as synchronization mechanisms between a plurality of hardware execution units, defining the execution context(s) of an individual execution unit, etc., using the user interface. This may be done, for example, by using or calling the process 1000 of FIG. 10, discussed in more detail below. The information presented by the user interface may include the available processing cores and boot sequence options (which may take the form of templates, parameters or templates and parameters), the available or current settings of configuration pins, the available or current values of configuration option bytes stored in memory (which may take the form of templates, parameters or templates and parameters), trust zone options (which may take the form of templates, parameters or templates and parameters), etc. The user may use the user interface to select among the presented options or enter setting information directly (e.g., option bytes).

The boot sequence defines which execution contexts are triggered by other execution contexts, so these are the objects presented to the user for selection. The available synchronization mechanisms may be constrained by the underlying hardware execution units or domains below the execution contexts. For example, a simple single core MCU having only one hardware execution unit, may have two defined execution contexts: a bootloader and a product application. The boot sequence may be defined as the bootloader being started first, and the product application being launched by the bootloader, thus sequential temporal sharing of the same hardware execution unit is employed.

Process 900 proceeds from block 904 to block 906, where the process 900 presents configuration options and information and obtains configuration information from a user to configure an execution domain using the user interface. This may be done, for example, using a similar process to the process 300 of FIG. 3 (e.g., blocks 304 to 324, discussed on more detail above). The information presented by the user interface may include the available configuration options for a selected processing core or other hardware execution unit, the available or current settings of pertinent configuration pins, which may be constrained to be consistent with the boot sequence configured at block 904, the available or current values of pertinent configuration option bytes stored in memory, applicant trust zone information (e.g., components in the trust world), etc. The information and selections may employ templates, parameters, or various combinations thereof. The user may use the user interface to select among the presented options or enter setting information directly (e.g., option bytes).

Process 900 proceeds from block 906 to block 908, where the process 900 presents configuration options and information and obtains configuration information from a user to configure configurable components of a software project associated with the execution domain. This may be done, for example, using the processes 300 and 400 of FIGS. 3 and 4, discussed in more detail above. For example, blocks 304 through 324 of process 300 may be performed to configure configurable hardware and software components associated with the hardware execution domain.

Process 900 proceeds from block 908 to decision block 910, where a determination is made whether the user is to select another execution domain to be associated with a project for configuration. If another execution domain is selected, process 900 loops from block 910 to block 906 to configure the next execution domain; otherwise, process 900 flows from block 910 to block 912.

At block 912, content generated for the involved software projects is built into binary images, e.g., one binary image per software project. At block 912, the content generated for the involved software projects is built into binary images, e.g., one binary image per software project. The binary images are the information usable by the programmable computing device to initialize, configure, or control its hardware, software, or a combination thereof. In some embodiments, all generated content is utilized to build the binary image for a software project. In other embodiments, a portion, but not all of the generated content is utilized to build the binary image for the software project. For example, in the case of interpreted languages, only specific content (e.g., generated code) may be uploaded in a specific memory region of the programmable computing device without regenerating the binary interpreting it.

It is noted that the content is not limited to content built into binary images. Other examples of content that may be generated include files containing a configuration of objects to be applied (e.g., a set of values or a set of commands interpreted by a programming tool), a document or display explaining other configuration details to a user (e.g., how to configure the boot pins, how to alter solder bridges, etc.), general purpose documents such as a boot sequence chart, etc., and various combinations thereof.

As illustrated, process 900 proceeds from block 912 to block 914, where the binary images are provided to the programmable computing device. In some embodiments, process 900 may be executed multiple times to generate different content for different configurations of the programmable computing device, or different types of content (e.g., binary code, explanatory documents, etc.). In this way, in addition to generating different types of content, different configurations can be provided to separate programmable computing devices (even if a same type of programmable computing device), or different configuration can be provided to a single programmable computing device to allow a user of the programmable computing device to change between the different configurations. After block 914, process 900 terminates or otherwise returns to a calling process to perform other actions.

Embodiments of the process 900 illustrated in FIG. 9 may have more process blocks than illustrated, may have fewer process blocks than illustrated, and the process flow may be modified in various ways. For example, process 900 may be modified to configure multiple hardware execution units in parallel instead of sequentially, to add a decision block to configure additional elements before triggering code generation at 912, to generate a report or document explaining the boot sequence instead of or in addition to generating code at 912, to include error processing, such as notifying a user of incompatible or inconsistent user selections, to combine block 904 and 906, to omit block 914, etc.

Figure 10:
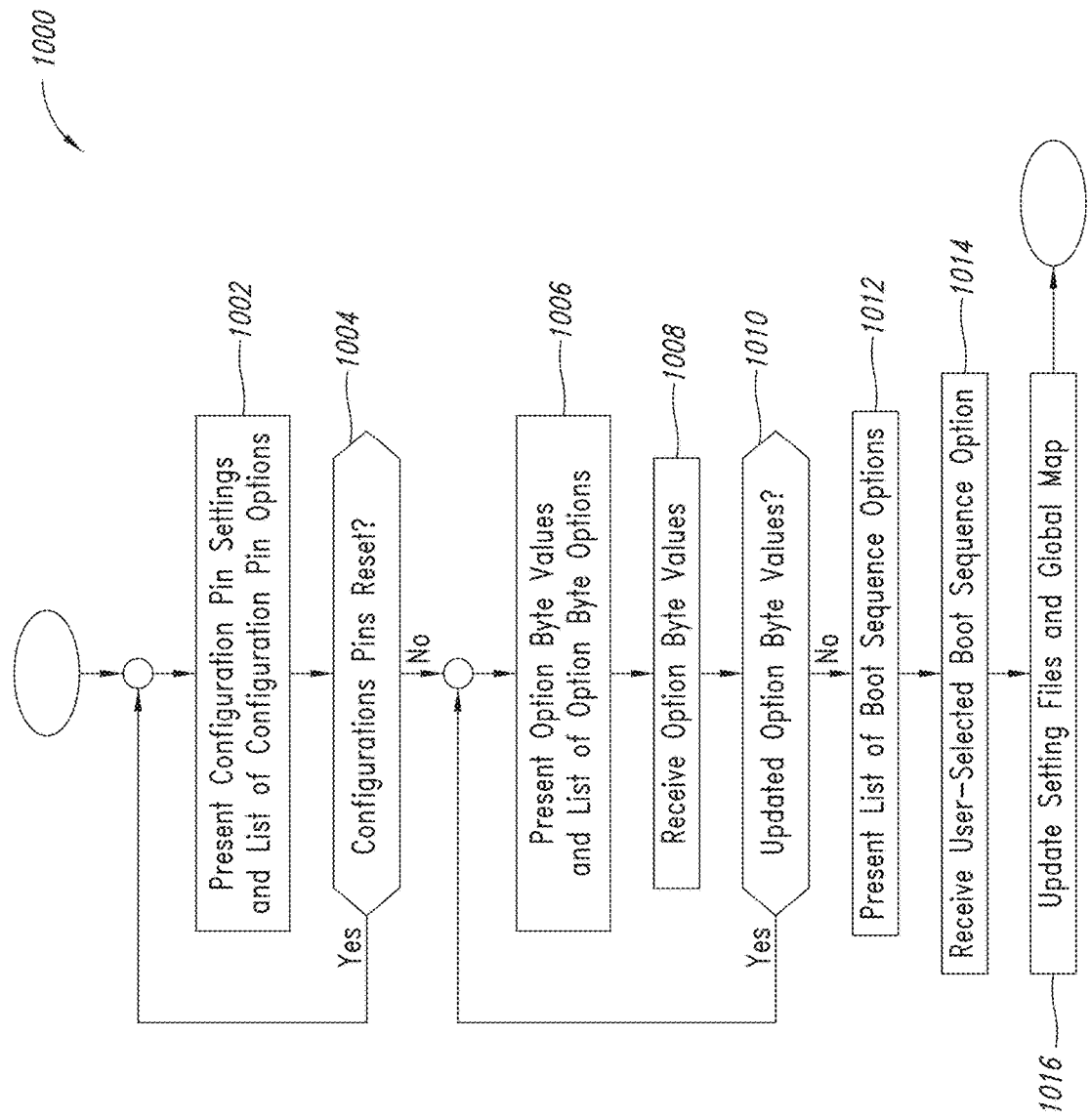
FIG. 10 shows a logical flow diagram of a process for generating content associated with a boot sequence of a programmable computing device in accordance with embodiments described herein.

FIG. 10 shows a logical flow diagram of a process 1000 for generating content associated with configuring a boot sequence of a SoC in accordance with some embodiments described herein. For example, process 1000 may be employed to configure the boot sequence of the programmable computing device 108 of FIG. 1. Process 1000 may be called by another process, such as by process 900 at block 904.

Figure 11:
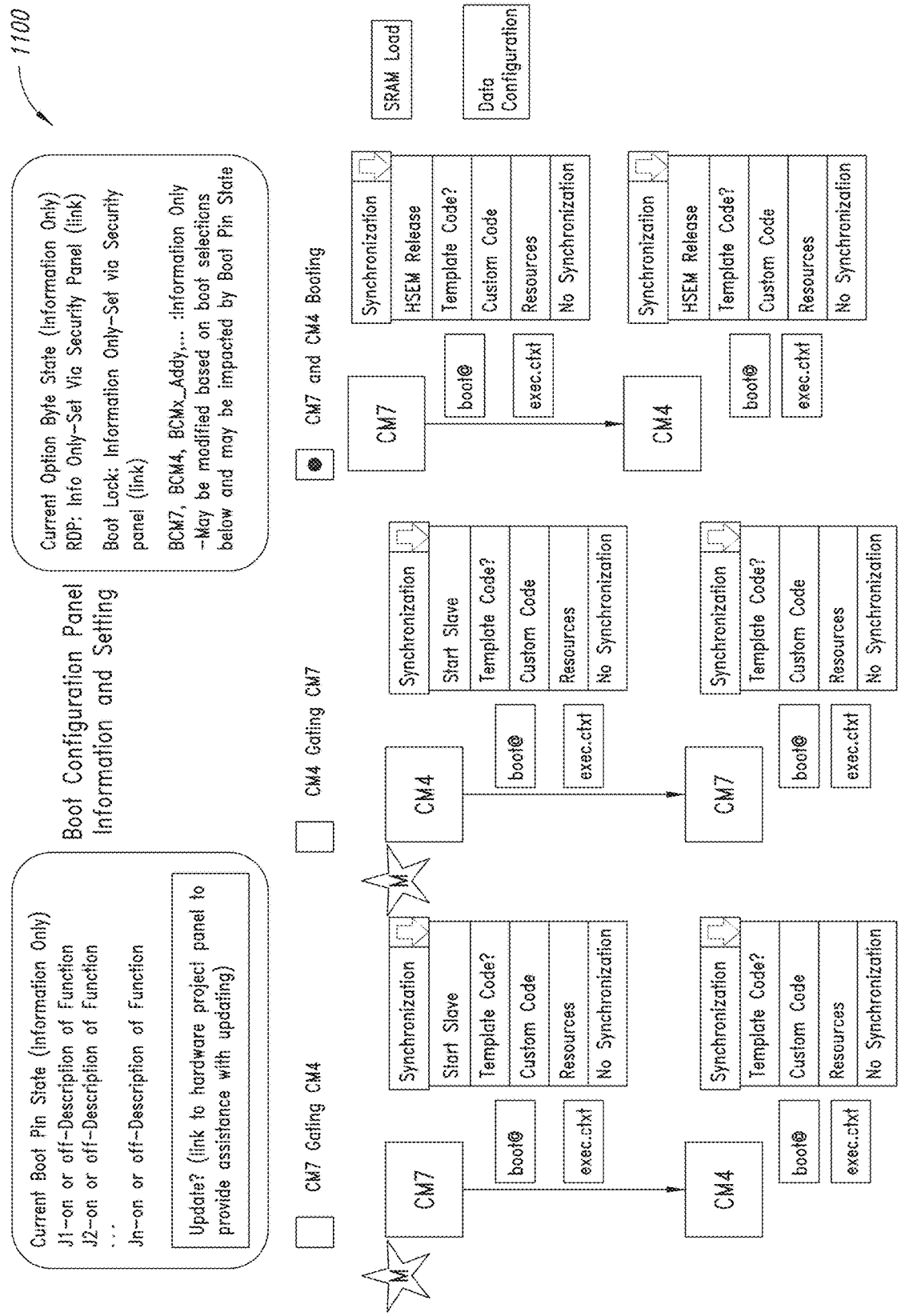
FIG. 11 is an illustrative example of a graphical user interface to enable a user to select parameters and options associated with a boot sequence in accordance with embodiments described herein.

After a start block, process 1000 proceeds to block 1002, where the process 1000 presents current configuration pin settings and optionally a list of configuration pin options using a user interface. The process 1000 may read or retrieve the configuration pin settings of a programmable computing device, and display those settings using the user interface. The display also may include other information which is dependent on the configuration pin settings, or the ramifications of the current configuration pin settings. For example, the configuration pin settings may define the available boot sequence options or the compatible option byte values, and this information may be displayed along with the current configuration pin settings. Information regarding potential changes to the configuration pin settings also may be presented. For example, a configuration pin setting may control whether a particular processing core can serve as a master to another processing core, and the user interface may display an indication of the settings which enable or disable such functionality, and how to change the pin setting. In another example, information may be presented regarding any constraints on the configuration pin settings, such as information that a particular pin is not connected on a selected board. An example user interface 1100 is shown in FIG. 11 and discussed in more detail below.

The process 1000 proceeds from block 1002 to determination block 1004, where the process 1000 determines whether the configuration pin settings have changed. For example, the user interface may allow the user to, after manually changing the pin settings, select or provide an indication that the configuration pin settings have been reset. In some embodiments, the process 1000 may read or retrieve the configuration pins settings periodically or in response to a user selection (e.g., selection of an option byte value or a boot sequence option, to, for example, confirm that the configuration pin settings are compatible with the user selection or have not changed. When it is determined that the configuration pin settings have changed or been reset, the process 1000 loops from block 1004 to block 1002 to update the presented configuration pin settings, options and related information. When it is not determined at 1004 that the configuration pin settings have been changed or reset, the process proceeds from block 1004 to block 1006.

At block 1006, the process 1000 presents current option byte values or settings, and optionally a list of option byte options or a field in which an option byte value may be entered using a user interface (e.g., templates, parameters or templates and parameters may be presented to the user for selection). The process 1000 may read or retrieve the option byte values (e.g., default values) of a programmable computing device, and display those values using the user interface. The display also may include other information which is dependent on the option bytes values, to display the ramifications of the current option byte values and possible changes thereto. For example, the option byte values may define the available boot sequence options or the compatible configuration pin settings, and this information may be displayed along with the current option byte values. Information regarding changes to the option byte values also may be presented. For example, an option byte value may define resources available to a processing core, or a trust zone associated with a processing core, and the user interface may display an indication of the how the option byte values impact such functionality. An example user interface 1100 is shown in FIG. 11 and discussed in more detail below.

The process 1000 proceeds from block 1006 to block 1008, where the process 1000 receives the user-selected option byte values. For example, a user may select an option byte value from a list of values for the option byte, select a set of option byte values for a set of option bytes, enter an option byte value, and various combinations thereof.

The process proceeds from block 1008 to decision block 1010, where the process 1000 determines whether the option byte templates or parameter values have changed. For example, the user interface may detect selection or entry of a different option byte value. In some embodiments, the process 1000 may read, retrieve or modify the option byte settings in response to another user selection (e.g., selection of a boot sequence option incompatible with the current option byte selections, modification of a configuration pin setting inconsistent with the selected option byte values, etc.). When it is determined that the option byte selections or values have changed, the process 1000 loops from block 1010 to block 1006 to update the presented option byte values, options and related information. When it is not determined at 1010 that the option byte values have been changed, the process proceeds from block 1010 to block 1012.

At block 1012, the process 1000 presents a list of boot sequence options. The presented list of boot sequence options may be defined by the current configuration pin settings and selected option byte values, or may include options which, when selected, modify or instruct the user to modify the selected option byte values, instruct the user to modify the current configuration pin settings, or various combinations thereof. The display also may include other information which is dependent on the boot sequence option selected, to display the ramifications of the various boot sequence options. For example, a particular boot sequence option may define resources available in an execution context, limit trust zones, etc.

Information regarding changes to the selected boot sequence options also may be presented. For example, a selected boot sequence option may define resources available to a processing core, or a trust zone associated with a processing core, and the user interface may display an indication of the how the boot sequence options impact such functionality.

Presenting a boot sequence option may include presenting sub-options and configuration selections. For example, a boot sequence option to set a particular processing core as a master may include sub-options or selections to select whether the master processing core starts the slave processing cores sequentially or in parallel, to display and select from available synchronization protocols and resources. In some embodiments, selecting a synchronization protocol may automatically select synchronization resources to be employed. For example, drivers to handle hardware semaphores or an asymmetric multiprocessing application to handle core-to-core communications may be automatically selected. In another example, options to introduce software component in the execution contexts of hardware execution units may be presented.

As noted above, an example user interface 1100 is shown in FIG. 11 and discussed in more detail below.

The process 1000 proceeds from block 1012 to block 1014, where the process 1000 receives the user-selected boot sequence option and any sub-options or selections. In at least one embodiment, a user may select a boot sequence option and any sub-options or selections from presented lists via the graphical user interface.

The process 1000 proceeds from bock 1014 to block 1016, where the process 1000 updates the settings structures, the global map or settings registry, or both. This may include any global map or settings registry of any impacted project as well as a system level global map or settings registry of the boot sequence configuration. Updating the settings structures and the global maps or settings registry may be done, for example, as discussed above with reference to blocks 318 and 320 of the process 300 of FIG. 3. After block 1016, process 1000 returns to a calling process (e.g., process 900) to perform other actions or terminates.

Embodiments of the process 1000 illustrated in FIG. 10 may have more process blocks than illustrated, may have fewer process blocks than illustrated, and the process flow may be modified in various ways. For example, process 1000 may be modified to perform blocks 1002 to 1004 associated with the configuration pin settings, blocks 1006 to 1010 associated with the option byte options and values, and blocks 1012 to 1014 associated with the boot sequence options in various orders or in parallel, instead of in the illustrated sequence, may be modified to present option byte settings while restricting or prohibiting changes to the option byte values, may be modified to include error processing blocks, such as blocks to notify a user of incompatible or inconsistent user selections, etc.

FIG. 11 is an illustrative example of a graphical user interface 1100 to enable a user to select templates and parameters for a boot sequence of a programmable computing device in accordance with embodiments described herein. This graphical user interface 1100 can display different configurations and possible values for multiple templates, parameters, and boot sequence options depending on the configuration of a programmable computing device, such as the configuration pin settings, and the option byte states. As illustrated, based on the current configuration pin settings, three boot sequence options are presented, CM7 as a master core and CM4 as a slave core, CM4 as a master core and CM7 as a slave core, and CM7 and CM4 booting in parallel. Some embodiments may present more, or fewer, boot sequence options. As illustrated the user has selected CM7 and CM4 booting in parallel.

In a selected boot sequence option, the user may select a synchronization protocol, which may include no synchronization, optionally selecting synchronization code from a template, or indicating custom synchronization code will be provided, for example, when a hardware execution unit is configured or a configurable component is configured. Drop down menus or pop-up menus may be employed to allow the user to make selections or enter configuration information. For example, when a pop-up menu may appear when a user indicates code is to be selected from a set of templates. The user also may select or enter a boot address and an execution context associated with the core. For example, each core may be assigned to a different software project or execution context. The user interface as illustrated also includes an SRAM Load selector, which may allow the user to assign to the master RAM (e.g., internal or external SRAM) to load slave code from flash for execution by the slave, a data configuration selector for the master to set data sections and a stack pointer for a slave, etc.

A process (e.g., process 1000 of FIG. 10) employing a user interface, such as the user interface 1100 of FIG. 11, may include checks as selections are made by the user. For example, if a user selection is inconsistent with a current configuration pin setting or an option bytes value, the user may be prompted to manually modify the configuration pin settings or modify the option bytes, or the option bytes selections may be changed based on the selection. In another example, only compatible boot configuration selections may be presented, or alternatively, after a boot configuration selection is made, only compatible option byte values may be presented for selection.

FIG. 11 is for illustrative purposes and should not be considered as limiting. Other information or data may displayed to a user via the graphical user interfaces in accordance with embodiments described herein. In addition, the process 1000 and the user interface 1100 may be employed to configure a programmable computing device having more than two cores, more than one system on a chip (e.g., a board having multiple SoCs), etc. Such a computing device may be configured with multiple masters having respective slaves, etc.

Programmable computing devices, such as a programmable SoC, are becoming more complex and often utilize different software-configurable peripherals or components. A SoC may, for example, have many multiple internal peripherals (e.g., a timer, a UART, I2C, SPI, etc.) and multiple external peripherals (e.g., dedicated or general-purpose input/output interfaces), such as described above with reference to FIG. 1. The configuration of these peripherals or components may be controlled at the software level, at the hardware level, or various combinations thereof. The configuration of one such peripheral, however, often relies on the configuration of other peripherals, which the user may or may not know about and may already be used for another peripheral. This complexity makes such configurations time consuming, error prone, and can lead to duplicate or incorrect use of some peripherals.

A computer architecture and a method for utilizing a graphical user interface, such as those described above with respect to FIGS. 1-11, may be arranged to enable a user to select specific parameters of one or more SoC peripherals and to generate settings code and other content to configure the SoC in accordance with the user-selected peripherals and parameters. The code and content may also include instructions to assist the user in making any physical changes to the SoC consistent with the desired configuration (e.g., jumper setting instructions, such as configuring a UART to 115200 bauds with RX pin on GPIO AO and TX pin on GPIO A1, pad to bond information, etc).

Figure 12A:
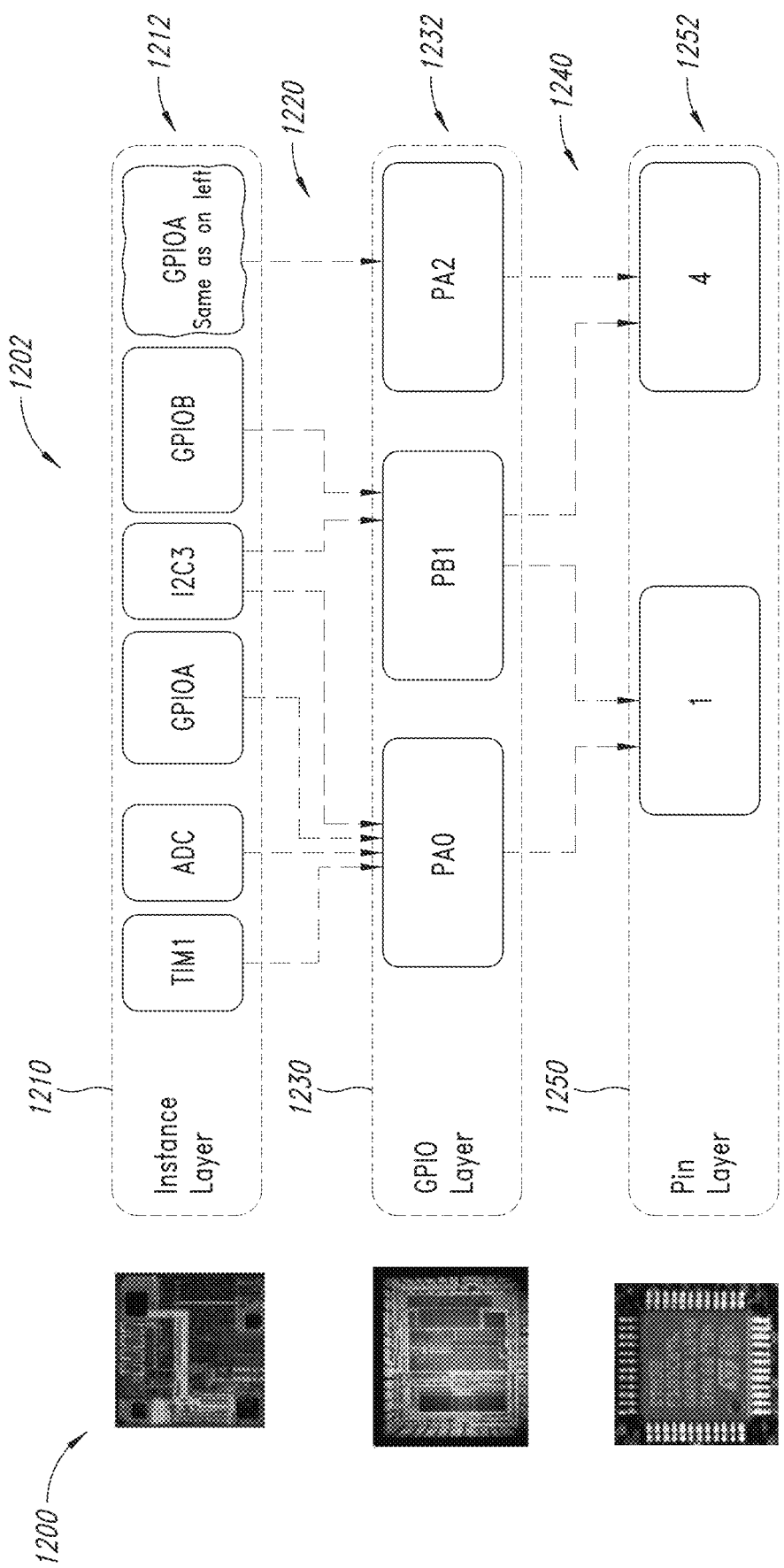
FIGS. 12A and 12B illustrate an example of a graphical user interface to enable a user to select signal couplings and connections associated with internal peripherals in accordance with embodiments described herein.
Figure 12B:
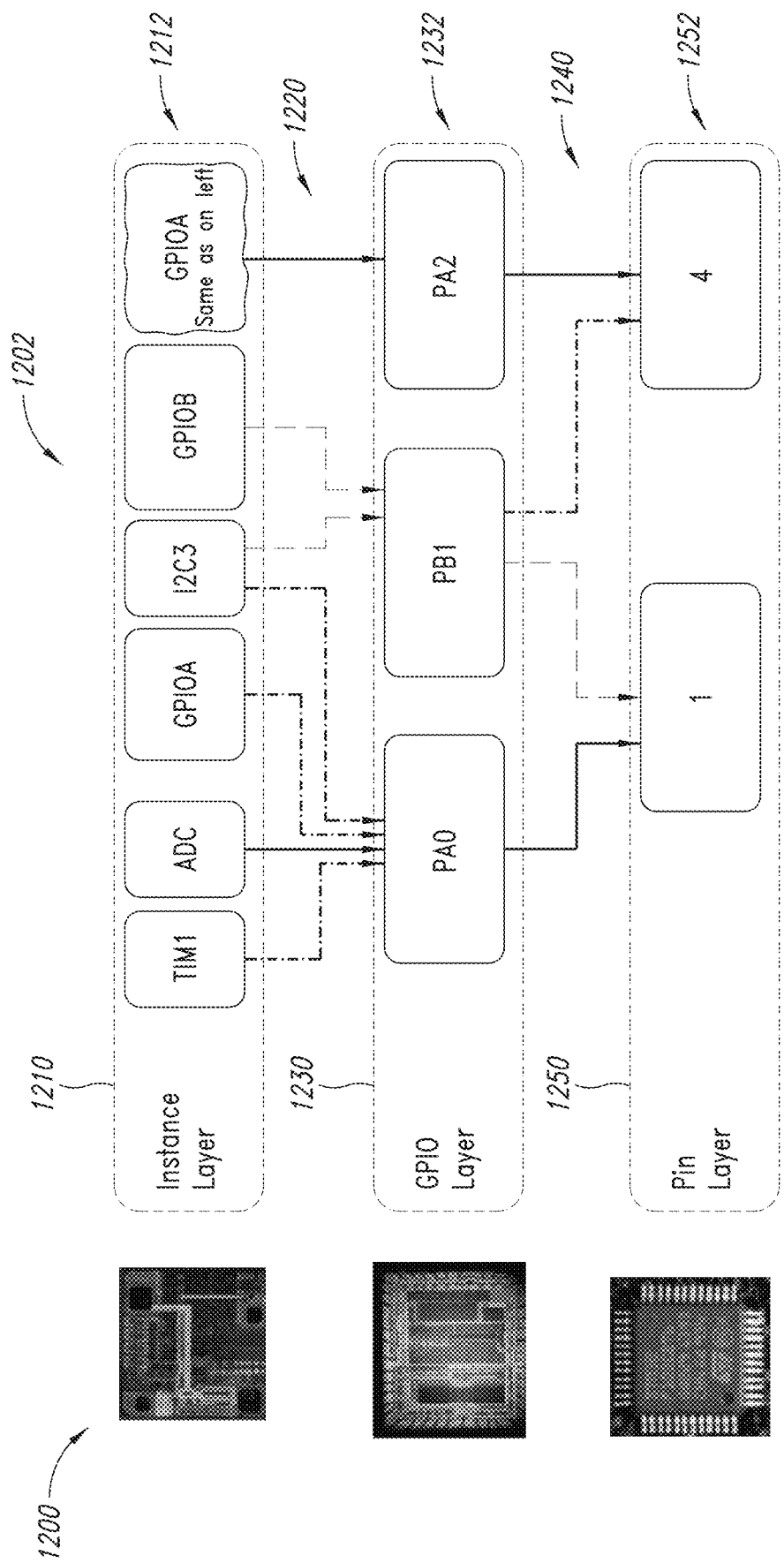

FIGS. 12A and 12B (collectively, FIG. 12) illustrate an example of a graphical user interface 1200 to enable a user to select and configure peripherals of a programmable computing device in accordance with embodiments described herein. For convenience, FIGS. 12A and 12B will be described with reference to FIGS. 1-8. The graphical user interface 1200 can display different peripherals and GPIOs in conceptual layers and facilitates user configuration of the peripherals and the connections between nodes of the peripherals of the layers. In FIG. 12, the graphical user interface 1200 represents or presents the capabilities of a set of internal peripherals as a tree 1202 including an instance layer 1210, a GPIO layer 1230, and a package pin layer 1250, and the possible couplings and connections between the layers. For ease of illustration, three layers are shown in the user interface 1200 of FIG. 12. The graphical user interface 1200 may have more than three layers, or fewer than three layers, depending, for example, on the complexity of the programmable computing device, or a configuration project associated with the graphical user interface 1200.

The instance layer 1210 includes a plurality of peripherals 1212, as illustrated a timer or clock TIM1, an analog to digital converter ADC, a GPIO interface GPIOA, an I2C interface I2C3, and a second GPIO interface GPIOB. For example, the internal peripherals 132 and the GPIO 134 of the processing core 114*a* of FIG. 1 may be represented as peripherals 1212 of an instance layer 1210 of the user interface 1200 of FIG. 12. Similarly, the internal peripherals 132 and the GPIO 134 of the processor 110*a* may be represented as peripherals 1212 of an instance layer 1210 of the user interface 1200 of FIG. 12. In another example, pertinent internal peripherals 132 and GPIOs 134 of multiple SoCs 109 may be presented in one or more instance layers. Internal peripherals 132 which are not pertinent to a particular configuration project (e.g., not available for use in the project context) may be omitted from the presentation of the user interface 1200. The GPIO layer 1230 includes a plurality of nodes 1232, as illustrated nodes PA0, PB1, and PA2, of a GPIO. For example, the GPIO 134 of the processor 110*a* of FIG. 1 may be represented as GPIO layer 1230 of the user interface 1200 of FIG. 12. Similarly, the GPIO 134 of the programmable computing device 108 of FIG. 1 may be represented as a GPIO layer 1230 of the user interface 1200 of FIG. 12. In another example, multiple GPIOs 134 of multiple SoCs 109 may be presented in one or more GPIO layers.

The user interface 1200 illustrates possible signal couplings 1220 between the peripherals 1212 of an instance layer 1210 and nodes 1232 of a GPIO layer 1230. The signal couplings between an instance layer 1210 and a GPIO layer 1230 may be controlled by software (e.g., controlling switches, controlling multiplexers, controlling signal timing, etc., and various combinations thereof), settings in memory (e.g., settings files 224, option bytes 117), configuration pins, etc. For ease of illustration, the signal couplings 1212 are illustrated in FIG. 12 as unidirectional signal couplings to transmit a signal from a peripheral device 1212 of the set of peripheral devices to a node 1232 of the plurality of nodes. Embodiments may include bidirectional signal couplings and unidirection signal couplings to transmit a signal from a node 1232 of the plurality of nodes to a peripheral device 1212 of the set of peripheral devices, and various combinations thereof.

The representation of possible signal couplings 1220 may be updated, in real time or otherwise, as selections are made by the user, as selection checks are performed by the system 150 (e.g., software coherency checks, electrical behavior checks, etc.). This may be done, for example, based on the global map or settings registry 222, the settings files 224 or other temporary selection indicators (e.g., prior to completing of a configuration project and updating of the global map or settings registry 222), stored information regarding characteristics of the programmable computing device and components thereof, etc., and various combinations thereof.

In FIG. 12A, the signal couplings 1220 are illustrated as dashed lines to indicate all the present signal couplings are available for selection. FIG. 12A, for example, may illustrate a user interface 1200 at the beginning of an internal peripheral configuration process.

In FIG. 12B, example signal couplings 1220 which have been selected are illustrated as solid lines, signal couplings 1220 which remain available are illustrated as dashed lines having dashes of a uniform length, and signal couplings 1220 which are not available (e.g., as a result of another signal coupling or configuration selection) are illustrated as dash lines of varying lengths. FIG. 12B, for example, may illustrate a user interface 1200 at a beginning stage, an intermediate or a final stage of an internal peripheral configuration process.

In the example of FIG. 12B, a signal coupling 1220 between peripheral 1212 ADC and pad 1232 PA0 is illustrated as selected, the signal couplings 1220 between other peripherals 1212 of the instance layer 1210 and pad 1232 PA0 are illustrated as not available, the signal couplings 1220 between other peripherals 1212 of the instance layer 1210 and pad 1232 PB1 are illustrated as available, and the signal coupling 1220 between peripheral 1212 GPIOA and pad 1232 PA2 is shown as selected.

Other methods of illustrating whether a signal coupling 1220 is selected, available, or unavailable may be employed (e.g., different colors), and additional or fewer indications of coupling availability may be indicated (e.g., timing restrictions may be indicated, unavailable signal couplings may be omitted, etc.), and the indications may change as different peripherals are selected for configuration (e.g., when the timer TIM1 is selected for configuration, signal couplings 1220 associated with the timer TIM1 may be displayed, while other signal couplings are not displayed by the user interface 1200 or are displayed in shadow).

In FIG. 12, GPIOA is represented in the internal peripherals 1212 twice, to facilitate indicating additional signal coupling capabilities of the GPIOA (e.g., to couple to PA0 or PA2). For example, PA0 may be coupled to GPIOA as an input, while at the same time, PA2 is coupled to GPIOA as an output. Presenting GPIOA twice makes the presentation clearer.

The pin layer 1250 of the graphical user interface 1200 as illustrated includes a plurality of pins 1252, as illustrated pins 1 and 4, which facilitate coupling a programmable computing device to external devices, such as external peripherals (e.g., interfaces, controllers, etc., not shown). For example, pins of the input/output interface 112 of the programmable computing device 108 of FIG. 1 which are pertinent to a configuration project may be represented as pins 1252 of the pin layer 1250 of the user interface 1200 of FIG. 12. Similarly, pins of an input-output interface 112 of a SoC 109 may be represented as pins 1252 of the pin layer 1250 of the user interface 1200 of FIG. 12. In another example, pertinent pins 1252 of the programmable computing device 108, and of one or more SoCs 109 may be presented in one or more pin layers.

The user interface 1200 illustrates possible connections or bonds 1240 between the pads 1232 of the GPIO layer 1230 and the pins 1252 of the pin layer 1250. The connections or bonds 1240 between the GPIO layer 1230 and the pin layer 1250 may typically be controlled by configuration pins or may be physical bonds, etc. In some cases, a connections or bond 1240 may be controlled by software, or various combinations of configuration pins, physical bonds, and software.

For ease of illustration, the connections or bonds 1240 are illustrated in FIG. 12 as unidirectional signal couplings to transmit a signal from a GPIO node 1232 of the plurality of nodes to a pad 1252 of the plurality of pins of the pin layer 1250. Embodiments may include bidirectional connections or bonds and unidirectional connections or bonds, and various combinations thereof.

The representation of possible connections or bonds 1240 may be updated, in real time or otherwise, as selections are made by the user, as selection checks are performed by the system 150 (e.g., software coherency checks, electrical behavior checks, etc.) This may be done, for example, based on the global map or settings registry 222, settings files 224 or other temporary selection indicators (e.g., prior to completing of a configuration project and updating of the global map or settings registry), stored information regarding characteristics of the programmable computing device and components thereof, etc., and various combinations thereof.

In FIG. 12A, all of the connections or bonds 1240 are illustrated as dashed lines to indicate the connection or bond 1240 is available for selection. In FIG. 12B, example connections or bonds 1240 which have been selected are illustrated as solid lines, example connections or bonds 1240 which remain available are illustrated as dashed lines having dashes of a uniform length, and connections or bonds 1240 which are not available (e.g., as a result of another coupling, connection or configuration selection) are illustrated as dash lines of varying lengths. As shown in FIG. 12B, a connection or bond 1240 between pad 1232 PA0 and pin 1252 1 is illustrated as selected, a connection or bond 1240 between pad 1232 PB1 and pin 1252 1 is illustrated as available, a connection or bond between pad 1232 PB1 and pin 1252 4 is illustrated as not available, and a connection between pad 1232 and pin 1252 4 is illustrated as connected. In the illustrated configuration of FIG. 12B, internal peripheral 1212 ADC is coupled to pin 1252 1 through pad 1232 PA0 (e.g., to facilitate measurement by the ADC of a signal received in pin 1 of an SoC), and at the same time internal peripheral 1212 GPIOA is coupled to pin 1252 4 through pad 1232 PA2 (e.g., to facilitate GPIOA operating in input or output mode with respect to signals on pad PA2 corresponding to pin 4).

Other methods of illustrating whether a connection 1240 is selected, available, or unavailable may be employed (e.g., different colors), and additional or fewer indications of coupling availability may be indicated (e.g., timing restrictions may be indicated, unavailable signal couplings may be omitted, etc.), and the indications may change as different peripherals are selected for configuration (e.g., when the timer TIM1 is selected for configuration, connections or bonds 1240 associated with configuration of the timer TIM1 may be displayed, while other connections or bonds 1240 are not displayed by the user interface 1200), as different configuration projects are performed, etc.

FIG. 12B illustrates examples of selected signal couplings 1220 and connections or bonds 1240, and not limiting. Other signal couplings (not shown) may be employed. For example, in an embodiment a signal coupling 1220 between internal peripheral 1212 timer TIM1 and pad 1232 PA0 may be selected, and a signal coupling 1220 between internal peripheral 1212 ADC may be selected, for example, to provide a clock signal generated by timer TIM1 to the ADC (not shown), and the connection or bond 1240 between pad 1232 PA0 may be selected to make the clock signal available to an external device.

The operation of one or more embodiments will now be described with respect to FIG. 13, and for convenience will be described with respect to the embodiments of FIGS. 1 through 8 and 12 described above. In at least one of various embodiments, process 1300 described with reference to FIG. 13 may be implemented by or executed on one or more computing devices, such as host computing device 150 in FIG. 1 executing instructions, such as instructions 226 (see FIG. 2) stored in the memory 156.

Figure 13:
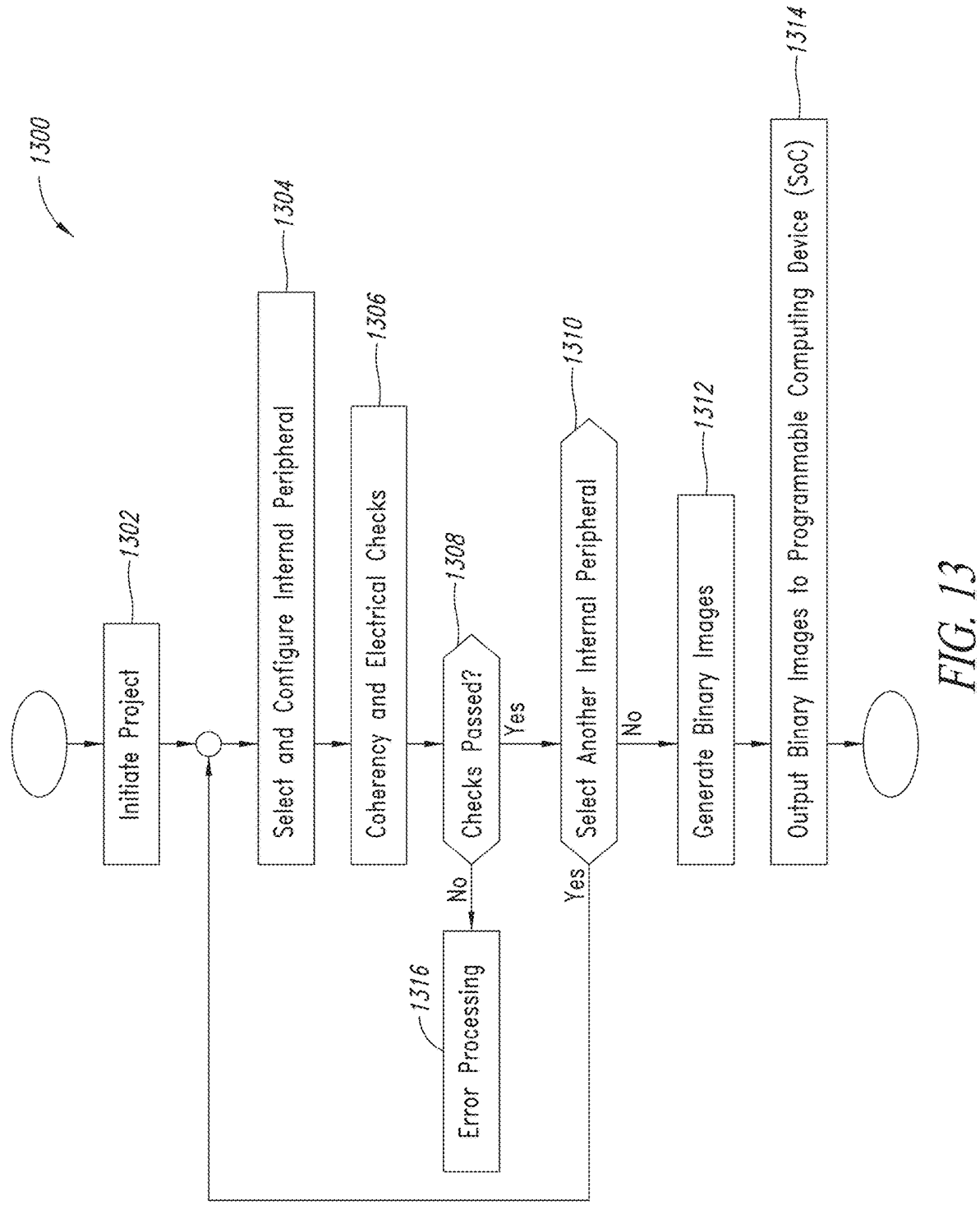
FIG. 13 shows a logical flow diagram of a process for generating content associated with configuring internal peripherals of a programmable computing device in accordance with embodiments described herein.

FIG. 13 shows a logical flow diagram of a process 1300 for generating content in accordance with some embodiments described herein. Process 1300 begins, after a start block, at block 1302, where a project is initiated for generating content to implement on or configure a programmable computing device, such as programmable computing device 108, SoC 109 in FIG. 1, etc. In some embodiments, the project initiation includes presenting a graphical user interface to a user. The graphical user interface requests or includes an input interface for the user to select a particular programmable computing device. A global map or settings registry for the project may be initiated or retrieved. The global map or settings registry may include a defined structure, which may be predefined, or initial settings for the particular programmable computing device.

As described above with reference to FIG. 3, in some embodiments, a single project for software and hardware is initiated for the programmable computing device. As such, a single global map or settings registry may be generated. In other embodiments, a first project may be initiated for software of the programmable computing device and a second project may be initiated for hardware of the programmable computing device. Separate global maps or settings registries may then be generated for the separate projects.

Process 1300 proceeds from block 1302 to block 1304, where the process 1300 presents configuration options and information and obtains configuration information from a user to configure one or more internal peripherals, such as configuration settings of the internal peripheral (see FIGS. 7 and 8) signal couplings between one or more internal peripheral of an instance layer and pads of a GPIO layer (see FIGS. 12A and 12B), connections between one or more pads of a GPIO layer and one or more pins of a pin layer (see FIGS. 12A and 12B), etc., and various combinations thereof. This may be done, for example, by using or calling the process 300 of FIG. 3 (e.g., blocks 304 to 320, discussed above). The information presented by the user interface may take the form of templates, parameters or templates and parameters, for example as described above with respect to FIGS. 1-8, as well as presentation of signal couplings and connections, for example, as described above with reference to FIGS. 12A and 12B. Multiple user interfaces may be employed. The user may use the user interface to select among the presented options or enter setting information directly.

For example, with reference to FIG. 12, a user may select one of the internal peripherals 1212 (e.g., clock or timer TIM1) for configuration by selecting the representation of the timer TIM1 in the user interface 1200. An option to set the timer parameters may be presented, and process 300 of FIG. 3 may be called to set the timer parameter. The user may select a signal coupling between the timer TIM1 and an available pad (as illustrated in FIG. 12A, pad 1232 PA0 is available for selection in association with TIM1), and a connection between a pad and a pin (as illustrated in FIG. 12, a connection between pad PA0 and pin 1 is available for selection). In some embodiments, the user may select a pin to be associated with a signal of a peripheral, and the process 1300 may select appropriate coupling and connections to configure the peripheral signal to be associated with the selected pin.

Process 1300 proceeds from block 1304 to block 1306, where the process 1300 preforms software coherency checks, electrical behavior checks, etc. This may be done, for example, based on the global map or settings registry 222, settings files 224 or other temporary selection indicators, stored information regarding characteristics of the programmable computing device and components thereof (e.g., the internal peripherals), etc., and various combinations thereof. Examples of coherency and electrical behavior checks are discussed below in the description of FIGS. 14 and 15.

Process 1300 proceeds from block 1306 to block 1308, where a determination is made as to whether the software coherency and electrical checks have been passed. When it is determined at block 1308 that the coherency and electrical checks have been passed, the process 1300 proceeds from block 1308 to block 1310.

At block 1310, a determination is made whether the user is to select another internal peripheral for configuration. If another internal peripheral is to be selected, process 1300 loops from block 1310 to block 1304 to select and configure the next internal peripheral; otherwise, process 1300 flows from block 1310 to block 1312.

At block 1312, the content generated for the internal peripheral is built, for example, into binary images. The binary images are the information usable by the programmable computing device to initialize, configure, or control its hardware, software, or a combination thereof. In some embodiments, all generated content is utilized to build the binary image for a project. In other embodiments, a portion, but not all of the generated content is utilized to build the binary image for the project. For example, in the case of a connection or bond between a pad and a pin, instructions to facilitate making the connection or bond may be generated.

Process 1300 proceeds from block 1312 to block 1314, where the binary images are provided to the programmable computing device. In some embodiments, process 1300 may be executed multiple times to generate different content for different configurations of the programmable computing device. In this way, different configurations can be provided to separate programmable computing devices (even if a same type of programmable computing device), or different configuration can be provided to a single programmable computing device to allow a user of the programmable computing device to change between the different configurations. After block 1314, process 1300 terminates or otherwise returns to a calling process to perform other actions.

When it is not determined at block 1308 that the coherency and electrical checks have been passed, the process 1300 proceeds from block 1308 to block 1316, where configuration error processing is performed, such as providing the user with information regarding the failure or a coherency or electrical check (e.g., identify a nature of a conflict given rise to the failure, other components or internal peripherals related to the conflict, etc.), presenting options for addressing the failure (e.g., returning to block 1304 to reconfigure the internal peripheral, reconfiguring another component or internal peripheral, etc.).

Embodiments of the process 1300 illustrated in FIG. 13 may have more process blocks than illustrated, may have fewer process blocks than illustrated, and the process flow may be modified in various ways. For example, process 1300 may be modified to configure multiple internal peripherals in parallel instead of sequentially, to add a decision block to configure additional elements before triggering code generation at 1312, to generate a report or document explaining the internal peripheral configurations (e.g., pin settings, a schematic of the signal connections, etc.), instead of or in addition to generating code at 1312, to include additional error processing, such as notifying a user of incompatible or inconsistent user selections, to combine block 1304 and 1306, to omit block 1314, etc.

Figure 14:
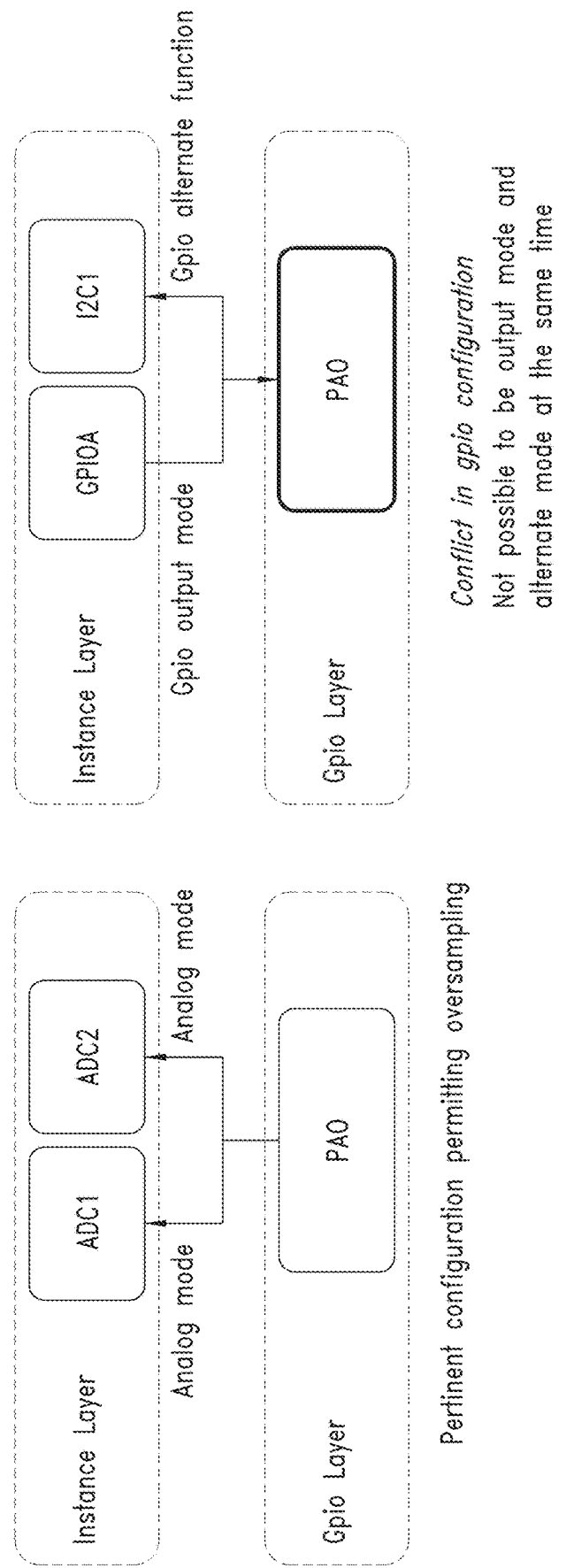
FIG. 14 is a conceptual diagram illustrating software coherency checking according with embodiments described herein.

FIG. 14 is a conceptual diagram illustrating signal coupling coherency checks according to an embodiment. On the left, with reference to the orientation of FIG. 14, a signal coupling between an analog signal input of ADC1 and pad PA0 is selected. In addition, a signal coupling between an analog signal input of ADC2 and pad PA0 is selected. The pertinent configurations of pad PA0 and of ADC1 and ADC2 are checked. The pertinent configuration information (e.g., in the settings registry 222) indicates oversampling is permitted, and the coherency check is passed.

On the right, again with reference to the orientation of FIG. 14, a signal coupling between internal peripheral GPIOA in output mode and pad PA0 is selected, as well as a signal coupling between interface I2C1 in alternative function mode and pad PA0 is selected. The pertinent configuration of pad PA0, GPIOA and IcC1 are checked. The pertinent configuration information (e.g., in the settings registry 222) indicates PA0 cannot be configured to operate in output mode and alternative mode at the same time, thus the coherency check is not passed. With reference to FIG. 13, process 1300 detects at block 1308 a coherence check failure and proceeds to block 1316 where error processing may occur.

Figure 15:
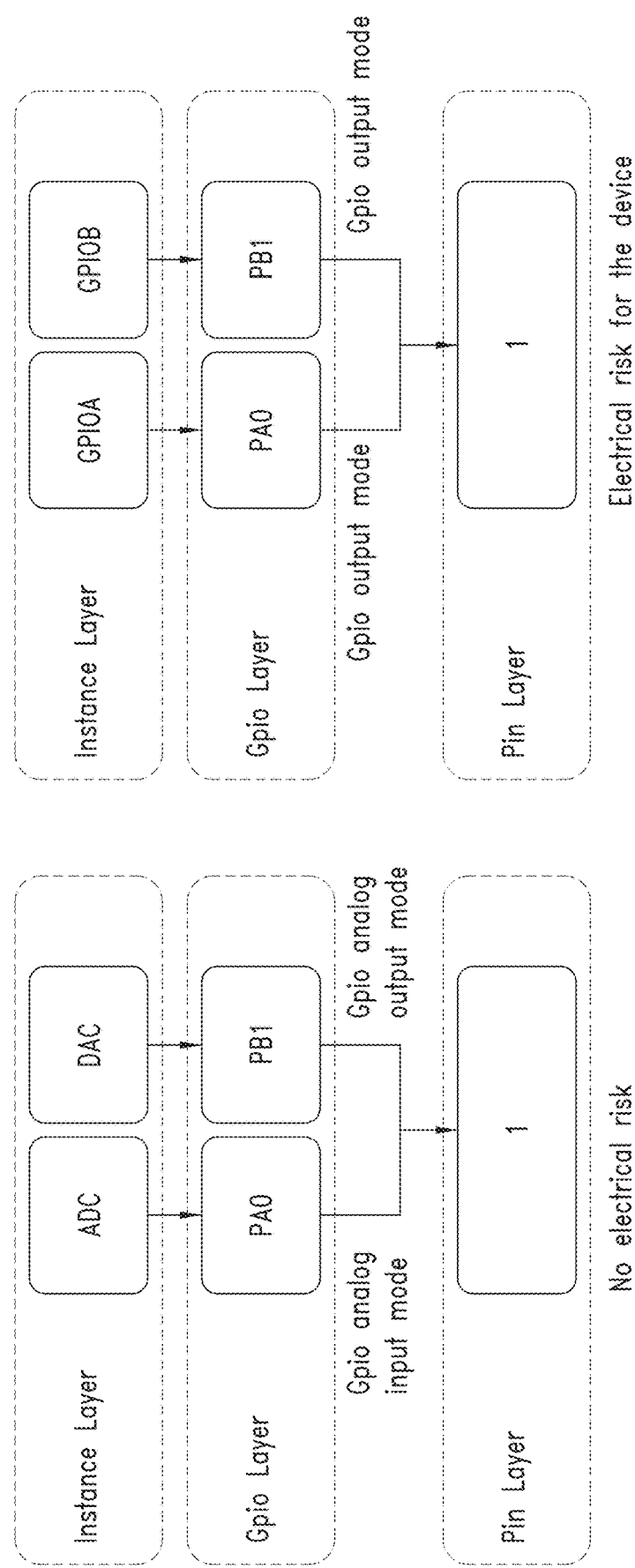
FIG. 15 is a conceptual diagram illustrating electrical integrity checking in accordance with embodiments described herein.

FIG. 15 is a conceptual diagram illustrating electrical integrity checks according to an embodiment. On the left, with reference to the orientation of FIG. 15, a signal coupling between an analog signal input of an ADC and pad PA0 is selected. In addition, a signal coupling between an analog signal output of a DAC and pad PB1 is selected. Pads PA0 and PB1 both are selected to have connections or bonds to pin 1 of the pin layer. The pertinent configurations of the ADC, the DAC, pads PA0 and PB1, and of pin 1 are checked. The pertinent configuration information (e.g., in the settings registry 222) indicates no electrical risk is presented, and the electrical integrity check is passed.

On the right, again with reference to the orientation of FIG. 15, a signal coupling between internal peripheral GPIOA in output mode and pad PA0 is selected, as well as a signal coupling between GPIOB in output mode and pad PB1. Pads PA0 and PB1 both are selected to have connections or bonds to pin 1 of the pin layer. The pertinent configurations of the GPIOA, GPIOB, pads PA0 and PB1, and of pin 1 are checked. The pertinent configuration information (e.g., in the settings registry 222) indicates an electrical risk is presented, and the electrical integrity check is not passed. With reference to FIG. 13, process 1300 detects at block 1308 an electrical integrity check failure and proceeds to block 1316 where error processing may occur.

Figure 16:
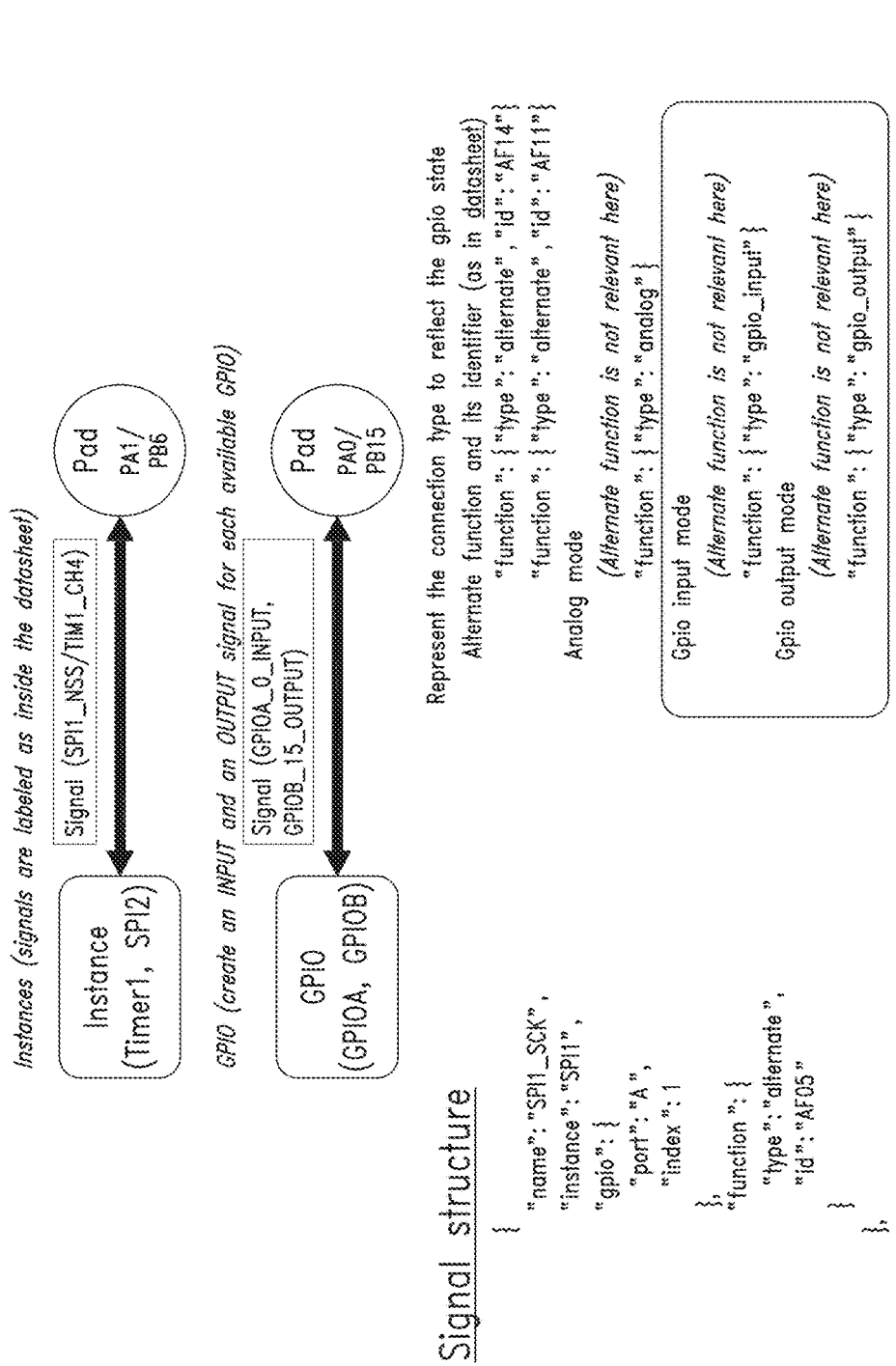

FIGS. 16 to 18 are illustrative examples of a component parameters files in accordance with embodiments described herein. In FIG. 16, the component parameters files identify characteristics of signals associated with internal peripherals of the programmable computing device, such as internal peripherals presented in an instance layer of a user interface, such as the user interface 1200 of FIG. 12. In FIG. 17, the pertinent components, signal couplings and connections or bonds of the programmable computing device are identified. FIG. 18 illustrates how the component parameters file of FIG. 17 indicates the user selection of internal peripheral GPIOA having an input associated with pin 4.

Embodiments may facilitate avoiding duplication of information, reducing the time required to design and implement a product, reducing configuration errors, and reducing the complexity of the presentation of the information. In an embodiment, the configuration information is stored and presented as a tree, which facilities using mathematical tree processing techniques to maintain and present the configuration information.

Embodiments also may facilitate checking (e.g., software consistency checking and electrical integrity checking) as part of the configuration process, and prompt incorporation of innovations and changes in technology into the design process (e.g., multi-bonding capabilities). An embodiment may facilitate configuring internal peripheral components of a programmable computing device to communicate with external devices via pins of the programmable computing device.

Programmable computing devices, such as a programmable SoC, may have a number of different system states which may require configuration. Such system states may have various resource configurations (e.g., operational states of various components). In addition, transitions from one system state to another system state may need to be configured for the programmable computing device. For example, an application may have a plurality of application states relating to various functions of the application, and may transition between the various application states. These application states and transitions between the application states may typically be defined by an application developer using appropriate tools. However, these application states may be associated with various system states, and transitions between the application states may result in a need to transition from one system state to a new system state.

Figure 19:
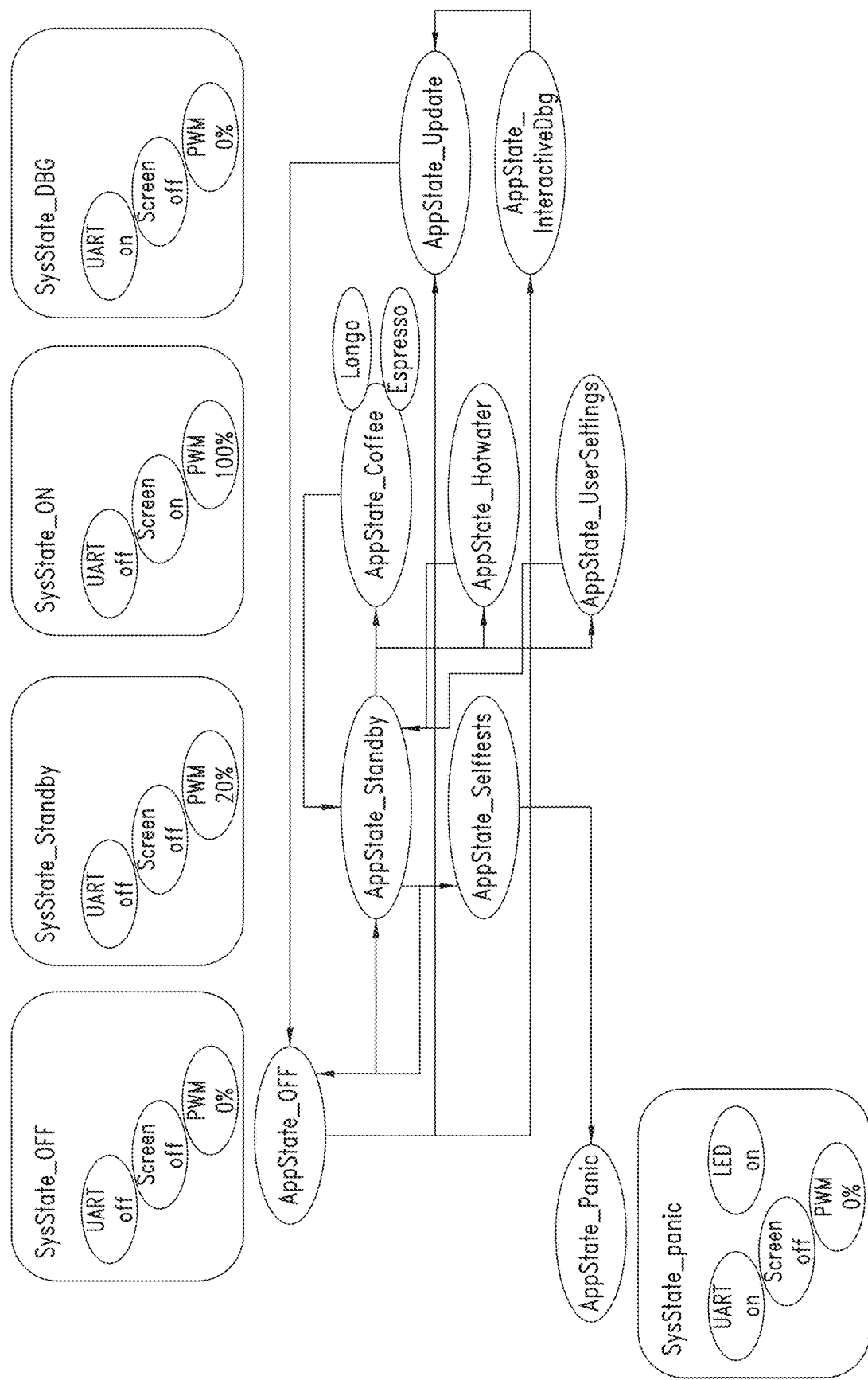
FIG. 19 is a conceptual diagram illustrating application state and system state transitions.

FIG. 19 is a conceptual diagram illustrating application state transitions in the context of a coffee machine control application (e.g., transitions between application states of a state machine controlling the coffee machine), and associated system state transitions. The coffee machine (not shown), may have, for example, a control screen, a UART for debugging, a pulse-width modulator (PWM) controller to drive components of the coffee machine (e.g., grinder, water heater, etc.), and an LED to alert a user to any fault conditions (e.g., water out, filter clogged, etc.). As illustrated, there are nine application states for the coffee machine control application, and five system states associated with the coffee machine controller system. One system state may be suitable for multiple application states; the system may have the same configuration or state, but the application may have different states with different commands and algorithms.

For example, as illustrated the application states AppState_Standby and AppState_Selftests are both associated with the system state SysState_Standby (in which the UART is configured to be off, the screen is configured to be off, and the PWM controller is configured to be at 20%). An application state transition from the application state AppState_Standby to the application state AppState_Selftests does not require a transition between system states.

However, transitions between application states associated with different system states may have associated transitions between system states. For example, transitions from the application state AppState_Standby to the application state AppState_Coffee is associated with a transition from the system state SysState_Standby to the system state SysState_On. In the system state SysState_On, the UART is off, the screen is on, and the PWM controller is configured to be at 100%. The transition between system states SysState_Standby and SysState_On needs to be defined.

In various embodiments, the user may be presented with a graphical user interface that enables the user to select system states, system state transitions, or a combination thereof for the programmable computing device. Once configured, the programmable computing device can perform various embodiments described herein to configure transitions from one system state to another system state. The operation of one or more embodiments will now be described with respect to FIGS. 20-25, and for convenience will be described with respect to the embodiments described above. In at least one of various embodiments, process 2000 described in conjunction with FIG. 20 may be implemented by or executed on one or more computing devices, such as host computing device 150 in FIG. 1. In at least one of various embodiments, processes 2100 and 2200 described in conjunction with FIGS. 21 and 22, respectively, may be implemented by or executed on one or more computing devices, such as programmable computing device 108 in FIG. 1.

Figure 20:
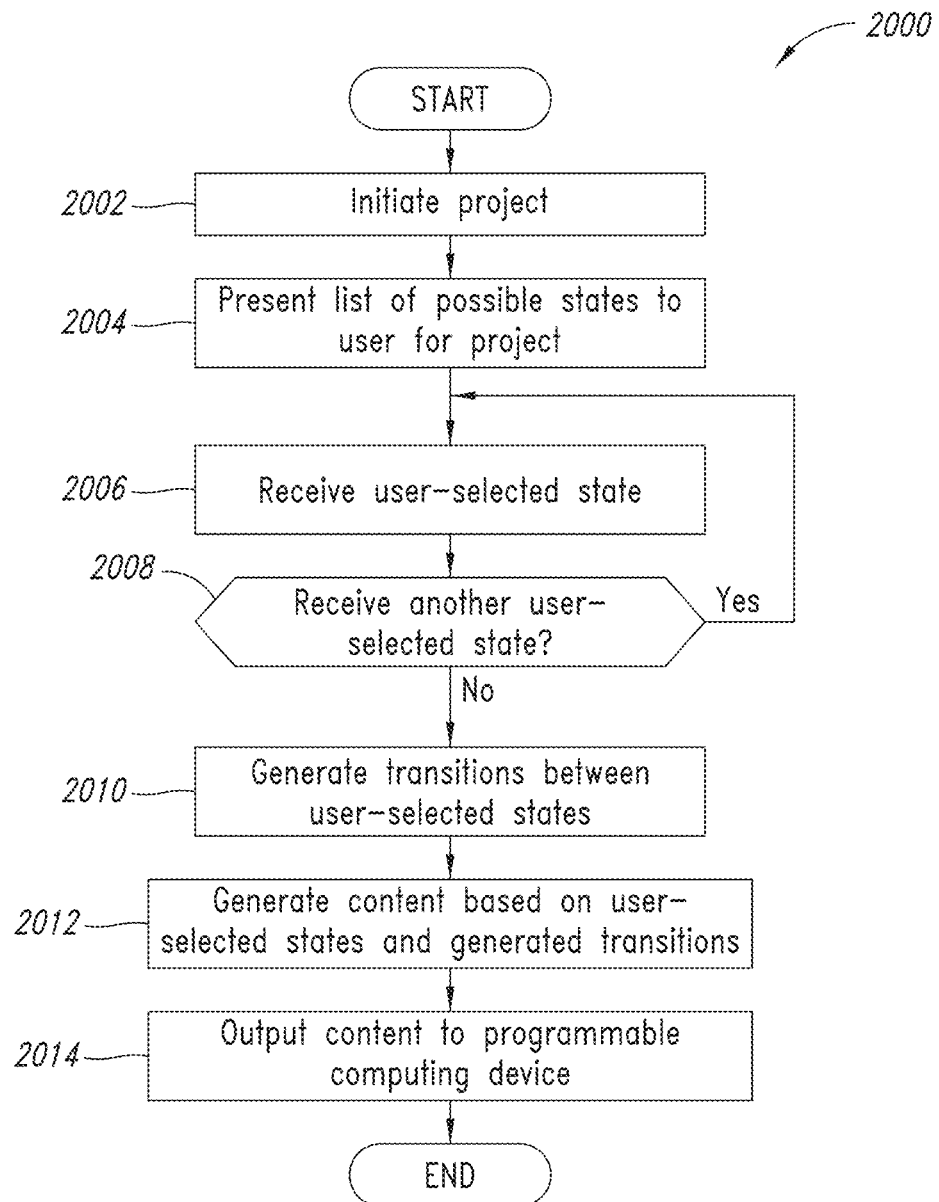
FIG. 20 shows a logical flow diagram of a process for generating content defining states and transitions in accordance with embodiments described herein.

FIG. 20 shows a logical flow diagram of a process 2100 for generating content defining system states and transitions in accordance with embodiments described herein. Process 2000 begins, after a start block, at block 2002 where a project is initiated for generating content to implement on or configure system states and transitions of a programmable computing device, such as programmable computing device 108 in FIG. 1. In some embodiments, the project initiation includes presenting a graphical user interface to a user. The graphical user interface requests or includes an input interface for the user to select a particular programmable computing device. A global map or settings registry for the project is also initiated. The global map or settings registry may include a defined structure or initial settings for the particular programmable computing device, e.g., a default structure or initial settings. In various embodiments, block 2002 may employ embodiments of block 302 in FIG. 3 to initiate one or more projects.

Process 2000 proceeds to block 2004, where a list of a plurality of possible system states for the project are presented to the user in the graphical user interface. In at least one embodiment, the list of possible system states may be generated for the user based on the particular programmable computing device selected for the project. These system states may be those system states that are designed for or compatible with the programmable computing device. In some embodiments, the list of system states may also be selected for presentation based on the execution context specificities of the programmable computing device. In some architectures, an execution context for a particular processing core or a particular mode of operation (e.g. TrustZone mode) may be selected by the user. The list of system states presented to the user can be dependent on these user selections.

The list of system states may include configurable system states (e.g., configurable components, such as configurable components 204 in FIG. 2), or non-configurable system states (e.g., non-configurable components, such as ready-to-go components 220 in FIG. 2), or some combination thereof. For example, a user may be presented with a list or other interface from which the user can define all the elements of a compound system state object (e.g., an execution context, a system clock configuration, a power mode, etc., and various combinations thereof).

Process 2000 continues at block 2006, where a user selection of a system state is received. In at least one embodiment, a user may select a system state from the list via the graphical user interface. Although process 2000 discusses a user's selection of a single system state at a time, embodiments are not so limited. In some embodiments, a plurality of system states may be selected by a user.

Each user-selected system state defines the configuration of the execution elements of the programmable computing device for the current project, which may include states for one or more execution contexts, peripheral states, or domain states. In various embodiments, the programmable computing device can include or utilize one or multiple Systems-on-a-Chip (SoCs) (see SoC 109 in FIG. 1), where each SoC can have one or multiple processing cores and one or more memories. The programmable computing device can also contain memories that are external to the SoCs. Accordingly, a user-selected system state may identify one or more resources (e.g., internal memories, external memories, internal or external peripherals, etc.) of the programmable computing device and their configurations. For example, a system state may identify the aggregation of a clock configuration; configurations of SoCs or processors (including pinout settings); communications between SoCs or processors; power settings (e.g., core low power state, power domains, regulators, wake-up signals, etc.); or other computing resource configurations or settings.

In some embodiments, the user-selected system state may identify from which other system states the programmable computing device can transition. In other embodiments, the user-selected system state may identify other system states to which the programmable computing device can transition.

The following is an example data structure of a user-defined system state of the programmable computing device:

```
{
    Id: ss0,// identifier within the application project
    Label: "myStandbyState",
    XCtxt: 0,// the execution context it belongs to within the application project
    SysClkCfg: sysclk0, // the system clock config to apply
    ResCfgs : [res0, res1, res2, res,3...] // identifiers of the configurations to be applied
    Predecessors: [ss1, ss2] // identifiers of the states the programmable computing device can transition from
    AssociatedDomStates[4]: [ss0, ss7] // in case of multi-context, the domain states to be applied in the other execution contexts if this one is the initiator
```

-continued

```
    Regulator: main or low power regulator,
    EntryCondition: WFI or WFE
}
```

In various embodiments, the graphical user interface may also enable the user to define a state. In at least one embodiment, the graphical user interface can be used by the user to type in code to execute the user-defined state or to upload a file with such code, such as a JSON file.

Process 2000 proceeds next to decision block 2008, where a determination is made whether another system state is selected by the user. If another system state is selected, process 2000 loops to block 2006 to receive the user selection of the other system state; otherwise, process 2000 flows to block 2010. As mentioned above, process 2000 may also be performed with the user selecting multiple system states, which can then be configured by the user together or individually. In various embodiments, the user-selected system states may also be selected and configured in response to or in conjunction with the selection and configuration of various other components, as discussed above.

At block 2010, transitions between the user-selected system states are generated. In some embodiments, the transitions may be determined or generated for the possible system states presented to the user, and in some embodiments the transitions may be pre-determined or pre-generated. In these cases, transitions associated with the user-selected system states are selected. In other embodiments, the transitions are defined by the user. In various embodiments, the transitions identify one or more constraints, one or more resource settings, etc. The following is an example data structure of transitions from one user-defined system state (e.g., Domain State 0) of the programmable computing device to another system state (e.g., Domain State 1):

```
Transition from Domain State 0 to Domain State 1:
    // *CONSTRAINT for putting the core in STOP mode : Suspend systick timer*
        HAL_SuspendTick( ); // e.g., apply_transition_constraint(core.mode, STOPx
    // *PERIPHERAL atomic configuration*
        //Deallocate USART3 to enable D2 enter Standby mode
            HAL_RCC_USART3_CLK_DISABLE( ); // e.g., DRIVER_Set( USART3.clock, disable
    // *SYSTEM MODE configuration*
        // Configure D3 domain to follow the CPU sub-system mode.
            HAL_PWREx_ConfigD3Domain(PWR_D3_DOMAIN_STOP); // e.g., apply_transition_constraint(pwdomain.d3,cpu_slave
        // Enter D3 Domain to STOP mode
            HAL_PWREx_EnterSTOPMode(PWR_MAINREGULATOR_ON, PWR_STOPENTRY_WFI,PWR_D3_DOMAIN); // e.g., DRIVER_Set( pwdomain.d3,STOP
        // Enter D1 and D2 to DStandby mode
            HAL_PWREx_EnterSTANDBYMode(PWR_D2_DOMAIN); // e.g., DRIVER_Set(pwdomain.d2,SBY)
            HAL_PWREx_EnterSTANDBYMode(PWR_D1_DOMAIN); // e.g., DRIVER_Set(pwdomain.d1,SBY)
```

Examples of a programmable computing device executing state transitions from one user-selected state to another user-selected state are discussed in more detail below in conjunction with FIGS. 22 and 23.

Process 2000 proceeds next at block 2012, where content for the programmable computing device is generated based on the user-selected system states and the generated transitions. In various embodiments, the content includes code, settings, parameters, option bits or bytes, EEPROM data, documentation, etc., and various combinations thereof, to set, configure, or define system states or system state transitions of the programmable computing device. The content may comprise plain code (e.g., C code) that is used by the programmable computing device to initialize, configure, or control a software or hardware aspect of the programmable computing device to set the user-selected states when enabled and the transitions from one state to another when requested. Accordingly, the generated content may be initialization code, application code, configuration code, etc. The content may also be other settings, parameters, or other information that initializes, configures, documents, or controls a software or hardware aspect of the programmable computing device. In various embodiments, the global map or settings registry, as described above, may be utilized to generate the content.

In some embodiments, the content is built into a binary image for the project. This binary image is the information usable by the programmable computing device to initialize, configure, or control its hardware, software, or a combination thereof to support the system states and transitions as employed by the programmable computing device. In some embodiments, all generated content is utilized to build the binary image for the project. In other embodiments, a portion, but not all of the generated content is utilized to build the binary image for the project. For example, in the case of interpreted languages, only specific content (e.g., generated code) may be uploaded in a specific memory region of the programmable computing device without regenerating the binary interpreting it.

Process 2000 continues to block 2014, where the content is provided to the programmable computing device. In some embodiments, process 2000 may be executed multiple times to generate different content for different configurations of the programmable computing device. In this way, different configurations can be provided to separate programmable computing devices (even if a same type of programmable computing device), or different configuration can be provided to a single programmable computing device to allow a user of the programmable computing device to change between the different configurations.

In various embodiments, the content is used by the programmable computing device to generate or define all possible system states or domain states. In some embodiments, the system states are applied at the project level and the domain states are applied at the execution context level. In some embodiments, the content defines one or more execution domains for the programmable computing device. Each execution domain identifies each execution element and their corresponding configurations for each user-selected system state in that execution domain. A system or global domain may also be defined by the content to identify each execution element and their corresponding configurations for each system state.

After block 2014, process 2000 terminates or otherwise returns to a calling process to perform other actions. Embodiments of the process 2000 illustrated in FIG. 20 may have more process blocks than illustrated, may have fewer process blocks than illustrated, and the process flow may be modified in various ways. For example, process 2000 may be modified to include a block presenting configuration update information to the user based on the updated global map or settings registry at 2000 (e.g., calling the process 400), or to include a consistency check block for settings in a defined state. In another example, a single global system state may be defined (bypassing the defining of transitions). It is noted that defining a single global system state may limit the ability to use inconsistent configurations.

Figure 21:
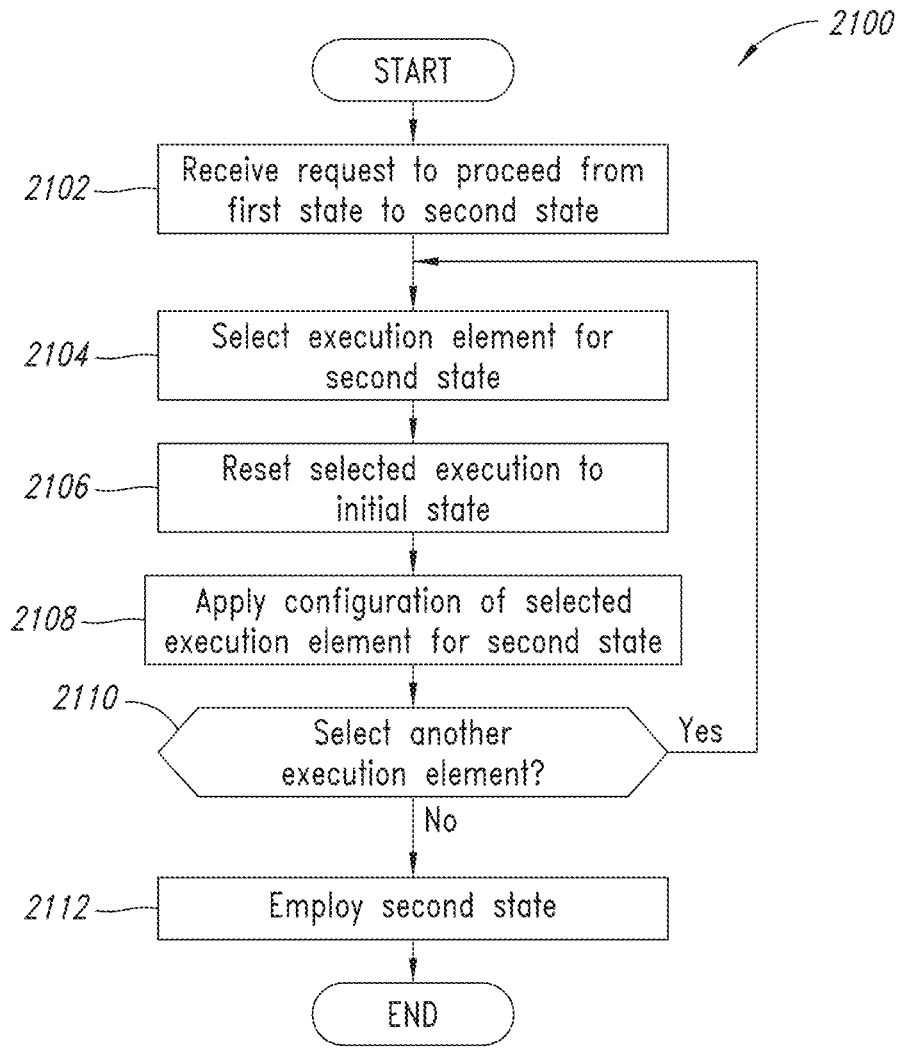
FIG. 21 shows a logical flow diagram of a process for transitioning from a first state to a second state in accordance with embodiments described herein.

FIG. 21 shows a logical flow diagram of a process 2100 by a programmable computing device for transitioning from a first system state to a second system state in accordance with embodiments described herein.

Process 2100 begins, after a start block, at block 2102, where a request is received to proceed from a first system state to a second system state. In various embodiments, the request may be input by a user of the programmable computing device. In other embodiments, an application or change in operating characteristic may be cause the request to be generated. For example, if the battery power of the programmable computing device falls below a threshold amount, then the system state of the programmable computing device may enter a low-power state. As another example, the user may select to change from a secure state to a non-secure state.

Process 2100 proceeds to block 2104, where an execution element is selected for the second state. Each execution element may be a resource of the programmable computing device and its corresponding configuration. An example of an execution element of the second state may be execution element 2428a in FIG. 24. In some embodiments, the second state may identify the order in which each execution element is selected. In various embodiments, the execution element is selected from the execution domain associated with the domain associated with the request to transition a domain state in that domain. In other embodiments, the execution element is selected from a global domain to transition a system state.

Process 2100 continues at block 2106, where the selected execution element is reset to an initial state. In some embodiments, the initial state may be a null state from which the execution element can be put into any valid configuration. In some embodiments, the first state from which the programmable computing device is transitioning to the second state may be an initialization state. In such an embodiment, block 2106 may not be performed because each execution element is already in an initial state.

Process 2100 proceeds next to block 2108, where the configuration of the selected execution element for the second state is applied. As mentioned herein, an execution domain may store the configuration of the execution element for each state. Accordingly, when the execution element is selected for the second state for that execution domain, the confirmation information for that execution element for that state is also obtained, which is then applied at block 2108. The programmable computing device may apply the selected execution element configuration by setting one or more parameters of the execution element.

Process 2100 continues next at decision block 2110, where a determination is made whether another execution element is to be selected. In various embodiments, each execution element associated with the second state is to be selected. If another execution element is to be selected, process 2100 loops to block 2104; otherwise, process 2100 flows to block 2112.

At block 2112, the second state is employed. In at least one embodiment, the programmable computing device may execute in accordance with the second state.

After block 2112, process 2100 terminates or otherwise returns to a calling process to perform other actions. Although process 2100 discusses transitioning from a first state to a second state, the programmable computing device may have a plurality of different states. Accordingly, process 2100 can also be employed to transition from a first state to a fourth state, from the fourth state to the second state, etc. depending on the states and transitions selected by the user and employed by the programmable computing device.

Figure 22:
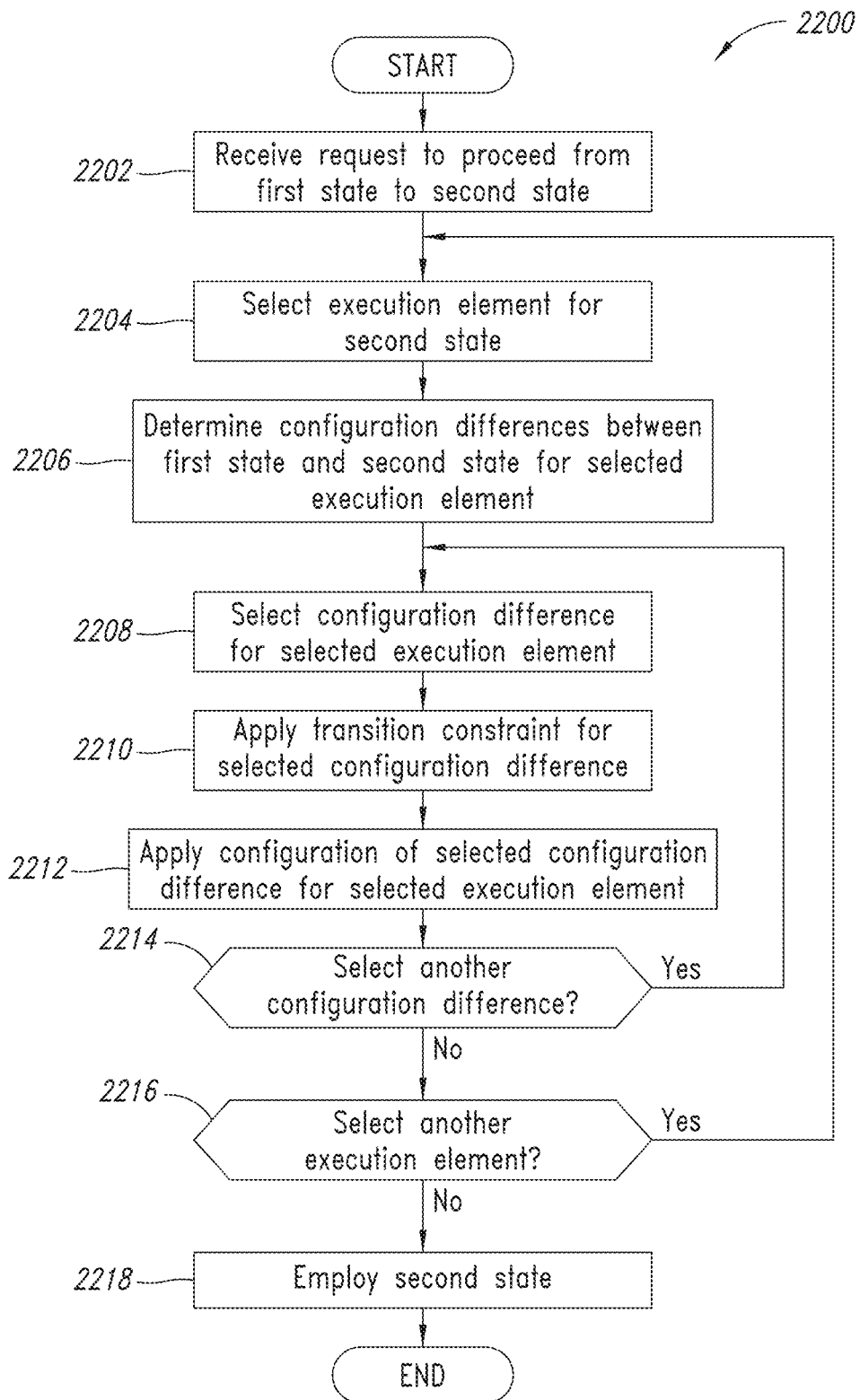
FIG. 22 shows a logical flow diagram of another process for transitioning from a first state to a second state in accordance with embodiments described herein.

FIG. 22 shows a logical flow diagram of another process 2200 for transitioning from a first state to a second state in accordance with embodiments described herein. Process 2200 begins, after a start block, at block 2202, where a request is received to proceed from a first state to a second state. In various embodiments, block 2202 may employ embodiments of block 2102 in FIG. 21 to receive the change-of-state request.

Process 2200 proceeds to block 2204, where an execution element is selected for the second state. In various embodiments, block 2204 may employ embodiments of block 2104 in FIG. 21 to select the execution element of the second state.

Process 2200 continues at block 2206, where a configuration difference between the first state and the second state is determined for the selected execution element. In some embodiments, the execution domain for the second state may identify the configuration differences between the states from which the second state can transition. In other embodiments, the programmable computing device compares the current configuration of the execution element with the second state configuration to determine the differences. In various embodiments, a plurality of configuration differences may be identified for the selected execution element.

Process 2200 proceeds next to block 2208, where one or more of the configuration differences determined at block 2206 is selected for the selected execution element. In some embodiments, the selected execution element may identify an order in which the configuration differences are to be selected. In at least one embodiment, this order may be based on the first state, the second state, or a combination thereof. In various embodiments, multiple configuration differences may be selected, such as if the configuration differences are to be applied at the same time.

Process 2200 continues next at block 2210, where one or more transition constraints are applied for the selected configuration difference. In at least one embodiment, the constraint is a configuration or parameter that enables the configuration difference to be applied without affecting the performance or implementation of another execution element or component of the programmable computing device. In various embodiments, the constraints prevent a forbidden transition or prevent the programmable computing device from entering into a non-state or invalid condition. For example, a processor may be put into a "Stop" mode for a particular configuration difference to be applied. In various embodiments, some configuration differences may not have a transition constraint.

Process 2200 proceeds to block 2212, where the configuration of the selected configuration difference is applied for the selected execution element. In some embodiments, only the configuration difference is applied. In other embodiments, the configuration as defined by the selected execution element is applied. In various embodiments, block 2212 may employ embodiments of block 2108 in FIG. 21 to apply the configuration difference.

Process 2200 continues at decision block 2214, where a determination is made whether another configuration difference is selected. In some embodiments, multiple configuration differences are sequentially selected, such that the transition constraints and configuration settings can be applied for each configuration difference of the selected execution element. If another configuration difference is to be selected, process 2200 loops to block 2208; otherwise, process 2200 flows to decision block 2216.

At decision block 2216, a determination is made whether another execution element is to be selected. In various embodiments, each execution element associated with the second state is to be selected. If another execution element is to be selected, process 2200 loops to block 2204; otherwise, process 2200 flows to block 2218.

At block 2218, the second state is employed. In at least one embodiment, the programmable computing device may execute in accordance with the second state.

After block 2218, process 2200 terminates or otherwise returns to a calling process to perform other actions. Although process 2200 discusses transitioning from a first state to a second state, the programmable computing device may have a plurality of different states. Accordingly, process 2200 can also be employed to transition from a first state to a fourth state, from the fourth state to the second state, etc. depending on the states and transitions selected by the user and employed by the programmable computing device.

Embodiments of the process 2100 illustrated in FIG. 21 and of process 2200 illustrated in FIG. 22 may have more process blocks than illustrated, may have fewer process blocks than illustrated, and the process flow may be modified in various ways. For example, process 2100 may be modified to include a block to check whether any conditions to employing the second state are satisfied after block 2110. Similarly, process 2200 may be modified to include a block to check whether any conditions to employing the second state are satisfied after block 2216. In another example, process 2100 shown in FIG. 21 and process 2200 shown in FIG. 22 may be modified to address synchronization issues, such as synchronization issues between different processing cores of a system during state transitions. For example, at some time during a process of transitioning a first processing core (see processing core 114a of FIG. 1) between a first state A and a second state B, it may be necessary to transition a second processing core (see processing core 114x of FIG. 1) from a first state C to a second state D. Thus, process 2100 or process 2200 may be modified, for example, to, during the process of transitioning the first processing core from state A to state B, to initiate a transition of the second processing core from state C to state D, before completing the transition of the first processing core from state A to state B.

Figure 23:
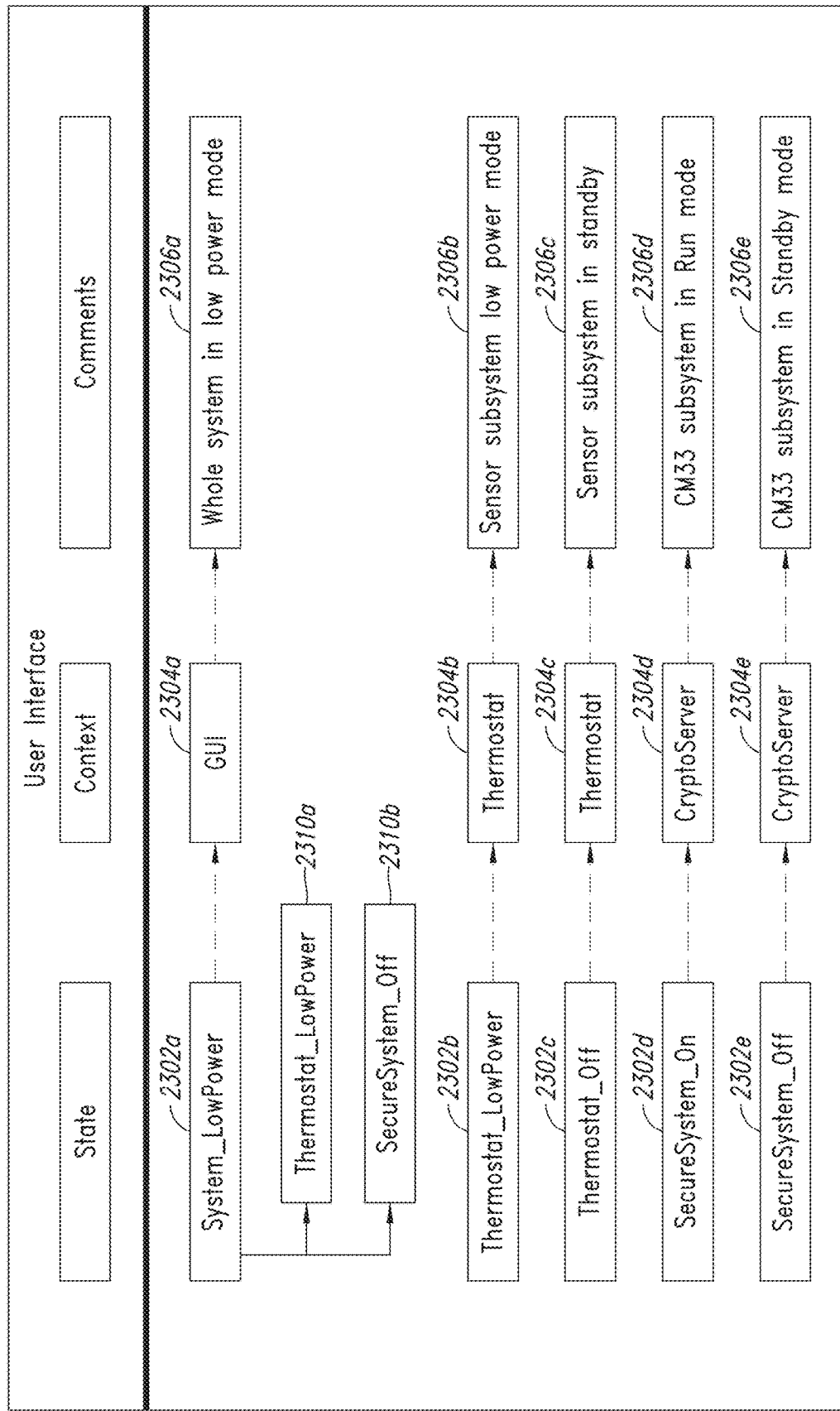
FIG. 23 is an illustrative example of a graphical user interface to enable a user to select states for a project in accordance with embodiments described herein.

FIG. 23 is an illustrative example of a graphical user interface 2300 to enable a user to select states for a project in accordance with embodiments described herein. Graphical user interface 2300 may display multiple different possible states to the user. In this example, the graphical user interface 2300 displays states 2302a-2302e to the user. State 2302a would put the programmable computing device into a low power mode; state 2302b would put a thermostat sensor of the programmable computing device into a low power mode; state 2302c would put turn off the thermostat sensor of the programmable computing device; state 2302d would put the programmable computing device into a secure mode; and state 2302e would put the programmable computing device into non-secure mode.

In various embodiments, the states may be configured in a tree structure to identify different possible execution levels within the programmable computing device. For example, states 2302a-2302e may be system states with settings not restricted to an execution domain, and states 2310a-2310b may be domain states with settings restricted to one execution domain. Although not illustrated, the graphical user interface 2300 may also include an input functions to allow the user to define the state.

The graphical user interface 2300 displays a corresponding context 2304a-2304e. The context 2304a-2304e identifies the component or owner in which the state 2302a-2302e corresponds. For example, state 2302b adjusts the state of a thermostat associated with the programmable computing device. The graphical user interface 2300 also displays corresponding comments 2306a-2306e for each state 2302a-2302e. The comments 2306a-2306e provides information to the user to identify the state and how it may operate.

The user can select a particular state by clicking on the state. In some embodiments, the graphical user interface 2300 can present (not illustrated) the user with additional options for selecting, defining, or configuring a state. The graphical user interface 2300 may also present (not illustrated) transition options for the selected state. These transitions may identify the execution elements associated with a transition, whether the transition is to be performed by going to an initialization state first, whether the transition is to determine the configuration differences, which states the programmable computing device can transition from when transitioning to the selected state, which states the programmable computing device can transition to when starting at the selected state, etc. In some embodiments, the user-selected states and transitions may also be displayed to the user.

Figure 24:
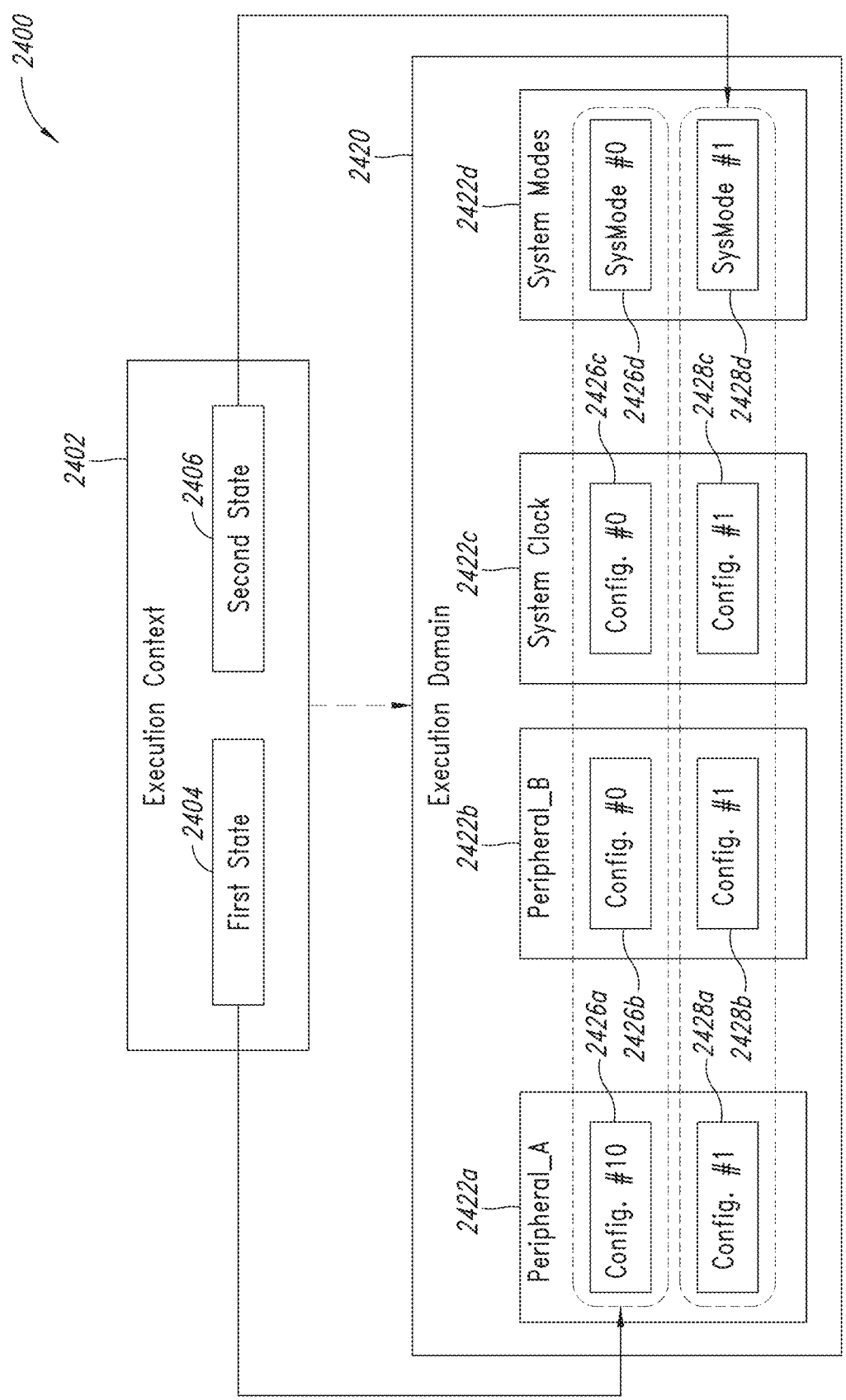
FIG. 24 is a block diagram showing an example conceptual structure for managing state information utilized in generating content in accordance with embodiments described herein.

FIG. 24 is a block diagram showing an example conceptual structure 2400 for managing state information utilized in generating content in accordance with embodiments described herein. In some embodiments, the conceptual structure 2400 may be displayed to a user in a graphical user interface to enable the user to see the execution elements associated with the different user-selected states, as well as their configuration information.

In this example, conceptual structure 2400 includes an execution context 2402 and an execution domain 2420. The execution context 2402 is a project, application, or specific use of the programmable computing device. The user has selected a first state 2404 and a second state 2406 to be accessible and utilized by the programmable computing device.

The execution domain 2420 stores information for each execution element 2422 associated with states 2404 and 2406. In this example, execution domain 2420 includes execution element 2422a for "Peripheral A," execution element 2422b for "Peripheral B," execution element 2422c for a system clock, and execution element 2422d identifying system modes (e.g., low power mode, secure mode, etc.). Execution element 2422a includes configuration information 2426a for the first state 2404 and configuration information 2428a for the second state 2406; execution element 2422b includes configuration information 2426b for the first state 2404 and configuration information 2428b for the second state 2406; execution element 2422c includes configuration information 2426c for the first state 2404 and configuration information 2428c for the second state 2406; and execution element 2422d includes configuration information 2426d for the first state 2404 and configuration information 2428d for the second state 2406. In various embodiments, the configuration information includes constraints, settings, parameters, or other information utilized to configure that execution element for that state.

If the programmable computing device is transitioning from an initialization state to the first state 2404, then configuration information 2426a-2426d is obtained and applied, as described herein. In some embodiments, if the programmable computing device is transitioning from the first state 2404 to the second state 2406, then configuration information 2428a-2428d is obtained and applied after the execution elements 2422a-2422d are first reset, as described herein. In other embodiments, a configuration difference is determined between the configuration information 2426a-2426d of the first state 2404 and the configuration information 2428a-2428d of the second state 2406 and then applied when transitioning between the first state 2404 and the second state 2406, as described herein.

Although conceptual structure 2400 shows a single execution context, a single execution domain, four execution elements, and two states, embodiments are not limited. Rather, one or more execution contexts may be employed, one or more execution domains may be employed for one or more of the execution context, one or more execution elements may be utilized for one or more of the execution domains, and one or more states may be selected by the user.

Figure 25:
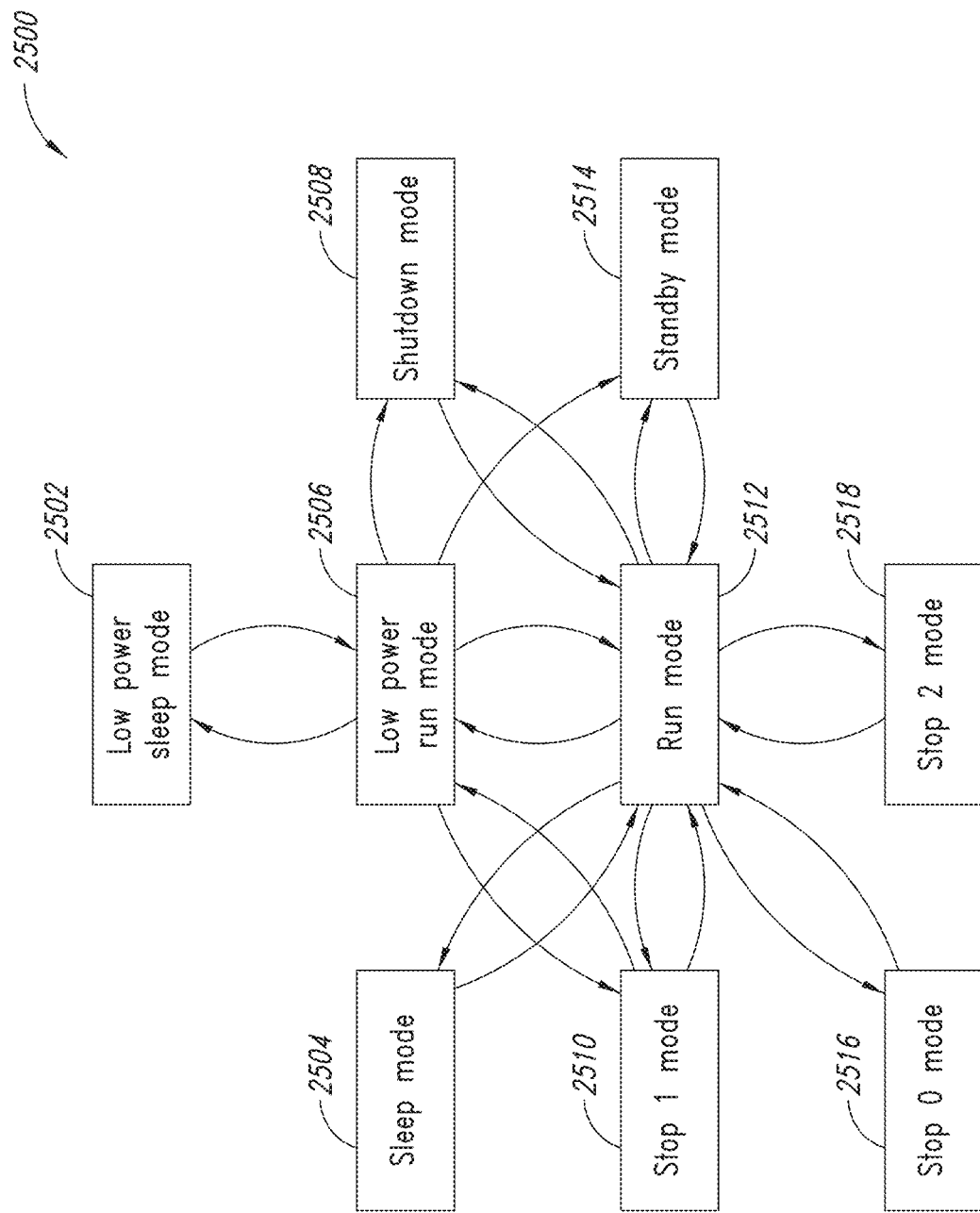
FIG. 25 is an illustrative example of a transition structure between user-selected states in accordance with embodiments described herein.

FIG. 25 is an illustrative example of a transition structure 2500 between user-selected states in accordance with embodiments described herein. In this illustrative example, the user has selected a "Low Power Sleep Mode" 2502, a "Sleep Mode" 2504, a "Low Power Run Mode" 2506, a "Shutdown Mode" 2508, a "Stop 1 Mode" 2510, a "Run Mode" 2512, a "Standby Mode" 2514, a "Stop 0 Mode" 2516, and a "Stop 2 Mode" 2518. By employing embodiments described herein, transitions between the user-selected states are generated for proper transitions between states. In some embodiments, transition structure 2500 may be displayed to the user to enable the user to "drag and drop" the transition arrows between states.

In various embodiments, a consistency checker may be employed to ensure proper transitions. For example, in some embodiments, the consistency check may make sure the domain state is consistent and that all peripheral configurations do not conflict (e.g., prevent turning on a peripheral using another peripheral that is turned off). In other embodiments, the consistency checker may make sure the system state is consistent such that domain state configurations do not conflict (e.g., prevent a core being set in STANDBY by one domain but set to RUN mode by another domain).

In an embodiment, a method includes: presenting, via a graphical user interface to a user, a list of components for a project associated with a programmable computing device; receiving, via the graphical user interface, a first selection of at least one user-selected component for the project from the list of components; in response to the at least one user-selected component being configurable: presenting, via the graphical user interface, a first list of user-selectable templates for the at least one user-selected component; receiving, via the graphical user interface, a second selection of at least one user-selected template from the first list of user-selectable templates; presenting, via the graphical user interface, a second list of user-selectable parameters for the at least one user-selected component; receiving, via the graphical user interface, a third selection of at least one user-selected parameter from the second list of user-selectable parameters; generating settings for the at least one user-selected component based on the second selection of the at least one user-selected template and the third selection of the at least one user-selected parameter; and generating or updating a settings registry based on the settings for each of the at least one user-selected component; and generating content for the programmable computing device based on the at least one user-selected component and the settings registry. In an embodiment, the method comprises providing the content to the programmable computing device. In an embodiment, generating the content comprises generating initialization code that initializes software of the programmable computing device based on the at least one user-selected component and the settings registry. In an embodiment, generating the content comprises generating initialization code that initializes hardware of the programmable computing device based on the at least one user-selected component and the settings registry. In an embodiment, generating the content comprises generating application code that controls software of the programmable computing device based on the at least one user-selected component and the settings registry. In an embodiment, receiving the third selection of the at least one user-selected parameter comprises receiving, via the graphical user interface, one or more values selected by the user and defined by the at least one user-selected parameter. In an embodiment, the method comprises, in response to receiving the third selection of the at least one user-selected parameter, detecting a change to a first value in the settings registry based on the third selection and propagating the change through the settings registry based on at least one dependency between the first value and at least one second value. In an embodiment, the method comprises, in response to receiving the third selection of the at least one user-selected parameter, detecting a change to a first value in the settings registry based on the third selection and prior to propagating the change through the settings registry, updating the graphical user interface to show changes to at least one second value in the settings registry that is dependent on the first value. In an embodiment, the method comprises selecting the second list of user-selectable parameters based on the second selection of the at least one user-selected template. In an embodiment, the method comprises, in response to the at least one user-selected component being non-configurable, generating settings for the at least one user-selected component based on the second selection of the at least one user-selected template and the third selection of the at least one user-selected parameter and updating the settings registry based on additional settings for at least one user-selected non-configurable component. In an embodiment, generating the content comprises generating application content that controls software of the programmable computing device based on the at least one user-selected component and the settings registry.

In an embodiment, a non-transitory computer-readable medium's contents configure a processing device to perform a method. The method comprises: displaying, via a graphical user interface to a user, a list of components for a project associated with a programmable computing device; receiving, via the graphical user interface, a first selection of at least one user-selected component for the project from the list of components; in response to the at least one user-selected component being configurable: displaying, via the graphical user interface, a first list of user-selectable templates for the at least one user-selected component; receiving, via the graphical user interface, a second selection of at least one user-selected template from the first list of user-selectable templates; displaying, via the graphical user interface, a second list of user-selectable parameters for the at least one user-selected component; receiving, via the graphical user interface, a third selection of at least one user-selected parameter from the second list of user-selectable parameters; generating settings for the at least one user-selected component based on the second selection of the at least one user-selected template and the third selection of the at least one user-selected parameter; and generating or updating a settings registry based on the settings for each of the at least one user-selected component; and generating content for the programmable computing device based on the at least one user-selected component and the settings registry. In an embodiment, the method comprises providing the generated content to the programmable computing device. In an embodiment, the method comprises, in response to receiving the third selection of the at least one user-selected parameter, detecting a change to a first value in the settings registry based on the third selection and propagating the change through the settings registry based on at least one dependency between the first value and at least one second value. In an embodiment, the method comprises, in response to receiving the third selection of the at least one user-selected parameter: detecting a change to a first value in the settings registry based on the third selection; updating the graphical user interface to show changes to at least one second value in the settings registry that is dependent on the first value; and selectively propagating the change through the settings registry based on a user-response to the updated graphical user interface. In an embodiment, generating the content includes generating initialization code that initializes software of the programmable computing device based on the at least one user-selected component and the settings registry. In an embodiment, generating the content includes generating initialization code that initializes hardware of the programmable computing device based on the at least one user-selected component and the settings registry. In an embodiment, the contents of the computer-readable medium comprise instructions executable by the processing device.

In an embodiment, a computing device comprises: a display device; a memory, which, in operation, stores computer instructions; and at least one processor, which, in operation, executes the computer instructions to: present, via the display device and to a user, a list of components for a project associated with a programmable computing device; receive a first selection of at least one user-selected component for the project from the list of components; in response to the at least one user-selected component being configurable: present, via the display device, a first list of user-selectable templates for the at least one user-selected component; receive a second selection of at least one user-selected template from the first list of user-selectable templates; present, via the display device, a second list of user-selectable parameters for the at least one user-selected component; receive a third selection of at least one user-selected parameter from the second list of user-selectable parameters; generate settings for the at least one user-selected component based on the second selection of the at least one user-selected template and the third selection of the at least one user-selected parameter; and generate or update a settings registry based on the settings for each of the at least one user-selected component; and generate content for the programmable computing device based on the at least one user-selected component and the settings registry. In an embodiment, the at least one processor, in operation, executes the computer instructions to, in response to receiving the third selection of the at least one user-selected parameter, detect a change to a first value in the settings registry based on the third selection and propagate the change through the settings registry based on at least one dependency between the first value and at least one second value. In an embodiment, the at least one processor, in operation, executes the computer instructions to, in response to receiving the third selection of the at least one user-selected parameter, detect a change to a first value in the settings registry based on the third selection, update a graphical user interface displayed to the user to show changes to at least one second value in the settings registry that is dependent on the first value, and selectively propagating the change through the settings registry based on a user-response to the updated graphical user interface displayed to the user. In an embodiment, the at least one processor, in operation, executes the computer instructions to provide the content to the programmable computing device. In an embodiment, the at least one processor, in operation, generates the content by executing the computer instructions to generate initialization code that initializes software of the programmable computing device based on the at least one user-selected component and the settings registry. In an embodiment, the at least one processor, in operation, generates the content by executing the computer instructions to generate initialization code that initializes hardware of the programmable computing device based on the at least one user-selected component and the settings registry. In an embodiment, the at least one processor, in operation, generates the content by executing the computer instructions to: generate initialization content that initializes software of the programmable computing device based on the at least one user-selected component and the settings registry. In an embodiment, the at least one processor, in operation, generates the content by executing the computer instructions to generate initialization content that initializes hardware of the programmable computing device based on the at least one user-selected component and the settings registry.

In an embodiment, a system comprises a programmable computing device and a non-transitory computer-readable medium. The non-transitory computer-readable medium has contents, which, in operation, cause a processor to: display, via a graphical user interface to a user, a list of components for a project associated with the programmable computing device; receive, via the graphical user interface, a first selection of at least one user-selected component for the project from the list of components; in response to the at least one user-selected component being configurable: display, via the graphical user interface, a first list of user-selectable templates for the at least one user-selected component; receive, via the graphical user interface, a second selection of at least one user-selected template from the first list of user-selectable templates; display, via the graphical user interface, a second list of user-selectable parameters for the at least one user-selected component; receive, via the graphical user interface, a third selection of at least one user-selected parameter from the second list of user-selectable parameters; generate settings for the at least one user-selected component based on the second selection of the at least one user-selected template and the third selection of the at least one user-selected parameter; and generate or update a settings registry based on the settings for each of the at least one user-selected component; generate content for the programmable computing device based on the at least one user-selected component and the settings registry; and provide the content to the programmable computing device. In an embodiment, the programmable computing device comprises a microprocessor, which, in operation, executes the content to initialize software of the programmable computing device. In an embodiment, the programmable computing device comprises a microprocessor, which, in operation, executes the content to initialize hardware of the programmable computing device. In an embodiment, the programmable computing device comprises a microprocessor, which, in operation, executes the content as a software application of the programmable computing device.

In an embodiment, a method comprises: presenting, via a graphical user interface to a user, a set of boot configuration options for a project associated with a programmable computing device, the presenting the set of boot configuration options including; presenting configuration pin settings associated with the programmable computing device; presenting option byte values associated with the programmable computing device; and presenting the set of boot configuration options; receiving, via the graphical user interface, a selection of a boot configuration option for the project selected from the presented set of boot configuration options; generating or updating a settings registry based on the selected boot configuration option; and generating content for the programmable computing device based on the selected boot configuration option and the settings registry. In an embodiment, the presenting the configuration pin settings comprises reading configuration pin settings of the programmable computing device. In an embodiment, the presenting the option byte values comprises retrieving option byte values associated with the programmable computing device. In an embodiment, the presented set of configuration options is a function of the configuration pin settings. In an embodiment, the presented set of configuration options is a function of the option byte values. In an embodiment, the presented option byte values are a function of the selected configuration option and the method comprises selecting option byte settings based on the selected configuration option. In an embodiment, the presenting the set of boot configuration options includes presenting a set of boot sequence options. In an embodiment, the presenting the boot sequence options includes presenting: an option to designate a first processing core of a plurality of processing cores as a master and a second processing core of the plurality of processing cores as a slave; an option to indicate the plurality of processing cores are to be booted sequentially; an option to indicate the plurality of processing cores are to be booted in parallel; an option to set synchronization protocols for a processing core of the plurality of processing cores; an option to set synchronization resources for a processing core of the plurality of processing cores; an option to set a boot address for a processing core of the plurality of processing cores; an option to set an execution context associated with a processing core of the plurality of processing cores; an option to assign memory to a master to store code for execution by a slave; an option to configure a master to set a data configuration for a slave; an option to configure a master to set a stack pointer for a slave; or combinations thereof. In an embodiment, the method comprises providing the content to the programmable computing device. In an embodiment, generating the content comprises generating initialization code that initializes software of the programmable computing device based on the selected boot configuration option and the settings registry. In an embodiment, the method comprises presenting, via the graphical user interface to the user, a list of components for the project associated with the programmable computing device; receiving, via the graphical user interface, a first selection of at least one user-selected component for the project from the list of components; in response to the at least one user-selected component being configurable: presenting, via the graphical user interface, a first list of user-selectable templates for the at least one user-selected component; receiving, via the graphical user interface, a second selection of at least one user-selected template from the first list of user-selectable templates; presenting, via the graphical user interface, a second list of user-selectable parameters for the at least one user-selected component; receiving, via the graphical user interface, a third selection of at least one user-selected parameter from the second list of user-selectable parameters; and generating settings for the at least one user-selected component based on the second selection of the at least one user-selected template and the third selection of the at least one user-selected parameter, wherein the generating or updating the settings registry is based on the settings for each of the at least one user-selected component and the generating content for the programmable computing device is based on the at least one user-selected component and the settings registry.

In an embodiment, a non-transitory computer-readable medium's contents configure a processing device to perform a method. The method comprises: presenting, via a graphical user interface to a user, a set of boot configuration options for a project associated with a programmable computing device, the presenting the set of boot configuration options including; presenting configuration pin settings associated with the programmable computing device; presenting option byte values associated with the programmable computing device; and presenting the set of boot configuration options; receiving, via the graphical user interface, a selection of a boot configuration option for the project selected from the presented set of boot configuration options; generating or updating a settings registry based on the selected boot configuration option; and generating content for the programmable computing device based on the selected boot configuration option and the settings registry. In an embodiment, the presenting the configuration pin settings comprises reading configuration pin settings of the programmable computing device. In an embodiment, the presented set of configuration options is a function of the configuration pin settings. In an embodiment, the presenting the set of boot configuration options includes presenting a set of boot sequence options. In an embodiment, the presenting the boot sequence options includes presenting: an option to designate a first processing core of a plurality of processing cores as a master and a second processing core of the plurality of processing cores as a slave; an option to indicate the plurality of processing cores are to be booted sequentially; an option to indicate the plurality of processing cores are to be booted in parallel; an option to set synchronization protocols for a processing core of the plurality of processing cores; an option to set synchronization resources for a processing core of the plurality of processing cores; an option to set a boot address for a processing core of the plurality of processing cores; an option to set an execution context associated with a processing core of the plurality of processing cores; an option to assign memory to a master to store code for execution by a slave; an option to configure a master to set a data configuration for a slave; an option to configure a master to set a stack pointer for a slave; or combinations thereof. In an embodiment, the method comprises providing the generated content to the programmable computing device. In an embodiment, the method comprises: presenting, via the graphical user interface to the user, a list of components for the project associated with the programmable computing device; receiving, via the graphical user interface, a first selection of at least one user-selected component for the project from the list of components; in response to the at least one user-selected component being configurable: presenting, via the graphical user interface, a first list of user-selectable templates for the at least one user-selected component; receiving, via the graphical user interface, a second selection of at least one user-selected template from the first list of user-selectable templates; presenting, via the graphical user interface, a second list of user-selectable parameters for the at least one user-selected component; receiving, via the graphical user interface, a third selection of at least one user-selected parameter from the second list of user-selectable parameters; and generating settings for the at least one user-selected component based on the second selection of the at least one user-selected template and the third selection of the at least one user-selected parameter, wherein the generating or updating the settings registry is based on the settings for each of the at least one user-selected component and the generating content for the programmable computing device is based on the at least one user-selected component and the settings registry. In an embodiment, the contents of the computer-readable medium comprise instructions executable by the processing device.

In an embodiment, a computing device comprises: a display device; a memory, which, in operation, stores computer instructions; and at least one processor. The at least one processor, in operation, executes the computer instructions to: present, via a graphical user interface to a user, a set of boot configuration options for a project associated with a programmable computing device, the presenting the set of boot configuration options including; presenting configuration pin settings associated with the programmable computing device; presenting option byte values associated with the programmable computing device; and presenting the set of boot configuration options; receive, via the graphical user interface, a selection of a boot configuration option for the project selected from the presented set of boot configuration options; generate or update a settings registry based on the selected boot configuration option; and generate content for the programmable computing device based on the selected boot configuration option and the settings registry. In an embodiment, the presenting the configuration pin settings comprises reading configuration pin settings of the programmable computing device. In an embodiment, the presented set of configuration options is a function of the configuration pin settings, a function of the option byte values, or a function of both the configuration pin settings and the option byte values. In an embodiment, the presenting the set of boot configuration options includes presenting a set of boot sequence options. In an embodiment, the presenting the boot sequence options includes presenting: an option to designate a first processing core of a plurality of processing cores as a master and a second processing core of the plurality of processing cores as a slave; an option to indicate the plurality of processing cores are to be booted sequentially; an option to indicate the plurality of processing cores are to be booted in parallel; an option to set synchronization protocols for a processing core of the plurality of processing cores; an option to set synchronization resources for a processing core of the plurality of processing cores; an option to set a boot address for a processing core of the plurality of processing cores; an option to set an execution context associated with a processing core of the plurality of processing cores; an option to assign memory to a master to store code for execution by a slave; an option to configure a master to set a data configuration for a slave; an option to configure a master to set a stack pointer for a slave; or combinations thereof. In an embodiment, the at least one processor, in operation, executes the computer instructions to: present, via the graphical user interface to the user, a list of components for the project associated with the programmable computing device; receive, via the graphical user interface, a first selection of at least one user-selected component for the project from the list of components; in response to the at least one user-selected component being configurable: present, via the graphical user interface, a first list of user-selectable templates for the at least one user-selected component; receive, via the graphical user interface, a second selection of at least one user-selected template from the first list of user-selectable templates; present, via the graphical user interface, a second list of user-selectable parameters for the at least one user-selected component; receive, via the graphical user interface, a third selection of at least one user-selected parameter from the second list of user-selectable parameters; and generate settings for the at least one user-selected component based on the second selection of the at least one user-selected template and the third selection of the at least one user-selected parameter, wherein the generating the settings registry is based on the settings for each of the at least one user-selected component and the generating content for the programmable computing device is based on the at least one user-selected component and the settings registry.

In an embodiment, a system comprises a programmable computing device and a non-transitory computer-readable medium. The non-transitory computer-readable medium has contents, which, in operation, cause a processor to: present, via a graphical user interface to a user, a set of boot configuration options for a project associated with the programmable computing device, the presenting the set of boot configuration options including; presenting configuration pin settings associated with the programmable computing device; presenting option byte values associated with the programmable computing device; and presenting the set of boot configuration options; receive, via the graphical user interface, a selection of a boot configuration option for the project selected from the presented set of boot configuration options; generate or update a settings registry based on the selected boot configuration option; and generate content for the programmable computing device based on the selected boot configuration option and the settings registry. In an embodiment, the programmable computing device comprises a microprocessor which, in operation, executes the content to initialize software of the programmable computing device. In an embodiment, the programmable computing device comprises a microprocessor which, in operation, executes the content to initialize hardware of the programmable computing device.

In an embodiment, a method comprises: presenting, via a graphical user interface to a user, a set of configuration options for a project associated with a programmable computing device, the presenting the set of configuration options including; presenting a set of internal peripherals of the programmable computing device; presenting a set of pads of an interface of the programmable computing device; and presenting a set of pins of the programmable computing device; receiving, via the graphical user interface, configuration selection information associating an internal peripheral of the set of internal peripherals with a pin of the set of pins; maintaining a settings registry based on the received configuration selection information; and generating content for the programmable computing device based on the received configuration selection information and the settings registry. In an embodiment, the presenting comprises retrieving configuration information from the settings registry. In an embodiment, maintaining the settings registry comprises retrieving and updating the settings registry. In an embodiment, the maintaining the settings registry comprises generating the settings registry. In an embodiment, the configuration selection information: identifies a signal coupling between the internal peripheral of the set of internal peripherals and a pad of the set of pads; and identifies a connection between the pad of the set of pads and the pin of the set of pins. In an embodiment, the configuration selection information associates the internal peripheral of the set of internal peripherals with a plurality of pads of the set of pads. In an embodiment, the configuration selection information associates a plurality of pads of the set of pads with the pin of the set of pins. In an embodiment, the method comprises: performing a software coherency check in response to the received configuration selection information. In an embodiment, the method comprises: performing an electrical integrity check in response to the received configuration selection information. In an embodiment, the method comprises: performing a software coherency check in response to the received configuration selection information; and performing an electrical integrity check in response to the received configuration selection information. In an embodiment, the performing the software coherency check and the electrical integrity check comprises retrieving configuration information from the settings registry. In an embodiment, the presenting comprises presenting a tree structure having an instance layer presenting the set of internal peripherals, an interface layer presenting the set of pads, and a pin layer presenting the set of pins. In an embodiment, the presenting comprises: presenting a set of signal couplings between internal peripherals of the set of internal peripherals and pads of the set of pads; and presenting a set of connections between pads of the set of pads and pins of the set of pins. In an embodiment, the method comprises: providing the content to the programmable computing device.

In an embodiment, a non-transitory computer-readable medium's contents configure a processing device to perform a method, the method comprising: presenting, via a graphical user interface to a user, a set of configuration options for a project associated with a programmable computing device, the presenting the set of configuration options including; presenting a set of internal peripherals of the programmable computing device; presenting a set of pads of an interface of the programmable computing device; and presenting a set of pins of the programmable computing device; receiving, via the graphical user interface, configuration selection information associating an internal peripheral of the set of internal peripherals with a pin of the set of pins; maintaining a settings registry based on the received configuration selection information; and generating content for the programmable computing device based on the received configuration selection information and the settings registry. In an embodiment, the contents of the computer-readable medium comprise instructions. In an embodiment, the presenting comprises retrieving configuration information from the settings registry. In an embodiment, the maintaining the settings registry comprises retrieving and updating the settings registry. In an embodiment, the maintaining the settings registry comprises generating the settings registry. In an embodiment, the configuration selection information identifies a signal coupling between the internal peripheral of the set of internal peripherals and a pad of the set of pads, and identifies a connection between the pad of the set of pads and the pin of the set of pins. In an embodiment, the configuration selection information associates the internal peripheral of the set of internal peripherals with a plurality of pads of the set of pads. In an embodiment, the configuration selection information associates a plurality of pads of the set of pads with the pin of the set of pins. In an embodiment, the method comprises: performing a software coherency check in response to the received configuration selection information; performing an electrical integrity check in response to the received configuration selection information; or performing a software coherency check in response to the received configuration selection information and performing an electrical integrity check in response to the received configuration selection information. In an embodiment, the method comprises providing the generated content to the programmable computing device.

In an embodiment, a computing device comprises a display device, a memory, which, in operation, stores computer instructions, and at least one processor. The at least one processor, in operation, executes the computer instructions to: present, via a graphical user interface to a user, a set of configuration options for a project associated with a programmable computing device, the presenting the set of configuration options including; presenting a set of internal peripherals of the programmable computing device; presenting a set of pads of an interface of the programmable computing device; and presenting a set of pins of the programmable computing device; receive, via the graphical user interface, configuration selection information associating an internal peripheral of the set of internal peripherals with a pin of the set of pins; maintain a settings registry based on the received configuration selection information; and generate content for the programmable computing device based on the received configuration selection information and the settings registry. In an embodiment, the presenting comprises retrieving configuration information from the settings registry. In an embodiment, the maintaining the settings registry comprises retrieving and updating the settings registry. In an embodiment, the maintaining the settings registry comprises generating the settings registry. In an embodiment, the configuration selection information: identifies a signal coupling between the internal peripheral of the set of internal peripherals and a pad of the set of pads; and identifies a connection between the pad of the set of pads and the pin of the set of pins. In an embodiment, the configuration selection information associates the internal peripheral of the set of internal peripherals with a plurality of pads of the set of pads. In an embodiment, the configuration selection information associates a plurality of pads of the set of pads with the pin of the set of pins. In an embodiment, the at least one processor, in operation, executes the computer instructions to: perform a software coherency check in response to the received configuration selection information; perform an electrical integrity check in response to the received configuration selection information; or perform a software coherency check in response to the received configuration selection information and perform an electrical integrity check in response to the received configuration selection information. In an embodiment, the presenting comprises presenting a tree structure having an instance layer presenting the set of internal peripherals, an interface layer presenting the set of pads, and a pin layer presenting the set of pins. In an embodiment, the presenting comprises: presenting a set of signal couplings between internal peripherals of the set of internal peripherals and pads of the set of pads; and presenting a set of connections between pads of the set of pads and pins of the set of pins. In an embodiment, the at least one processor, in operation, executes the computer instructions to provide the content to the programmable computing device.

In an embodiment, a system comprises a programmable computing device and a non-transitory computer-readable medium. The non-transitory computer-readable medium has contents, which, in operation, cause a processor to: present, via a graphical user interface to a user, a set of configuration options for a project associated with a programmable computing device, the presenting the set of configuration options including; presenting a set of internal peripherals of the programmable computing device; presenting a set of pads of an interface of the programmable computing device; presenting a set of pins of the programmable computing device; receive, via the graphical user interface, configuration selection information associating an internal peripheral of the set of internal peripherals with a pin of the set of pins; maintain a settings registry based on the received configuration selection information; and generate content for the programmable computing device based on the received configuration selection information and the settings registry. In an embodiment, the programmable computing device comprises a microprocessor which, in operation, executes the content to initialize the programmable computing device. In an embodiment, a method comprises: presenting, by a host computing device via a graphical user interface to a user, a list of states for a project associated with a programmable computing device; receiving, by the host computing device via the graphical user interface, a first selection of a first user-selected state for the project from the list of states; receiving, by the host computing device via the graphical user interface, a second selection of a second user-selected state for the project; generating, by the host computing device, a transition between the first user-selected state to the second user-selected state; generating or updating, by the host computing device, a settings registry based on the first user-selected state, the second user-selected state, and the generated transitions between the first user-selected state and the second user-selected state; and generating, by the host computing device, content for the programmable computing device based on the settings registry. In an embodiment, the method comprises: providing the content to the programmable computing device. In an embodiment, receiving the first selection of the first user-selected state for the project from the list of states comprises: receiving, via the graphical user interface, a user input selecting a defined state of the programmable computing device. In an embodiment, receiving the first selection of the first user-selected state for the project from the list of states comprises: receiving, via the graphical user interface, a user input selecting a system state of the programmable computing device. In an embodiment, receiving the first selection of the first user-selected state for the project from the list of states comprises: receiving, via the graphical user interface, a user input selecting a domain state of the programmable computing device. In an embodiment, receiving the second selection of the second user-selected state for the project comprises: receiving, via the graphical user interface, a user input defining a state of the programmable computing device. In an embodiment, generating the transition from the first user-selected state to the second user-selected state comprises: selecting, by the host device, at least one defined transition constraint for at least one execution element associated with the second user-selected state for transitioning from the first user-selected state to the second user-selected state. In an embodiment, generating the transition from the first user-selected state to the second user-selected state comprises: receiving, by the host device, at least one user-defined transition constraint for at least one execution element associated with the second user-selected state for transitioning from the first user-selected state to the second user-selected state. In an embodiment, the method comprises: receiving, by the programmable computing device, a request to proceed from the first user-selected state to the second user-selected state; and transitioning, by the programmable computing device, the programmable computing device from the first user-selected state to the second user-selected state based on the generated transitions. In an embodiment, transitioning the programmable computing device from the first user-selected state to the second user-selected comprises: selecting, by the programmable computing device, each execution element associated with the second user-selected state; obtaining, by the programmable computing device, a configuration for each execution element; resetting, by the programmable computing device, each execution element to an initial state; and applying, by the programmable computing device, the configuration for each execution element from the initial state to the second user-selected state. In an embodiment, transitioning the programmable computing device from the first user-selected state to the second user-selected comprises: selecting, by the programmable computing device, each execution element associated with the second user-selected state; determining, by the programmable computing device, a configuration difference for each execution element between the first user-selected state and the second user-selected state; applying, by the programmable computing device, at least one transition constraint for at least one configuration difference for at least one execution element; and applying, by the programmable computing device, the configuration differences for each execution element from the first user-selected state to the second user-selected state.

In an embodiment, a system comprises: a programmable computing device having a first memory, which, in operation, stores first computer instructions; and at least one first processor. The at least one first processor, in operation, executes the first computer instructions to: receive content configuring a first user-selected state, a second user-selected state, and transitions between the first user-selected state and the second user-selected state; receive a request to proceed from the first user-selected state to the second user-selected state; and transition the programmable computing device from the first user-selected state to the second user-selected state based on the transitions. The system includes a host computing device comprising: a display device; a second memory, which, in operation, stores second computer instructions; and at least one second processor. The at least one second processor, in operation, executes the second computer instructions to: present, via the display device, a list of states for a project associated with the programmable computing device; receive a first selection of the first user-selected state for the project from the list of states; receive a second selection of the second user-selected state for the project; generate the transitions from the first user-selected state to the second user-selected state; generate a settings registry based on the first user-selected state, the second user-selected state, and the transitions between the first user-selected state and the second user-selected state; and generate the content for the programmable computing device based on the settings registry. In an embodiment, the at least one second processor of the host computing device, in operation, receives the first selection of the first user-selected state for the project from the list of states by executing the second computer instructions to: receive a user input selecting a defined state of the programmable computing device. In an embodiment, the at least one second processor of the host computing device, in operation, receives the first selection of the first user-selected state for the project from the list of states by executing the second computer instructions to: receive a user input selecting a system state of the programmable computing device. In an embodiment, the at least one second processor of the host computing device, in operation, generates the transition from the first user-selected state to the second user-selected state by executing the second computer instructions to: receive at least one user-defined transition constraint for at least one execution element associated with the second user-selected state for transitioning from the first user-selected state to the second user-selected state. In an embodiment, the at least one first processor of the programmable computing device, in operation, transitions the programmable computing device from the first user-selected state to the second user-selected by executing the first computer instructions to: select each execution element associated with the second user-selected state; obtain a configuration for each execution element; reset each execution element to an initial state; and apply the configuration for each execution element from the initial state to the second user-selected state. In an embodiment, the at least one first processor of the programmable computing device, in operation, transitions the programmable computing device from the first user-selected state to the second user-selected by executing the first computer instructions to: select each execution element associated with the second user-selected state; determine a configuration difference for each execution element between the first user-selected state and the second user-selected state; apply at least one transition constraint for at least one configuration difference for at least one execution element; and apply the configuration differences for each execution element from the first user-selected state to the second user-selected state.

In an embodiment, a non-transitory computer-readable medium's contents configure a processing device to perform a method. The method comprises: presenting, via a graphical user interface to a user, a list of states for a project associated with a programmable computing device; receiving, via the graphical user interface, a first selection of a first user-selected state for the project from the list of states; receiving, via the graphical user interface, a second selection of a second user-selected state for the project; generating a transition from the first user-selected state to the second user-selected state; maintain a settings registry based on the first user-selected state, the second user-selected state, and the generated transitions between the first user-selected state and the second user-selected state; and generating content for the programmable computing device based on the settings registry. In an embodiment, the contents of the computer-readable medium comprise instructions executable by the processing device. In an embodiment, the method comprises: providing the content to the programmable computing device. In an embodiment, receiving the first selection of the first user-selected state for the project from the list of states comprises: receiving, via the graphical user interface, a user input selecting a defined state of the programmable computing device; receiving, via the graphical user interface, a user input selecting a system state of the programmable computing device; receiving, via the graphical user interface, a user input selecting a domain state of the programmable computing device; or combinations thereof. In an embodiment, receiving the second selection of the second user-selected state for the project comprises: receiving, via the graphical user interface, a user input defining a state of the programmable computing device. In an embodiment, generating the transition from the first user-selected state to the second user-selected state comprises: selecting at least one defined transition constraint for at least one execution element associated with the second user-selected state for transitioning from the first user-selected state to the second user-selected state. In an embodiment, generating the transition from the first user-selected state to the second user-selected state comprises: receiving at least one user-defined transition constraint for at least one execution element associated with the second user-selected state for transitioning from the first user-selected state to the second user-selected state.

In an embodiment, a non-transitory computer-readable medium's contents configure a microcontroller of a programmable computing device to perform a method. The method comprises: receiving content configuring a first user-selected state, a second user-selected state, and transitions between the first user-selected state and the second user-selected state; receiving a request to proceed from the first user-selected state to the second user-selected state; and transitioning the programmable computing device from the first user-selected state to the second user-selected state based on the received content by: selecting each execution element associated with the second user-selected state; determining a configuration difference for each execution element between the first user-selected state and the second user-selected state; applying at least one transition constraint for at least one configuration difference for at least one execution element; and applying the configuration differences for each execution element from the first user-selected state to the second user-selected state. In an embodiment, transitioning the programmable computing device from the first user-selected state to the second user-selected state comprises: selecting, by the programmable computing device, each execution element associated with the second user-selected state; obtaining, by the programmable computing device, a configuration for each execution element; resetting, by the programmable computing device, each execution element to an initial state; and applying, by the programmable computing device, the configuration for each execution element from the initial state to the second user-selected state. In an embodiment, transitioning the programmable computing device from the first user-selected state to the second user-selected state comprises: selecting, by the programmable computing device, each execution element associated with the second user-selected state; determining, by the programmable computing device, a configuration difference for each execution element between the first user-selected state and the second user-selected state; applying, by the programmable computing device, at least one transition constraint for at least one configuration difference for at least one execution element; and applying, by the programmable computing device, the configuration differences for each execution element from the first user-selected state to the second user-selected state.

In an embodiment, a computing device comprises a memory, which, in operation, stores computer instructions, and at least one processor. The at least one processor, in operation, executes the computer instructions to: present, via a display device, a list of states for a project associated with a programmable computing device; receive a first selection of a first user-selected state for the project from the list of states; receive a second selection of a second user-selected state for the project; generate transitions from the first user-selected state to the second user-selected state; generate a settings registry based on the first user-selected state, the second user-selected state, and the transitions between the first user-selected state and the second user-selected state; and generate content for the programmable computing device based on the settings registry. In an embodiment, the at least one processor, in operation, receives the first selection of the first user-selected state for the project from the list of states by executing the second computer instructions to: receive a user input selecting a defined state of the programmable computing device. In an embodiment, the at least one processor, in operation, receives the first selection of the first user-selected state for the project from the list of states by executing the second computer instructions to: receive a user input selecting a system state of the programmable computing device. In an embodiment, the at least one processor, in operation, generates the transition from the first user-selected state to the second user-selected state by executing the second computer instructions to: receive at least one user-defined transition constraint for at least one execution element associated with the second user-selected state for transitioning from the first user-selected state to the second user-selected state.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method performed by a processing device, the method comprising:
presenting, via a graphical user interface to a user, a list of a plurality of hardware components of a programmable computing device for a project associated with the programmable computing device, wherein the programmable computing device is separate from the processing device;
receiving, via the graphical user interface, a first selection of at least one user-selected hardware component for the project from the list of components;
in response to the at least one user-selected hardware component being configurable:
presenting, via the graphical user interface, a first list of user-selectable templates for the at least one user-selected hardware component;
receiving, via the graphical user interface, a second selection of at least one user-selected template from the first list of user-selectable templates;
presenting, via the graphical user interface, a second list of user-selectable parameters for the at least one user-selected hardware component;
receiving, via the graphical user interface, a third selection of at least one user-selected parameter from the second list of user-selectable parameters;
generating settings for the at least one user-selected hardware component based on the second selection of the at least one user-selected template and the third selection of the at least one user-selected parameter; and generating or updating a settings registry for the programmable computing device based on the settings for each of the at least one user-selected hardware component;
generating content for the plurality of hardware components of the programmable computing device based on the at least one user-selected hardware component and the settings registry; and
providing the content to the programmable computing device.

2. The method of claim 1, wherein,
the content is provided to the programmable computing device via a programmable interface of the programmable computing device.

3. The method of claim 1, wherein generating the content comprises:
generating initialization code that initializes software of the programmable computing device based on the at least one user-selected hardware component and the settings registry.

4. The method of claim 1, wherein generating the content comprises:
generating initialization code that initializes hardware of the programmable computing device based on the at least one user-selected hardware component and the settings registry.

5. The method of claim 1, wherein generating the content comprises:
generating application code that controls software of the programmable computing device based on the at least one user-selected hardware component and the settings registry.

6. The method of claim 1, wherein receiving the third selection of the at least one user-selected parameter comprises:
receiving, via the graphical user interface, one or more values selected by the user and defined by the at least one user-selected parameter.

7. The method of claim 1, comprising:
in response to receiving the third selection of the at least one user-selected parameter:
detecting a change to a first value in the settings registry based on the third selection; and
propagating the change through the settings registry based on at least one dependency between the first value and at least one second value in the settings registry.

8. The method of claim 1, comprising:
in response to receiving the third selection of the at least one user-selected parameter:
detecting a change to a first value in the settings registry based on the third selection; and
prior to propagating the change through the settings registry, updating the graphical user interface to show changes to at least one second value in the settings registry that is dependent on the first value.

9. The method of claim 1, comprising:
selecting the second list of user-selectable parameters based on the second selection of the at least one user-selected template.

10. The method of claim 1, comprising:
in response to the at least one user-selected hardware component being non-configurable:
generating settings for the at least one user-selected hardware component based on the second selection of the at least one user-selected template and the third selection of the at least one user-selected parameter; and updating the settings registry based on additional settings for at least one user-selected non-configurable hardware component.

11. The method of claim 1, wherein generating the content comprises:
generating application content that controls software of the programmable computing device based on the at least one user-selected hardware component and the settings registry.

12. A non-transitory computer-readable medium having contents that configure a processing device to perform a method, the method comprising:
displaying, via a graphical user interface to a user, a list of a plurality of hardware components of a programmable computing device for a project associated with the programmable computing device, wherein the processing device is separate from the programmable computing device;
receiving, via the graphical user interface, a first selection of at least one user-selected hardware component for the project from the list of components;
in response to the at least one user-selected hardware component being configurable:
displaying, via the graphical user interface, a first list of user-selectable templates for the at least one user-selected hardware component;
receiving, via the graphical user interface, a second selection of at least one user-selected template from the first list of user-selectable templates;
displaying, via the graphical user interface, a second list of user-selectable parameters for the at least one user-selected hardware component;
receiving, via the graphical user interface, a third selection of at least one user-selected parameter from the second list of user-selectable parameters;
generating settings for the at least one user-selected hardware component based on the second selection of the at least one user-selected template and the third selection of the at least one user-selected parameter; and
generating or updating a settings registry for the programmable computing device based on the settings for each of the at least one user-selected hardware component;
generating content for the plurality of hardware components of the programmable computing device based on the at least one user-selected hardware component and the settings registry; and
providing the generated content to the programmable computing device.

13. The non-transitory computer-readable medium of claim 12, wherein,
the generated content is provided to the programmable computing device via a programmable interface of the programmable computing device.

14. The non-transitory computer-readable medium of claim 12, wherein the method comprises:
in response to receiving the third selection of the at least one user-selected parameter:
detecting a change to a first value in the settings registry based on the third selection; and
propagating the change through the settings registry based on at least one dependency between the first value and at least one second value in the settings registry.

15. The non-transitory computer-readable medium of claim 12, wherein the method comprises:
  in response to receiving the third selection of the at least one user-selected parameter:
    detecting a change to a first value in the settings registry based on the third selection;
    updating the graphical user interface to show changes to at least one second value in the settings registry that is dependent on the first value; and
    selectively propagating the change through the settings registry based on a user-response to the updated graphical user interface.

16. The non-transitory computer-readable medium of claim 12, wherein generating the content includes:
  generating initialization code that initializes software of the programmable computing device based on the at least one user-selected hardware component and the settings registry.

17. The non-transitory computer-readable medium of claim 12, wherein generating the content includes:
  generating initialization code that initializes hardware of the programmable computing device based on the at least one user-selected hardware component and the settings registry.

18. The non-transitory computer-readable medium of claim 12, wherein generating the content includes:
  generating application code that controls software of the programmable computing device based on the at least one user-selected hardware component and the settings registry.

19. The non-transitory computer-readable medium of claim 12, wherein the contents of the computer-readable medium comprise instructions executable by the processing device.

20. A processing device, comprising:
  a display device;
  a memory, which, in operation, stores computer instructions; and
  at least one processor, which, in operation, executes the computer instructions to:
    present, via the display device and to a user, a list of a plurality of hardware components of a programmable computing device for a project associated with the programmable computing device, the programmable computing device being separate from the processing device;
    receive a first selection of at least one user-selected hardware component for the project from the list of hardware components;
    in response to the at least one user-selected hardware component being configurable:
      present, via the display device, a first list of user-selectable templates for the at least one user-selected hardware component;
      receive a second selection of at least one user-selected template from the first list of user-selectable templates;
      present, via the display device, a second list of user-selectable parameters for the at least one user-selected hardware component;
      receive a third selection of at least one user-selected parameter from the second list of user-selectable parameters;
      generate settings for the at least one user-selected hardware component based on the second selection of the at least one user-selected template and the third selection of the at least one user-selected parameter; and
    generate or update a settings registry for the programmable computing device based on the settings for each of the at least one user-selected hardware component;
    generate content for the plurality of hardware components of the programmable computing device based on the at least one user-selected hardware component and the settings registry; and
    provide the generated content to the programmable computing device.

21. The processing device of claim 20, wherein the at least one processor, in operation, executes the computer instructions to:
  in response to receiving the third selection of the at least one user-selected parameter:
    detect a change to a first value in the settings registry based on the third selection; and
    propagate the change through the settings registry based on at least one dependency between the first value and at least one second value in the settings registry.

22. The processing device of claim 20, wherein the at least one processor, in operation, executes the computer instructions to:
  in response to receiving the third selection of the at least one user-selected parameter:
    detect a change to a first value in the settings registry based on the third selection;
    update a graphical user interface displayed to the user to show changes to at least one second value in the settings registry that is dependent on the first value; and
    selectively propagating the change through the settings registry based on a user-response to the updated graphical user interface displayed to the user.

23. The processing device of claim 20, wherein the at least one processor, in operation, executes the computer instructions to:
  provide the content to the programmable computing device via a programmable interface of the programmable computing device.

24. The processing device of claim 20, wherein the at least one processor, in operation, generates the content by executing the computer instructions to:
  generate initialization code that initializes software of the programmable computing device based on the at least one user-selected hardware component and the settings registry.

25. The processing device of claim 20, wherein the at least one processor, in operation, generates the content by executing the computer instructions to:
  generate initialization code that initializes hardware of the programmable computing device based on the at least one user-selected hardware component and the settings registry.

26. The processing device of claim 20, wherein the at least one processor, in operation, generates the content by executing the computer instructions to:
  generate application code that controls software of the programmable computing device based on the at least one user-selected hardware component and the settings registry.

27. The processing device of claim 20, wherein the at least one processor, in operation, generates the content by executing the computer instructions to:
generate initialization content that initializes software of the programmable computing device based on the at least one user-selected hardware component and the settings registry.

28. The processing device of claim 20, wherein the at least one processor, in operation, generates the content by executing the computer instructions to:
generate initialization content that initializes hardware of the programmable computing device based on the at least one user-selected hardware component and the settings registry.

29. The computing device of claim 20, wherein the at least one processor, in operation, generates the content by executing the computer instructions to:
generate application content that controls software of the programmable computing device based on the at least one user-selected hardware component and the settings registry.

30. A system, comprising:
a programmable computing device having a plurality of hardware components; and
a non-transitory computer-readable medium having contents, which, in operation, cause a processor separate from the programmable computing device to:
display, via a graphical user interface to a user, a list of the plurality of hardware components of the programmable computing device for a project associated with the programmable computing device;
receive, via the graphical user interface, a first selection of at least one user-selected hardware component for the project from the list of hardware components;
in response to the at least one user-selected hardware component being configurable:
display, via the graphical user interface, a first list of user-selectable templates for the at least one user-selected hardware component;
receive, via the graphical user interface, a second selection of at least one user-selected template from the first list of user-selectable templates;
display, via the graphical user interface, a second list of user-selectable parameters for the at least one user-selected hardware component;
receive, via the graphical user interface, a third selection of at least one user-selected parameter from the second list of user-selectable parameters;
generate settings for the at least one user-selected hardware component based on the second selection of the at least one user-selected template and the third selection of the at least one user-selected parameter; and
generate or update a settings registry for the programmable computing device based on the settings for each of the at least one user-selected hardware component;
generate content for the plurality of hardware components of the programmable computing device based on the at least one user-selected hardware component and the settings registry; and
provide the content to the programmable computing device.

31. The system of claim 30, wherein the programmable computing device comprises:
a microprocessor which, in operation, executes the content to initialize software of the programmable computing device.

32. The system of claim 30, wherein the programmable computing device comprises:
a microprocessor which, in operation, executes the content to initialize hardware of the programmable computing device.

33. The system of claim 30, wherein the programmable computing device comprises:
a microprocessor which, in operation, executes the content as a software application of the programmable computing device.

* * * * *